US008908492B2

(12) United States Patent
Heo et al.

(10) Patent No.: US 8,908,492 B2
(45) Date of Patent: Dec. 9, 2014

(54) ORTHOGONAL RESOURCE SELECTION TRANSMIT DIVERSITY AND RESOURCE ASSIGNMENT

(75) Inventors: Youn Hyoung Heo, Hwasung (KR); Robert Mark Harrison, Grapevine, TX (US); Masoud Ebrahimi Tazeh Mahalleh, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/466,589

(22) Filed: May 8, 2012

(65) Prior Publication Data

US 2013/0039163 A1 Feb. 14, 2013

Related U.S. Application Data

(60) Provisional application No. 61/522,434, filed on Aug. 11, 2011, provisional application No. 61/541,848, filed on Sep. 30, 2011, provisional application No. 61/555,572, filed on Nov. 4, 2011, provisional application No. 61/590,262, filed on Jan. 24, 2012.

(51) Int. Cl.
| | |
|---|---|
| *H04J 11/00* | (2006.01) |
| *H04L 25/00* | (2006.01) |
| *H04B 7/02* | (2006.01) |
| *H04W 72/04* | (2009.01) |
| *H04B 7/04* | (2006.01) |

(52) U.S. Cl.
CPC ........ *H04B 7/02* (2013.01); *H04L 25/00* (2013.01); *H04W 72/04* (2013.01); *H04B 7/0413* (2013.01)
USPC ............................ 370/208; 370/344; 370/483

(58) Field of Classification Search
None
See application file for complete search history.

(56) References Cited

U.S. PATENT DOCUMENTS

| 8,094,547 B2 | 1/2012 | Sung et al. |
| 8,094,747 B2 | 1/2012 | Zhang et al. |

(Continued)

FOREIGN PATENT DOCUMENTS

| WO | 2010031189 A1 | 3/2010 | |
| WO | 2010128817 A2 | 11/2010 | |
| WO | WO 2010128817 A2 * | 11/2010 | ................ H04L 1/18 |

OTHER PUBLICATIONS

3GPP TS 36.331 V10.1.0, "3rd Generation Partnership Project; Technical Specification Group Radio Access Network; Evolved Universal Terrestrial Radio Access (E-UTRA); Radio Resource Control (RRC); Protocol specification (Release 10)," Mar. 2011 (in particular section 6.3.2).

(Continued)

*Primary Examiner* — Ian N Moore
*Assistant Examiner* — Eric P Smith
(74) *Attorney, Agent, or Firm* — Fish & Richardson P.C.

(57) ABSTRACT

Methods of allocating orthogonal resources of a wireless communication network to a user equipment (UE) that uses transmit diversity are disclosed. In one or more embodiments, the UE is configured to transmit a reference symbol and a modulated symbol on multiple orthogonal resources on an antenna. The method includes: selecting, by the UE, a first and a second orthogonal resource, respectively, from a plurality of orthogonal resources according to the state of information bits to be communicated by the UE; and transmitting, by the UE, the reference and data symbols on the first and the second orthogonal resource, respectively, on one antenna. The first and the second resource are different for at least one of the states of the information bits. The first and the second resource are both in the same physical resource block.

26 Claims, 6 Drawing Sheets

(56) References Cited

U.S. PATENT DOCUMENTS

| | | | |
|---|---|---|---|
| 8,121,175 | B2 | 2/2012 | Futagi et al. |
| 8,542,571 | B2 | 9/2013 | Kim et al. |
| 2003/0169681 | A1* | 9/2003 | Li et al. .................. 370/203 |
| 2005/0085197 | A1* | 4/2005 | Laroia et al. ............... 455/101 |
| 2005/0195733 | A1* | 9/2005 | Walton et al. ................. 370/208 |
| 2007/0283009 | A1 | 12/2007 | Takemura |
| 2008/0175195 | A1 | 7/2008 | Cho et al. |
| 2008/0192851 | A1 | 8/2008 | Edler et al. |
| 2008/0225791 | A1 | 9/2008 | Pi et al. |
| 2008/0316957 | A1 | 12/2008 | Shen et al. |
| 2009/0046646 | A1 | 2/2009 | Cho et al. |
| 2009/0129259 | A1 | 5/2009 | Malladi et al. |
| 2009/0197630 | A1 | 8/2009 | Ahn et al. |
| 2009/0285160 | A1 | 11/2009 | Cheng et al. |
| 2010/0074208 | A1 | 3/2010 | Farajidana et al. |
| 2010/0074210 | A1 | 3/2010 | Gaal et al. |
| 2010/0157956 | A1 | 6/2010 | Takahashi |
| 2010/0159939 | A1 | 6/2010 | Jeong et al. |
| 2010/0165931 | A1 | 7/2010 | Nimbalker et al. |
| 2010/0172316 | A1 | 7/2010 | Hwang et al. |
| 2010/0202559 | A1* | 8/2010 | Luo et al. ..................... 375/295 |
| 2010/0234026 | A1 | 9/2010 | Tenny et al. |
| 2010/0260130 | A1 | 10/2010 | Earnshaw et al. |
| 2010/0291937 | A1 | 11/2010 | Hu |
| 2011/0021228 | A1 | 1/2011 | Kim et al. |
| 2011/0045860 | A1* | 2/2011 | Nam et al. .................... 455/509 |
| 2011/0080880 | A1 | 4/2011 | Yin et al. |
| 2011/0128893 | A1 | 6/2011 | Park et al. |
| 2011/0170489 | A1 | 7/2011 | Han et al. |
| 2011/0170575 | A1 | 7/2011 | Harrison et al. |
| 2011/0243066 | A1 | 10/2011 | Nazar et al. |
| 2011/0299500 | A1 | 12/2011 | Papasakellariou et al. |
| 2012/0093082 | A1 | 4/2012 | Kim et al. |
| 2012/0113875 | A1 | 5/2012 | Alanara et al. |
| 2012/0263121 | A1 | 10/2012 | Chen et al. |
| 2012/0300751 | A1 | 11/2012 | Arai et al. |
| 2013/0102320 | A1 | 4/2013 | Suzuki et al. |

OTHER PUBLICATIONS

3GPP TS 36.213 V10.1.0, "3rd Generation Partnership Project; Technical Specification Group Radio Access Network; Evolved Universal Terrestrial Radio Access (E-UTRA); Physical Layer Procedures (Release 10)", Mar. 2011.
3GPP TS 36.211 V10.1.0, "3rd Generation Partnership Project; Technical Specification Group Radio Access Network; Evolved Universal Terrestrial Radio Access (E-UTRA); Physical Channels and Modulation (Release 10)", Mar. 2011.
LTE for 4G Mobile Broadband; Air Interface Technologies and Performance, Farooq Khan, Cambridge University Press, 2009, section 14.3.2.
3GPP document R1-091925, "Evaluation of transmit diversity for PUCCH in LTE-A", Nortel, May 4-8, 2009, San Francisco, USA.
3GPP document R1-092065, "PUCCH Transmit Diversity", Qualcomm Europe, May 4-8, 2009, San Francisco, USA.
3GPP document R1-105087, Huawei, "Description of Modified SORTD", 3GPP TSG RAN WG1 #62, Aug. 2010.
3GPP document R1-104452, Nokia, Nokia Siemens Networks, "On transmission diversity for multi-A/N signaling", 3GPP TSG RAN WG1 #62, Aug. 2010.
3GPP document R1-105715, Research in Motion, "Transmit Diversity for Channel Selection", 3GPP TSG RAN WG1 #62bis, Oct. 11-15, 2010.
PCT application No. PCT/US2011/053882, International Search Report and Written Opinion of the International Searching Authority dated May 4, 2012.
R1-104643, "Resource Allocation for UL ACK/NACK", 3GPP TSG-RAN WG1, #62, Aug. 23-27, 2010 (in particular, section 2).
PCT application No. PCT/US2012/045818, International Search Report and Written Opinion of the International Searching Authority, mailed Oct. 16, 2012.
Notice of Allowance issued in U.S. Appl. No. 13/467,277 on Mar. 28, 2014.
International Preliminary Report on Patentability under Chapter I issued in International Application No. PCT/US2012/045810 on Feb. 20, 2014; 8 pages.
International Preliminary Report on Patentability under Chapter I issued in International Application No. PCT/US2012/045818 on Feb. 20, 2014; 8 pages.
Office Action issued in U.S. Appl. No. 13/467,277 on Dec. 4, 2013.
"3GPP document R1-105665, LG Electronics, "Transmit Diversity for Pucch Channel Selection", 3GPP TSG RANWG1 #62bis, Oct. 11-15, 2010.".
3GPP document R1-115715, Research in Motion, UK Limited, "Transmit Diversity for Channel Selection", 3GPP TSG RAN WG1 Meeting #62bis, Xi'an, China, Oct. 11-15, 2010.
3GPP document R1-113240, Research in Motion, UK Limited, "Further Discussion on PDCCH Enhancement in CA", 3GPP TSG RAN WG1 #66bis, Zhuhai, China, Oct. 10-14, 2011.
3GPP TS 36.213 V10.1.0, "3rd Generation Partnership Project; Technical Specification Group Radio Access Network; Evolved Universal Terrestrial Radio Access (E-UTRA); Physical Layer Procedures (Release 10)," Mar. 2011.
3GPP TS 36.213, "3rd Generation Partnership Project; Technical Specification Group Radio Access Network; Evolved Universal Terrestrial Radio Access (E-UTRA); Physical Layer Procedures (Release 8)", V8.8.0 (Sep. 2009).
3GPP TS 36.212, "3rd Generation Partnership Project; Technical Specification Group Radio Access Network; Evolved Universal Terrestrial Radio Access (E-UTRA); Multiplexing and channel coding (Release 10)", Mar. 2011.
"LTE for 4G Mobile Broadband; Air Interface Technologies and Performance, Farooq Khan, Cambridge UniversityPress, 2009, section 14.3.2".
R1-104643, "Resource Allocation for UL ACK/NACK", 3GPP TSG-RAN WG1, #62, Aug. 23-27, 2010, in particular section 2.
"3GPP document R1-113077, Samsung, ""Transmit diversity for PUCCH format 1b with channel selection""", 3GPP TSGRAN WG1 #67, Zhuhai, China, Oct. 10-14, 2011".
PCT application No. PCT/US2012/045810, International Search Report and Written Opinion of the International Searching Authority, mailed Oct. 1, 2012.
PCT application No. PCT/US2011/053882, International Search Report and Written Opinion of the International Searching Authority, mailed May 4, 2012.
International Search Report and Written Opinion of the International Searching Authority issued in International Application No. PCT/US2012/050411 on Oct. 16, 2012; 7 pages.
PCT application No. PCT/US2012/50415, International Search Report and Written Opinion of the International Searching Authority, mailed Nov. 19, 2012.
Office Action issued in U.S. Appl. No. 13/248,638 on Oct. 21, 2013; 5 pages.
Office Action issued in U.S. Appl. No. 13/527,017 on Nov. 25, 2013; 29 pages.
International Preliminary Report on Patentability under Chapter I issued in International Application No. PCT/US2012/050411 on Feb. 20, 2014; 6 pages.
International Preliminary Report on Patentability under Chapter I issued in International Application No. PCT/US2011/053882 on Apr. 11, 2013; 7 pages.
Office Action issued in U.S. Appl. No. 13/527,017 on Jun. 4, 2014.
International Preliminary Report on Patentability under Chapter I issued in International Application No. PCT/US2012/050415 on Feb. 20, 2014; 6 pages.

* cited by examiner

ORTHOGONAL RESOURCE SELECTION TRANSMIT DIVERSITY AND RESOURCE ASSIGNMENT

CROSS-REFERENCE TO RELATED APPLICATIONS

This application is a non-provisional of U.S. Provisional Patent Application No. 61/522,434, filed Aug. 11, 2011; U.S. Provisional Patent Application No. 61/541,848, filed Sep. 30, 2011; U.S. Provisional Patent Application No. 61/555,572, filed Nov. 4, 2011; and U.S. Provisional Patent Application No. 61/590,262, filed Jan. 24, 2012. This application is also related to U.S. patent application Ser. No. 13/248,638, filed Sep. 29, 2011; and U.S. patent application Ser. No. 13/248,602, filed Sep. 29, 2011. The disclosures of U.S. Provisional Patent Application No. 61/522,434; U.S. Provisional Patent Application No. 61/541,848; U.S. Provisional Patent Application No. 61/555,572; and U.S. Provisional Patent Application No. 61/590,262 are incorporated herein by reference in their entireties.

FIELD

The present disclosure is directed in general to communication systems and methods for operating same. In one aspect, the present disclosure relates to systems and methods for orthogonal resource selection transmit diversity and resource assignment.

BACKGROUND

Because the Long-Term Evolution (LTE) Standard Release 8 (hereinafter "Rel-8") frame structure 2 (time-division duplex [TDD]) may have many more downlink subframes than uplink subframes and because each of the downlink subframes carries up to two transport blocks, Rel-8 TDD supports transmission of up to 4 Ack/Nack (A/N) bits in a subframe. If more than 4 A/N bits are required, the spatial bundling in which two Ack/Nack bits of the same downlink subframe are bundled is supported. These 4 Ack/Nack bits can be transmitted using channel selection. More recently, LTE Release 10 (hereinafter "Rd-10") uses channel selection for up to 4 Ack/Nack bits to support carrier aggregation for both frame structures, i.e., frequency division duplex (FDD) and TDD. Therefore, the use of channel selection for Ack/Nack feedback is of growing interest.

Ack/Nack bits are carried in LTE, using physical uplink control channel (PUCCH) format "1a" and "1b" on PUCCH resources, as described below. Because no more than 2 bits can be carried in these PUCCH formats, 2 extra information bits are needed for carrying 4 Ack/Nack bits. These extra two bits can be conveyed through channel selection.

A user equipment (UE), sometimes hereinafter referred to as a "client node," encodes information using channel selection by selecting a PUCCH resource to transmit on. Channel selection uses 4 PUCCH resources to convey these two bits. This can be described using the data in Table 1 below:

Each column of the table indicates a combination of Ack/Nack bits (or a "codeword") to be transmitted. Each row of the table represents a PUCCH resource. Each cell contains a QPSK symbol transmitted on the PUCCH resource to indicate the codeword. The "DRes" column indicates which PUCCH resource carries the QPSK symbol, and the "RRes" column indicates the PUCCH resource used to carry the reference symbol. It is noted that the data and reference symbol resources are the same for Rel-8 channel selection. Note that each column of the table contains only one non-zero entry, since channel selection requires that only one resource is transmitted upon at a time on one transmission path. Transmitting on one transmission path maintains the good peak to average power characteristics of the signals carried on the PUCCH. The term "transmission path" refers to an RF chain that contains at least one power amplifier and is connected to one antenna.

For example, when Ack/Nack bits '0110' are to be transmitted, the UE can transmit the QPSK data symbol '−j' using PUCCH resource '1.' The reference signal transmission can also be on PUCCH resource '1'.

LTE carries Ack/Nack signaling on format 1a and 1b of the physical uplink control channel (PUCCH), as specified in Rel 10. An example of the subframe structure of PUCCH formats 1a and 1b with normal cyclic prefix is shown in FIG. 1. Each format 1a/1b PUCCH can be in a subframe made up of two slots. The same modulation symbol "d" can be used in both slots. Without channel selection, formats 1a and 1b set carries one and two Ack/Nack bits, respectively. These bits are encoded into the modulation symbol "d," using BPSK or QPSK modulation, depending on whether one or two Ack/Nack bits are used.

Each data modulation symbol, d, is spread with a sequence, $r_{u,v}^{\alpha}(n)$ such that it is by a 12 samples long, which is the number of subcarriers in an LTE resource block in most cases. (For example, those of skill in the art will understand that a Multimedia Broadcast multicast service Single Frequency Network (MBSFN) transmission can use 24 subcarriers in a resource block when the subcarriers are spaced 7.5 kHz apart.). Next, the spread samples are mapped to the 12 subcarriers the PUCCH is to occupy and then converted to the time domain with an IDFT. Since the PUCCH is rarely transmitted simultaneously with other physical channels in LTE, the subcarriers that do not correspond to PUCCH are set to zero. Four replicas of the spread signal are then each multiplied with one element of an orthogonal cover sequence $w_p(m)$, where $m \in \{0,1,2,3\}$ corresponds to each one of 4 data bearing OFDM symbols in the slot. There are 3 reference symbols (R1, R2, and R3) in each slot that allow channel estimation for coherent demodulation of formats 1a/1b.

There can be 12 orthogonal spreading sequences (corresponding to $r_{u,v}^{\alpha}(i)$ with $\alpha \in \{0, 1, \ldots, 11\}$ indicating the cyclic shift) and one of them is used to spread each data symbol. Furthermore, in Rel-8, there are 3 orthogonal cover

TABLE 1

PUCCH format 1b channel selection

Codewords 0 to 15

| RRes | DRes | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|---|
| 0 | 0 | 1 | j | −j | −1 | 0 | 0 | 0 | 0 | 0 | 0 | 0 | 0 | 0 | 0 | 0 | 0 |
| 1 | 1 | 0 | 0 | 0 | 0 | 1 | j | −j | −1 | 0 | 0 | 0 | 0 | 0 | 0 | 0 | 0 |
| 2 | 2 | 0 | 0 | 0 | 0 | 0 | 0 | 0 | 0 | 1 | j | −j | −1 | 0 | 0 | 0 | 0 |
| 3 | 3 | 0 | 0 | 0 | 0 | 0 | 0 | 0 | 0 | 0 | 0 | 0 | 0 | 1 | j | −j | −1 | sequences $w_p(m)$ with $p \in \{0,1,2\}$ and $m \in \{0,1,2,3\}$. Each spreading sequence is used with one of the orthogonal cover sequences to form an orthogonal resource. Therefore, up to 12*3=36 orthogonal resources are available per each resource block of the PUCCH. The total amount of resources that can carry Ack/Nack is then 36 times the number of resource blocks (RBs) allocated for format 1/1a/1b.

Each orthogonal resource can carry one Ack/Nack modulation symbol "d," and, therefore, up to 36 UEs may transmit an Ack/Nack symbol on the same OFDM resource elements without mutually interfering. Similarly, when distinct orthogonal resources are transmitted from multiple antennas by a UE, they will tend to not interfere with each other, or with different orthogonal resources transmitted from other UEs. When there is no channel selection, the orthogonal resource used by the UE is known by the eNB. As discussed below, in case of channel selection, a predetermined set of the information bits determines the orthogonal resource to be utilized. The eNB detects that set of the information bits by recognizing what orthogonal resource is carrying other information bits.

Orthogonal resources used for reference symbols are generated in a similar manner as data symbols. They are also generated using a cyclic shift and an orthogonal cover sequence applied to multiple reference signal uplink modulation symbols. Because there are a different number of reference and data modulation symbols in a slot, the orthogonal cover sequences are different length for data and for reference signals. Nevertheless, there are an equal number of orthogonal resources available for data and for reference signals. Therefore, a single index can be used to refer to the two orthogonal resources used by a UE for both the data and reference signals, and this has been used since Rel-8. This index is signaled in Rel-8 as a PUCCH resource index, and is indicated in the LTE specifications as the variable $n_{PUCCH}^{(1)}$. The aforementioned LTE specifications include: (1) 3GPP TS 36.213 V10.1.0, "3rd Generation Partnership Project; Technical Specification Group Radio Access Network; Evolved Universal Terrestrial Radio Access (E-UTRA); Physical Layer Procedures (Release 10)", March, 2011; (hereinafter "Reference 1") and (2) 3GPP TS 36.211 V10.1.0, "3rd Generation Partnership Project; Technical Specification Group Radio Access Network; Evolved Universal Terrestrial Radio Access (E-UTRA); Physical Channels and Modulation (Release 10)", March, 2011. (hereinafter "Reference 2"). This index indicates both the RB and the orthogonal resource used to carry data and reference signals, and the indexed resource is therefore referred to as a 'PUCCH resource' in 3GPP parlance.

One cyclic shift may be used to transmit all symbols in a slot (including both data and reference symbols) associated with an antenna. In this case, the value of a is constant over the slot. However, LTE Rel-8 also supports cyclic shift hopping, where a varies over the slot. Cyclic shift hopping transmissions are synchronized within a cell such that UEs following the cell-specific hopping pattern do not mutually interfere. If neighbor cells also use cyclic shift hopping, then for each symbol in a slot, different UEs in the neighbor cells will tend to interfere with a UE in a serving cell. This provides an "interference averaging" behavior that can mitigate the case where one or a small number of neighbor cell UEs strongly interfere with a UE in the serving cell. Because the same number of non-mutually interfering PUCCH resources are available in a cell regardless of whether cyclic shift hopping is used, PUCCH resource can be treated equivalently for the hopping and non-hopping cases. Therefore, hereinafter when reference is made to a PUCCH resource, it may be either hopped or non-hopped.

The PUCCH format 1a/1b structure shown in FIG. 1 varies, depending on a few special cases. One variant of the structure that is important to some Tx diversity designs for format 1a/1b is that the last symbol of slot 1 may be dropped (not transmitted), in order to not interfere with SRS transmissions from other UEs.

In LTE Rel-10, carrier aggregation up to 4 Ack/Nack bits may be indicated using channel selection. The PUCCH resource that a UE is to use may be signaled using a combination of implicit and explicit signaling. In this case, one or more resources are signaled implicitly using the location of the scheduling grant for the UE on the PDCCH of its primary cell (PCell), and one or more resources may be indicated using the Ack/Nack resource indicator (ARI) bits contained in the grant for the UE on the PDCCH of one of the UE's secondary cells (SCells). This is shown in FIG. 2. While it is not shown in FIG. 2, those of skill in the art will understand that it is also possible for all PUCCH resources to be allocated with implicit signaling. This occurs when a PDCCH scheduling PDSCH on SCell is transmitted on PCell with cross carrier scheduling.

UEs may be scheduled on a set of control channel elements (CCEs) that are specific to that UE only. This is indicated in FIG. 2 as the UE Specific Search Space (UESS). The UE Specific Search Space is normally different in each subframe.

LTE PUCCH resources can be implicitly signaled by the index of the first CCE occupied by the grant transmitted to the UE on the PCell PDCCH (labeled $n_{CCE,i}=M$ in FIG. 2). Up to two PUCCH resources may be determined this way in Rel-10. When two resources are implicitly signaled, the second PUCCH resource index is calculated using the next CCE after the first CCE detected by the UE (i.e., $n_{CCE,i}=M+1$, as shown in the figure). As discussed in section 10.1 of 3GPP TS 36.213 V10.1.0, "3rd Generation Partnership Project; Technical Specification Group Radio Access Network; Evolved Universal Terrestrial Radio Access (E-UTRA); Physical Layer Procedures (Release 10)", March, 2011, the first and second implicit PUCCH resource indices are mapped from the first CCE index using $n_{PUCCH,i}^{(1)}=n_{CCE,i}+N_{PUCCH}^{(1)}$ and $n_{PUCCH,i+1}^{(1)}=n_{CCE,i}+1+N_{PUCCH}^{(1)}$, respectively, and so they are adjacent resources. Due to the way PUCCH resources are indexed in LTE, this means that they will typically share the same PUCCH physical resource block (PRB) unless one of the two resources is near the first or the last resource in a PRB.

Because the UE Specific Search Space varies subframe by subframe, the PUCCH resource mapped to by its CCEs also varies. Therefore, the implicit resource can be in multiple different RBs depending on the subframe.

In LTE Rel-10, two bits of the PDCCH on the SCell are used as ARI bits. Also, up to two PUCCH resources are indicated by PDCCH of the SCell. This means that 4 combinations of PUCCH resources are indicated by ARI, and each combination comprises one or two PUCCH resources.

In contrast to implicit signaling, explicit PUCCH resources (of which one is addressed by the ARI) are semi-statically allocated to each UE, and therefore do not move between PUCCH RBs unless the UE is reconfigured using higher layer signaling. Since implicitly signaled PUCCH resource occupies different RBs on a subframe-by-subframe basis, but explicitly signaled PUCCH resource occupies the same RB until the UE is reconfigured, the explicit and implicit PUCCH resources will commonly not be in the same PUCCH RB.

The pairs of explicit resources corresponding to each Ack/Nack Resource Indicator (ARI) state are independently signaled such that they can be positioned anywhere in the PUCCH resource. This can be implemented using the RRC signaling of PUCCH-Config information elements as disclosed in section 6.3.2 of 3GPP TS 36.331 V10.1.0, "3rd Generation Partnership Project; Technical Specification Group Radio Access Network; Evolved Universal Terrestrial Radio Access (E-UTRA); Radio Resource Control (RRC); Protocol specification (Release 10)," March, 2011. This means that the PUCCH resources can be, but are not necessarily, configured to be in the same PRB.

Space Time Resource Selection Diversity (STRSD) codes can encode part of their information by selecting the PUCCH resource used for the reference signal. This means that the data bearing OFDM symbols and reference signal bearing OFDM symbols can be in different PUCCH resource blocks. (This is not possible in LTE Rel-8, since the reference signal and data are always on the same PUCCH resource.) If the reference signal resource is in a different RB than the data resource, it can travel through a channel with a different response than the channel the data travels through. In that case, the reference signal may not allow good channel estimation for the data, leading to much higher error rates and poorer performance.

DETAILED DESCRIPTION

Figure 1:
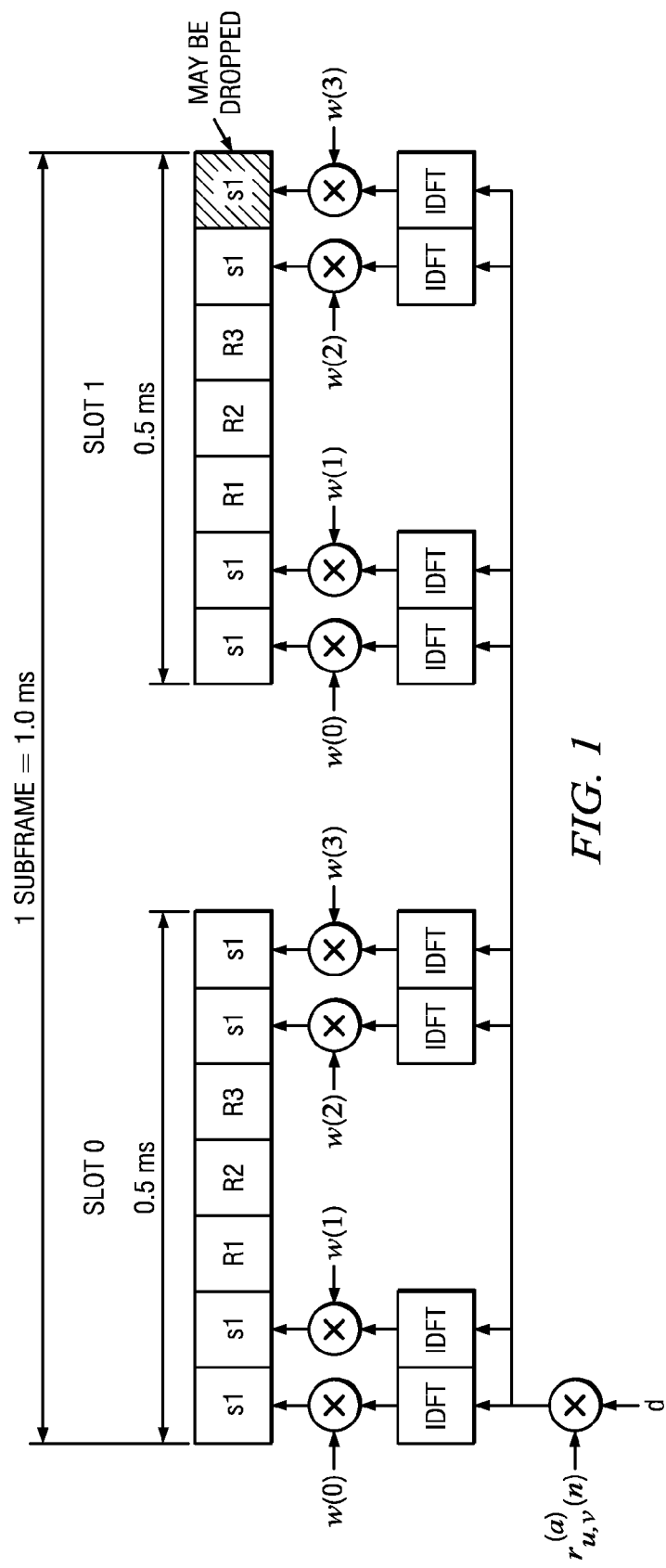
FIG. 1 is an illustration of a conventional subframe having the structure of PUCCH formats 1a and 1b with normal cyclic prefix.
Figure 2:
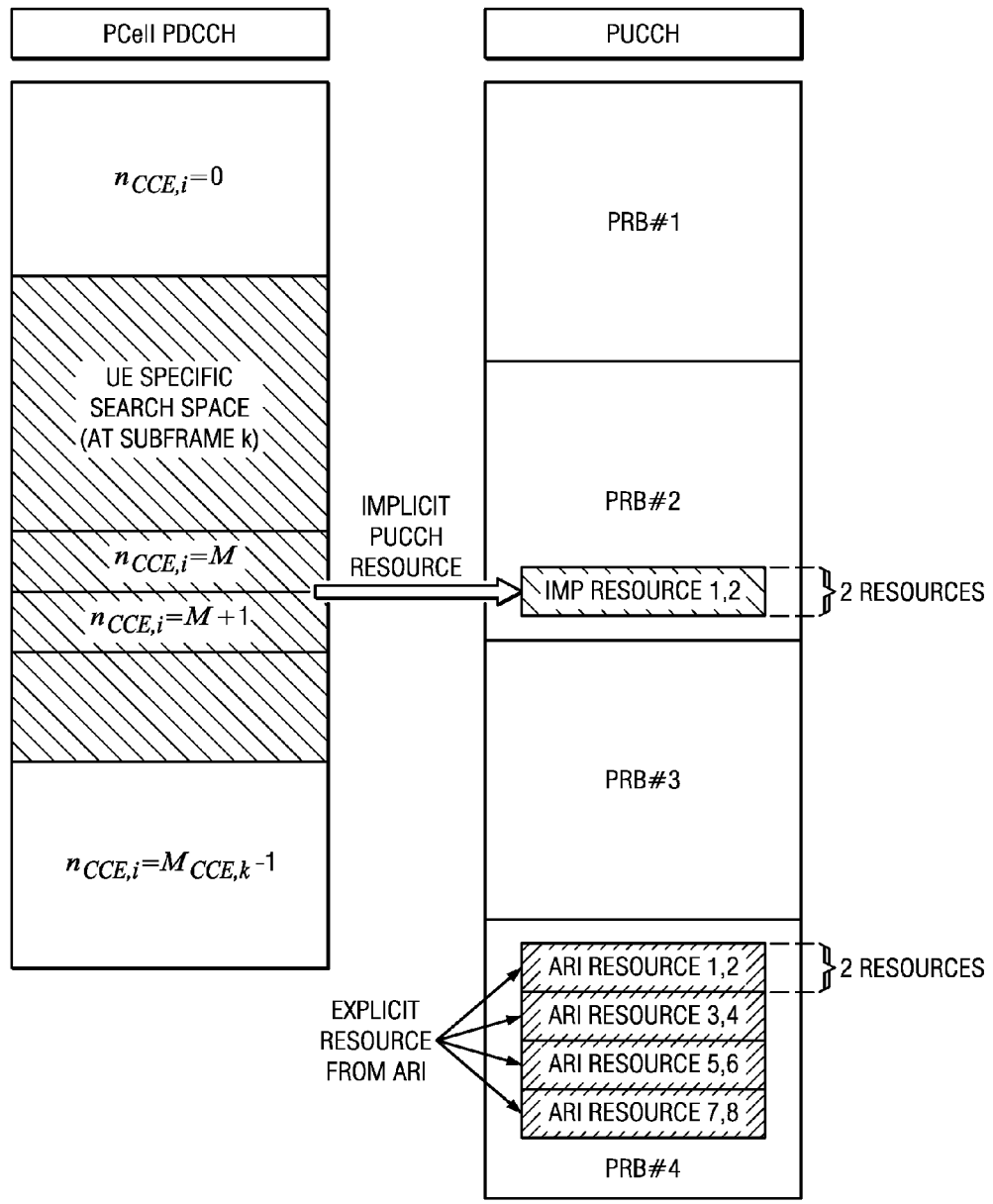
FIG. 2 is an illustration of conventional explicit and implicit signaling for designating PUCCH for use by a user equipment device.

Various illustrative embodiments of the present disclosure will now be described in detail with reference to the accompanying figures. While various details are set forth in the following description, it will be appreciated that the present embodiments may be practiced without these specific details, and that numerous implementation-specific decisions may be made to the embodiments described herein to achieve the inventor's specific goals, such as compliance with process technology or design-related constraints, which may vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present embodiments. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process running on a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

In the present disclosure, various abbreviations are used and defined in the text of this disclosure or in the Appendix at the end of this disclosure. However, if there is an abbreviation not defined in the disclosure, the definition of the abbreviation can be readily found in 3GPP LTE standard specifications.

Overview of Wireless Communication Network

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, radio network controllers, home location registers, Gateway GPRS Support Nodes (GGSN), Serving GPRS Support Nodes (SGSN), Serving Gateways (S-GW), and Packet Data Network Gateways (PDN-GW).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment.

Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

Figure 3:
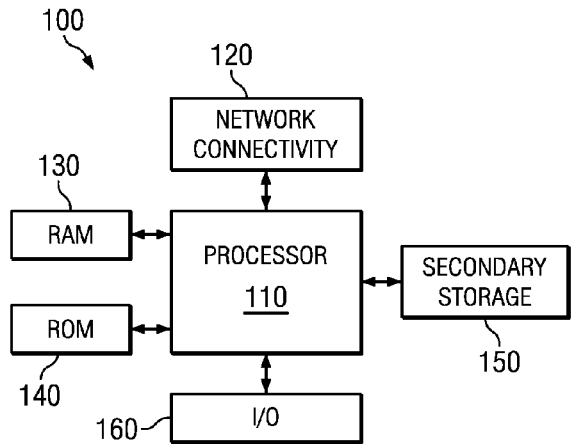
FIG. 3 is an illustration of a communication system for implementing one or more of embodiments disclosed herein.

FIG. 3 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 3.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 3 may likewise be used to store instructions and data that is read during execution of the instructions. The secondary storage 150 is typically comprised of one or more disk drives or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 4:
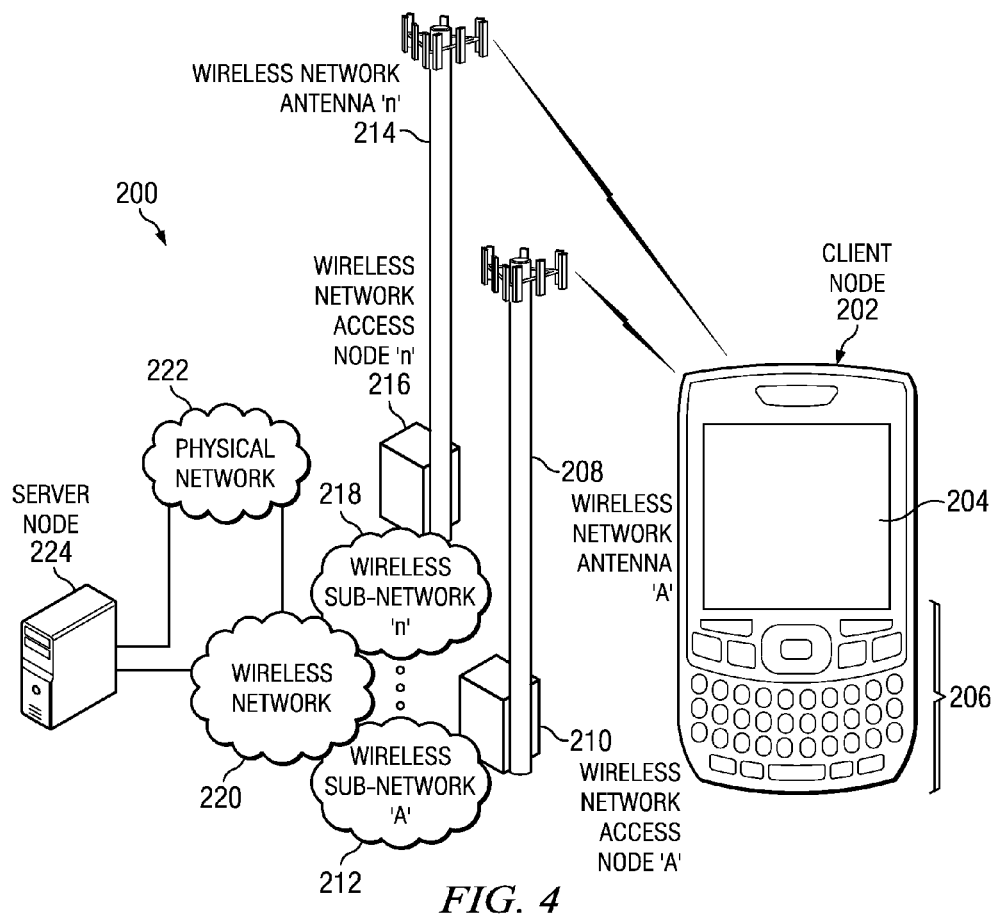
FIG. 4 shows a wireless-enabled communications environment including an embodiment of a client node as implemented in accordance with various embodiments of the disclosure.

FIG. 4 shows a wireless-enabled communications environment including an embodiment of a client node as implemented in an embodiment. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 4, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless network 212. Skilled practitioners of the art will recognize that many such embodiments are possible and the foregoing is not intended to limit the spirit, scope, or intention of the disclosure.

Figure 5:
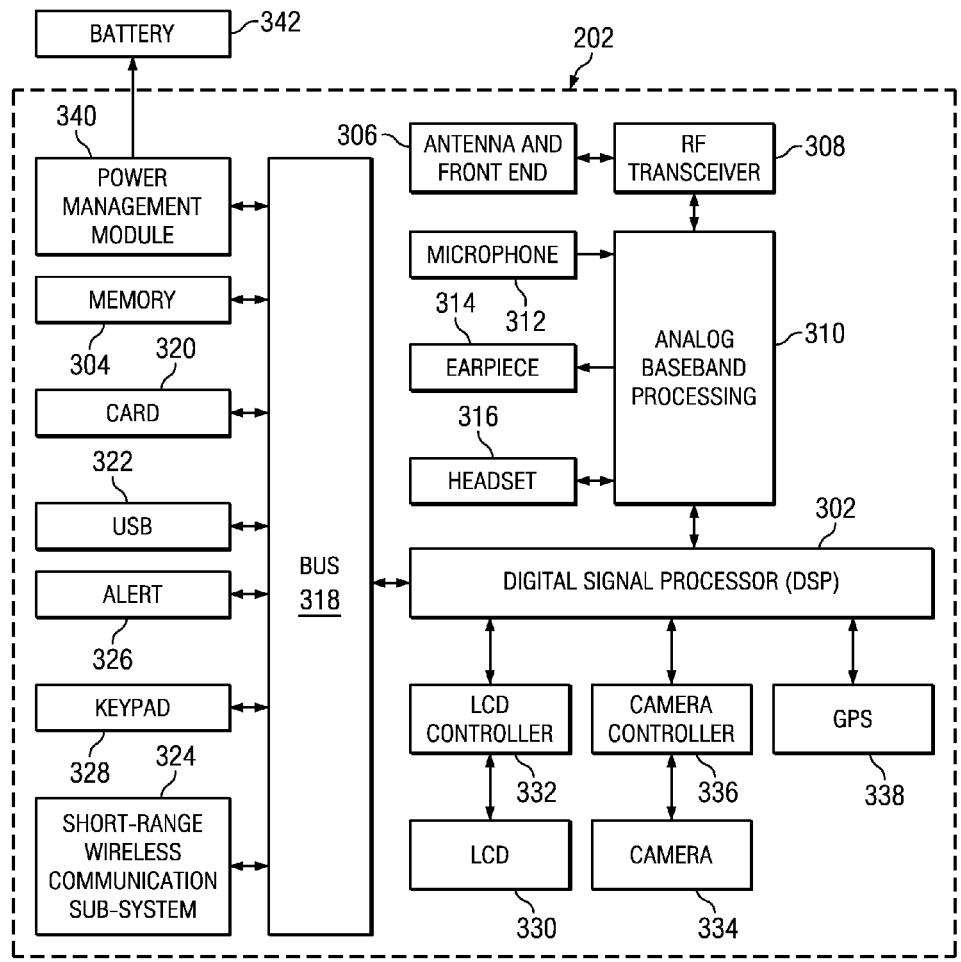
FIG. 5 is a block diagram of an exemplary client node as implemented with a digital signal processor (DSP) in accordance with embodiments of the disclosure.

FIG. 5 depicts a block diagram of an exemplary client node as implemented with a digital signal processor (DSP) in accordance with one embodiment. While various components of a client node 202 are depicted, various embodiments of the client node 202 may include a subset of the listed components or additional components not listed. As shown in FIG. 5, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication subsystem 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 306 includes multiple antennas to provide spatial diversity which can be used to overcome difficult channel conditions or to increase channel throughput. As is known to those skilled in the art, multiple antennas may also be used to support beam forming and/or multiple input multiple output (MIMO) operations thereby further improving channel throughput or robustness to difficult channel conditions. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the client node 202 to determine its position. Various other peripherals may also be included to provide additional functions, such as radio and television reception.

Figure 6:
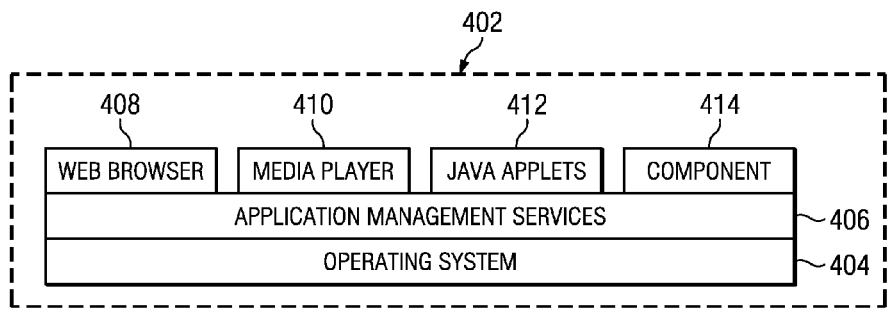
FIG. 6 shows a software environment that may be implemented by a digital signal processor (DSP) in accordance with embodiments of the disclosure.

FIG. 6 illustrates a software environment 402 that may be implemented by a digital signal processor (DSP). In this embodiment, the DSP 302 shown in FIG. 5 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 6 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. A component 414 may provide functionality described herein. In various embodiments, the client node 202, the wireless network nodes 'A' 210 through 'n' 216, and the server node 224 shown in FIG. 4 may likewise include a processing component that is capable of executing instructions related to the actions described above.

Orthogonal Resource Selection Transmit Diversity and Resource Assignment

As discussed above, it is likely that PUCCH resources indicated on PCell will be in different PUCCH RBs than those indicated on SCell. Therefore, solutions are needed that ensure that all PUCCH resources carried on an antenna are in the same RB, even when the resources allocated for STRSD code are signaled partly using PCell and partly using SCell.

The embodiments disclosed herein address the need for the PUCCH resources of reference symbols and data symbols for a transmit antenna of STRSD codes to be in the same PRB. They can be broken into two classes: (1) those that adjust the STRSD codes to simplify resource allocation with pairs of (rather than all 4) PUCCH resources in the same PRB without altering PUCCH resource allocation methods, and (2) those that do not adjust the STRSD codes, but instead alter the resource allocation or signaling to place the PUCCH resources in the same PRB.

An embodiment of a STRSD code, herein referred to as time-constrained STRSD, is described by Table 2, shown below, including a candidate mapping to Ack/Nack bit states. Table 2 was disclosed by U.S. Provisional Patent Application No. 61/388,982 filed Oct. 1, 2010, the disclosure of which is incorporated herein by reference in its entirety. In Table 2, the combinations of Ack/Nack bits are indicated by the rows. In addition, the PUCCH resources used for data or reference symbols are indicated by the columns. Further, the data symbols transmitted are indicated in the cell at the intersection of corresponding rows and columns of the table. An Ack/Nack bit of '1' indicates an Ack, whereas a '0' indicates either a 'Nack' or that the PDCCH corresponding to the transport block was not received (a discontinuous transmission 'DTX'). The antenna ports are listed in two sets of columns. Since it can be assumed that transmitted data symbols may be different across the slots, each antenna is labeled with a symbol pair (where the first and second listed symbols correspond to the first and second slots, respectively) for each Ack/Nack bit combination as shown in the table. For concreteness, it can be assumed that the QPSK symbols correspond to s0, s1, s2, and s3, are 1, j, −j, and −1, respectively. The PUCCH resource used for the reference signal of an Ack/Nack bit combination is indicated with an 'r' in the cell at the intersection of the column corresponding to the resource and the row corresponding to the Ack/Nack bits. Since it can be assumed that the PUCCH resource used for the reference signals does not vary between slots, only one 'r' is needed per antenna on a row.

For example, if the Ack/Nack codeword '1001' is to be transmitted, on the first antenna the reference signal will be transmitted on PUCCH resource 0 (labeled 'Ch#0') and the data symbols in both slots will be transmitted on PUCCH resource 3 using symbol s1; (which corresponds to 'j'). On the second antenna, the reference symbol is transmitted on PUCCH resource 3 in both slots, whereas the data symbol is transmitted on PUCCH resource 0 in both slots, but has the values 's1' in the first slot and 's0' in the second slot.

TABLE 2

Time constrained STRSD

| A/N bits | | | | Antenna port#0 | | | | Antenna port#1 | | | |
|---|---|---|---|---|---|---|---|---|---|---|---|
| b3 | b2 | b1 | b0 | Ch#0 | Ch#1 | Ch#2 | Ch#3 | Ch#0 | Ch#1 | Ch#2 | Ch#3 |
| 0 | 0 | 0 | 0 | s0, s0, r |  |  |  |  | s2, s2, r |  |  |
| 0 | 0 | 0 | 1 | s1, s1, r |  |  |  |  | s1, s0, r |  |  |
| 0 | 0 | 1 | 0 | s2, s2, r |  |  |  |  | s0, s1, r |  |  |
| 0 | 0 | 1 | 1 | s3, s3, r |  |  |  |  | s3, s3, r |  |  |
| 1 | 1 | 0 | 1 |  | s0, s0 | r |  |  | r | s2, s2 |  |
| 0 | 1 | 0 | 1 |  | s1, s1 | r |  |  | r | s1, s0 |  |
| 0 | 1 | 1 | 0 |  | s2, s2 | r |  |  | r | s0, s1 |  |
| 0 | 1 | 1 | 1 |  | s3, s3 | r |  |  | r | s3, s3 |  |
| 1 | 1 | 1 | 0 | r |  |  | s0, s0 | s2, s2 |  |  | r |
| 1 | 0 | 0 | 1 | r |  |  | s1, s1 | s1, s0 |  |  | r |
| 1 | 0 | 1 | 0 | r |  |  | s2, s2 | s0, s1 |  |  | r |
| 1 | 0 | 1 | 1 | r |  |  | s3, s3 | s3, s3 |  |  | r |
| 1 | 1 | 0 | 0 |  |  | s0, s0, r |  |  |  |  | s2, s2, r |
| 0 | 1 | 0 | 0 |  |  | s1, s1, r |  |  |  |  | s1, s0, r |
| 1 | 0 | 0 | 0 |  |  | s2, s2, r |  |  |  |  | s0, s1, r |
| 1 | 1 | 1 | 1 |  |  | s3, s3, r |  |  |  |  | s3, s3, r |

The code design assumes that PUCCH resources 0 and 1 (Ch#0 and Ch#1) are signaled on the primary cell (PCell), and PUCCH resources 2 and 3 (Ch#2 and Ch#3) are signaled on a secondary cell (SCell), which is in line with the resource allocation in the channel selection specified in Rel-10 as described in Section 2.3. Note that this is done so that if a grant on either PCell or SCell is missed, the UE can still transmit Ack or Nack for the cell it did receive PDCCH on. Note that if no PDCCH is received, the UE does not transmit on any resource. Also, if (b0,b1,b2,b3)=(0,0,0,0) and PDCCH for PCell is not received (it is DTX), and if the SCell contains only Nacks, the UE will not transmit on any resource.

Examining Table 2, it can be seen that for a given antenna, some combinations of Ack/Nack bits have the reference signal in a PUCCH resource signaled on a different cell than the data symbol resource. For example, on antenna port #0, Ack/Nack word '1001' uses resource 0 for the reference signal and resource 3 for the data. This means that it can potentially be in a different PRB, since the PUCCH resource indicated on PCell and on SCell can be in different PRBs.

Rel-10 LTE uses signaling where the implicitly signaled PUCCH resources are not constrained to be in the same RB as those signaled explicitly via ARI. When time constrained STRSD is used with this Rel-10 signaling, the eNB can schedule UEs only in subframes when their implicit and explicit PUCCH resources land in the same RB. If only 1 RB is used for format 1b PUCCH transmission, the UE may be scheduled in any subframe. However, if M>1 RBs are used to carry format 1b PUCCH, the scheduler may only be able to schedule a UE on average once out of M subframes (in the subframes where the implicit and explicit resource is in the same RB).

Another example STRSD scheme, herein referred to as time varying STRSD is a more general code. It is shown in Table 3, along with a candidate mapping to Ack/Nack bit states. Table 3 was disclosed by U.S. Provisional Patent Application No. 61/443,525, filed Feb. 16, 2011, the disclosure of which is incorporated herein by reference in its entirety. It varies the resource used for reference signals across slots, as well as for data on both antennas. While varying more across slots improves the performance relative to time constrained STRSD, it also increases the complexity of the code and the eNB receiver (especially due to the variation of the reference signals). Since the performance improvement is on the order of a few tenths dB in typical urban channels, it may be desirable in some scenarios to use a simpler code.

efit of STRSD in that they do not use more than 4 PUCCH resources to signal 4 Ack/Nack bits. These two proposals are Modified SORTD and space code block coding (SCBC), and they are shown in Tables 4 and 5 below. STRSD codes are similar to modified SORTD in the sense that 4 different pairs of channels are used by different codewords. Also, in both STRSD and SCBC, the resource for a reference symbol is not always the same as that used for the corresponding data symbol. However, STSRD is more general than the other two codes in that it also allows the symbols to vary between slots on the second antenna, and because the reference symbols' orthogonal resources vary with the Ack/Nack bits in a different manner than how the data orthogonal resources vary. In fact, it can be seen in Table 4 and Table 5 that the reference symbols' orthogonal resources do not vary at all with the

TABLE 3

Time varying STRSD code

| A/N bits | | | | Slot #0 | | | | | | | | Slot #1 | | | | | | | |
| --- | --- | --- | --- | --- | --- | --- | --- | --- | --- | --- | --- | --- | --- | --- | --- | --- | --- | --- | --- |
| | | | | Antenna port#0 | | | | Antenna port#1 | | | | Antenna port #0 | | | | Antenna port #1 | | | |
| b3 | b2 | b1 | b0 | Ch0 | Ch1 | Ch2 | Ch3 | Ch0 | Ch1 | Ch2 | Ch3 | Ch0 | Ch1 | Ch2 | Ch3 | Ch0 | Ch1 | Ch2 | Ch3 |
| 0 | 0 | 0 | 0 | s0, r | | | | | | s2, r | | s0, r | | | | | | s2, r | |
| 0 | 0 | 0 | 1 | s1, r | | | | | | s1, r | | s1, r | | | | | | s0, r | |
| 0 | 0 | 1 | 0 | s3, r | | | | | | s3, r | | s3, r | | | | | | s3, r | |
| 0 | 0 | 1 | 1 | s2, r | | | | | | s0, r | | s2, r | | | | | | s1, r | |
| 1 | 1 | 0 | 1 | s0 | r | | | | | | s2, r | s0 | r | | | | | | s2, r |
| 0 | 1 | 0 | 1 | s1 | r | | | | | | s1, r | s1 | r | | | | | | s0, r |
| 1 | 0 | 0 | 0 | s3 | r | | | | | | s3, r | s3 | r | | | | | | s3, r |
| 1 | 1 | 1 | 1 | s2 | r | | | | | s0, r | s1, r | s2 | r | | | | | | s1, r |
| 1 | 1 | 1 | 0 | | s0, r | | | | s2 | r | | | r | s0 | | | r | s2 | |
| 1 | 0 | 0 | 1 | | s1, r | | | | s1 | r | | | r | s1 | | | r | s0 | |
| 1 | 0 | 1 | 0 | | s3, r | | | | s3 | r | | | r | s3 | | | r | s3 | |
| 1 | 0 | 1 | 1 | | s2, r | | | | s0 | r | | | r | s2 | | | r | s1 | |
| 1 | 1 | 0 | 0 | r | s0 | | | | r | s2 | | s0, r | | | | s2 | r | | |
| 0 | 1 | 0 | 0 | r | s1 | | | | r | s1 | | s1, r | | | | s0 | r | | |
| 1 | 1 | 1 | 0 | r | s3 | | | | r | s3 | | s3, r | | | | s3 | r | | |
| 0 | 1 | 1 | 1 | r | s2 | | | | r | s0 | | s2, r | | | | s1 | r | | |

STRSD schemes such as time constrained and time varying STRSD provide substantial reductions in required transmit power without increasing the number of PUCCH resources needed for channel selection. While this disclosure provides resource allocation for channel selection TxD schemes, it is worth mentioning other channel selection TxD codes that have been proposed. Two such proposals have the main ben- Ack/Nack bits. By contrast, reference symbols' orthogonal resources in STRSD codes can vary with the Ack/Nack bits such that the reference symbols and data symbols are on the same orthogonal resource for some states of the A/N bits, but not for other states of the A/N bits. These generalizations allow it to obtain improved performance, typically about 1 dB better than the other codes.

TABLE 4

Modified SORTD

| A/N bits | | | | Antenna port#0 | | | | Antenna port#1 | | | |
| --- | --- | --- | --- | --- | --- | --- | --- | --- | --- | --- | --- |
| b3 | b2 | b1 | b0 | Ch#0 | Ch#1 | Ch#2 | Ch#3 | Ch#0 | Ch#1 | Ch#2 | Ch#3 |
| 0 | 0 | 0 | 0 | s0, s0, r | | | | | r | s0, s0 | |
| 0 | 0 | 0 | 1 | s1, s1, r | | | | | r | s1, s1 | |
| 0 | 0 | 1 | 0 | s2, s2, r | | | | | r | s2, s2 | |
| 0 | 0 | 1 | 1 | s3, s3, r | | | | | r | s3, s3 | |
| 0 | 1 | 0 | 0 | r | s0, s0 | | | s0, s0 | r | | |
| 0 | 1 | 0 | 1 | r | s1, s1 | | | s1, s1 | r | | |
| 0 | 1 | 1 | 0 | r | s2, s2 | | | s2, s2 | r | | |
| 0 | 1 | 1 | 1 | r | s3, s3 | | | s3, s3 | r | | |
| 1 | 0 | 0 | 0 | r | | s0, s0 | | r | | | s0, s0 |
| 1 | 0 | 0 | 1 | r | | s1, s1 | | r | | | s1, s1 |
| 1 | 0 | 1 | 0 | r | | s2, s2 | | r | | | s2, s2 |
| 1 | 0 | 1 | 1 | r | | s3, s3 | | r | | | s3, s3 |

TABLE 4-continued

Modified SORTD

| A/N bits | | | | Antenna port#0 | | | | Antenna port#1 | | | |
|---|---|---|---|---|---|---|---|---|---|---|---|
| b3 | b2 | b1 | b0 | Ch#0 | Ch#1 | Ch#2 | Ch#3 | Ch#0 | Ch#1 | Ch#2 | Ch#3 |
| 1 | 1 | 0 | 0 | r | | | s0, s0 | s0, s0, r | | | |
| 1 | 1 | 0 | 1 | r | | | s1, s1 | s1, s1, r | | | |
| 1 | 1 | 1 | 0 | r | | | s2, s2 | s2, s2, r | | | |
| 1 | 1 | 1 | 1 | r | | | s3, s3 | s3, s3, r | | | |

TABLE 5

SCBC

| A/N bits | | | | Antenna port#0 | | | | Antenna port#1 | | | |
|---|---|---|---|---|---|---|---|---|---|---|---|
| b3 | b2 | b1 | b0 | Ch#0 | Ch#1 | Ch#2 | Ch#3 | Ch#0 | Ch#1 | Ch#2 | Ch#3 |
| 0 | 0 | 0 | 0 | s0, s0, r | | | | s2, s2, r | | | |
| 0 | 0 | 0 | 1 | s1, s1, r | | | | s3, s3, r | | | |
| 0 | 0 | 1 | 0 | s2, s2, r | | | | s0, s0, r | | | |
| 0 | 0 | 1 | 1 | s3, s3, r | | | | s1, s1, r | | | |
| 0 | 1 | 0 | 0 | r | s0, s0 | | | s1, s1 | r | | |
| 0 | 1 | 0 | 1 | r | s1, s1 | | | s0, s0 | r | | |
| 0 | 1 | 1 | 0 | r | s2, s2 | | | s3, s3 | r | | |
| 0 | 1 | 1 | 1 | r | s3, s3 | | | s2, s2 | r | | |
| 1 | 0 | 0 | 0 | r | | s0, s0 | | r | | | s2, s2 |
| 1 | 0 | 0 | 1 | r | | s1, s1 | | r | | | s3, s3 |
| 1 | 0 | 1 | 0 | r | | s2, s2 | | r | | | s0, s0 |
| 1 | 0 | 1 | 1 | r | | s3, s3 | | r | | | s1, s1 |
| 1 | 1 | 0 | 0 | r | | | s0, s0 | r | | s1, s1 | |
| 1 | 1 | 0 | 1 | r | | | s1, s1 | r | | s0, s0 | |
| 1 | 1 | 1 | 0 | r | | | s2, s2 | r | | s3, s3 | |
| 1 | 1 | 1 | 1 | r | | | s3, s3 | r | | s2, s2 | |

The modified STRSD codes of the embodiments above provide that the orthogonal resources used on each antenna are signaled either implicitly from PCell or explicitly from SCell. Resources signaled from a cell are in the same PUCCH PRB, but different cells' resources can be in different PRBs. As a result, resources for data and reference signal on an antenna are in one PUCCH PRB. Furthermore, the codes maintain the properties of earlier STRSD codes: 1) if a PDCCH is missed, the mapping should not use the resource indicated by the missed PDCCH and/or 2) resource for the reference signal can be different across the slots.

Common PRB STRSD Code

In one embodiment, the time constrained STRSD code described above can be altered such that for each antenna, each codeword (or row of the code's table) uses resources signaled from only one of the serving cells. This can be seen in the common PRB STRSD code in Table 6, since in this embodiment resource 0,1 and 2,3 are signaled on PCell and SCell, respectively according to PUCCH resource allocation in the channel selection supported in Rel-10. Each row for either antenna port 0 or 1 only contains one of resource (0,1) or of (2,3). Therefore, when the reference signal is on a different resource than the data (as is the case in the 5$^{th}$ through the 12$^{th}$ rows of the table), the reference signal is always on a resource signaled from the same cell as the data's resource. Since the reference and data resources are signaled from the same cell, given the structure of the implicit and explicit resource signaling, it is relatively easier to ensure that the data and reference share the same PRB. One should also note that this code retains the property of the time constrained STRSD code that allows it to function when PDCCH of either PCell or SCell is missed (DTX). When (b0,b1) or (b2,b3) are (0,0), PDCCH of PCell or SCell may be DTX, respectively. For A/N states '1100', '0100', and '1000', PDCCH of PCell may be DTX and only resources 2 and 3 are needed. Also, for A/N states '0000', '0001', '0010', and '0011', PDCCH of SCell may be DTX and only resources 0 and 1 are needed. In general, there should exist two groups of codewords (each group containing codewords transmitted when either the PCell or SCell is DTX) such that each group uses resources signaled from only one of the cells. Furthermore, in this embodiment, codewords within each group use the same PUCCH resource, and so only differ by the modulation symbols used.

Note that this embodiment and all following embodiments have substantially the same behavior as the example STRSD codes when (b0,b1,b2,b3)=(0,0,0,0). If no PDCCH is received, the UE does not transmit on any resource. Also, if PDCCH for PCell is not received (it is DTX), and if the SCell contains only Nacks, the UE will not transmit on any resource.

TABLE 6

Common PRB STRSD code

| A/N bits | | | | Antenna port #0 | | | | Antenna port #1 | | | |
|---|---|---|---|---|---|---|---|---|---|---|---|
| b3 | b2 | b1 | b0 | Ch #0 | Ch #1 | Ch #2 | Ch #3 | Ch #0 | Ch #1 | Ch #2 | Ch #3 |
| 0 | 0 | 0 | 0 | s0, s0, r | | | | s2, s2, r | | | |
| 0 | 0 | 0 | 1 | s1, s1, r | | | | s1, s0, r | | | |
| 0 | 0 | 1 | 0 | s2, s2, r | | | | s0, s1, r | | | |
| 0 | 0 | 1 | 1 | s3, s3, r | | | | s3, s3, r | | | |
| 1 | 1 | 0 | 1 | r | s0, s0 | | | | | s2, s2 | r |
| 0 | 1 | 0 | 1 | r | s1, s1 | | | | | s1, s0 | r |
| 0 | 1 | 1 | 0 | r | s2, s2 | | | | | s0, s1 | r |
| 0 | 1 | 1 | 1 | r | s3, s3 | | | | | s3, s3 | r |
| 1 | 1 | 1 | 0 | | | r | s0, s0 | s2, s2 | r | | |
| 1 | 0 | 0 | 1 | | | r | s1, s1 | s1, s0 | r | | |
| 1 | 0 | 1 | 0 | | | r | s2, s2 | s0, s1 | r | | |
| 1 | 0 | 1 | 1 | | | r | s3, s3 | s3, s3 | r | | |
| 1 | 1 | 0 | 0 | | s0, s0, r | | | | s2, s2, r | | |
| 0 | 1 | 0 | 0 | | s1, s1, r | | | | s1, s0, r | | |
| 1 | 0 | 0 | 0 | | s2, s2, r | | | | s0, s1, r | | |
| 1 | 1 | 1 | 1 | | s3, s3, r | | | | s3, s3, r | | |

4) The eNB scheduler flexibility is minimally affected. The PUCCH on PCell must be scheduled such that implicit resources 0 and 1 are in the same PRB, and the explicit resources 2 and 3 must also be signaled into the same PRB. However, the implicit and explicit resources need not all be in the same PRB. Furthermore, the UESS or mapping from CCE to PUCCH resources need not be redefined.

Constrained Time Varying Common PRB STRSD

In another embodiment of the disclosure, the time varying STRSD is altered so that when resources 0 and 1 are signaled with PDCCH of PCell and resources 2 and 3 are signaled with PDCCH of SCell, then if PDCCH on the PCell is missed, the UE will be able to transmit on any PUCCH resources indicated by the PDCCH of SCell. The resulting constrained time varying common PRB STRSD code is shown in Table 7. A/N codewords '1100', '0100', and '1000', now use PUCCH resources 2 and 3 only, which are signaled on SCell. Furthermore, the code maintains the property that for each antenna during each slot, each codeword (or row of the table) uses PUCCH resources signaled from PDCCH of only one of the cells. As with the common PRB STRSD code, this can be seen in the table, since PUCCH resources 0,1 and 2,3 are signaled with PDCCH of PCell and SCell, respectively. Each row for each slot for either antenna port 0 or 1 only contains one of resource (0,1) or of (2,3), and again it is relatively easy to ensure that the data and reference share the same PRB even when explicit resource allocation is used.

TABLE 7

Constrained time varying common PRB STRSD code

| A/N bits | | | | Slot #0 | | | | | | | | Slot #1 | | | | | | | |
|---|---|---|---|---|---|---|---|---|---|---|---|---|---|---|---|---|---|---|---|
| | | | | Antenna port #0 | | | | Antenna port #1 | | | | Antenna port #0 | | | | Antenna port #1 | | | |
| b3 | b2 | b1 | b0 | Ch0 | Ch1 | Ch2 | Ch3 | Ch0 | Ch1 | Ch2 | Ch3 | Ch0 | Ch1 | Ch2 | Ch3 | Ch0 | Ch1 | Ch2 | Ch3 |
| 0 | 0 | 0 | 0 | s0, r | | | | s2, r | | | | s0, r | | | | s2, r | | | |
| 0 | 0 | 0 | 1 | s1, r | | | | s1, r | | | | s1, r | | | | s0, r | | | |
| 0 | 0 | 1 | 0 | s3, r | | | | s3, r | | | | s3, r | | | | s3, r | | | |
| 0 | 0 | 1 | 1 | s2, r | | | | s0, r | | | | s2, r | | | | s1, r | | | |
| 1 | 1 | 0 | 1 | s0 | r | | | | | s2, r | | s0 | r | | | | | s2, r | |
| 0 | 1 | 0 | 1 | s1 | r | | | | | s1, r | | s1 | r | | | | | s0, r | |
| 0 | 1 | 1 | 0 | s3 | r | | | | | s3, r | | s3 | r | | | | | s3, r | |
| 0 | 1 | 1 | 1 | s2 | r | | | | | s0, r | | s2 | r | | | | | s1, r | |
| 1 | 1 | 1 | 0 | | s0, r | | r | s2 | | | | | s0 | r | s2, r | | | | |
| 1 | 0 | 0 | 1 | | s1, r | | r | s1 | | | | | s1 | r | s0, r | | | | |
| 1 | 0 | 1 | 0 | | s3, r | | r | s3 | | | | | s3 | r | s3, r | | | | |
| 1 | 0 | 1 | 1 | | s2, r | | r | S0 | | | | | s2 | r | s1, r | | | | |
| 1 | 1 | 0 | 0 | | s0 | r | | | r | s2 | | | r | s0 | | | s2 | r | |
| 0 | 1 | 0 | 0 | | s1 | r | | | r | s1 | | | r | s1 | | | s0 | r | |
| 1 | 0 | 0 | 0 | | s3 | r | | | r | s3 | | | r | s3 | | | s3 | r | |
| 1 | 1 | 1 | 1 | | s2 | r | | | r | s0 | | | r | s2 | | | s1 | r | |

This embodiment provides a number of benefits:

1) Since resources signaled from one cell can be controlled such that they are in the same PRB more easily, the new STRSD code can allow UEs to be scheduled in any subframe when they could not be in time constrained STRSD.

2) The code is simpler than time varying STRSD. Reference signal resource does not vary across slots, nor does the resource used for data symbols.

3) PUCCH resource is implicitly addressed using existing PUCCH resource allocation mechanisms from Rel-8 and Rel-10.

This embodiment has the following benefits:

1) Since the structure is close to time varying STRSD, it is expected to have similar performance advantages over Embodiment #1 to that of time varying STRSD as shown in Table 3.

2) Since resources signaled from one cell can be controlled such that they are in the same PRB more easily, the new STRSD code can allow UEs to be scheduled in any subframe when they could not be in time constrained STRSD.

3) PUCCH resource is implicitly addressed using existing mechanisms from Rel-8 and Rd-10.

4) The eNB scheduler flexibility is minimally affected. The PUCCH on PCell must be scheduled such that implicit resources 0 and 1 are in the same PRB, and the explicit resources 2 and 3 must also be signaled into the same PRB. However, the implicit and explicit resources need not all be in the same PRB. Furthermore, the UESS or mapping from CCE to PUCCH resources need not be redefined.

Aliased PUCCH Resource Mapping

Figure 7:
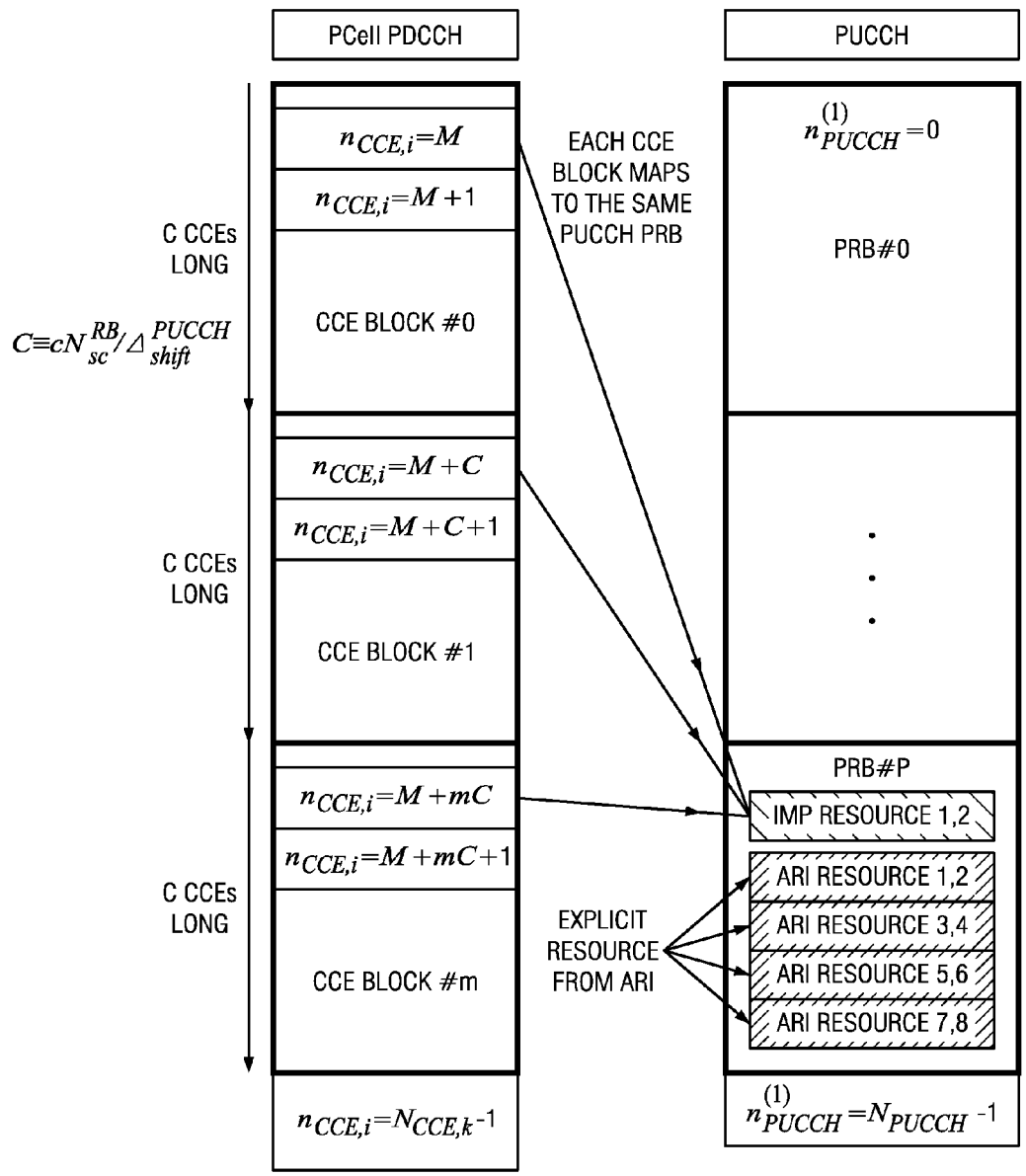
FIG. 7 shows an implementation of aliased PUCCH resource mapping in accordance with embodiments of the disclosure.

Aspects of another embodiment of the disclosure can be understood by referring to FIG. 7 in connection with the discussion below.

Altering the STRSD code may reduce its performance. Therefore, when performance should be maximized, one can consider embodiments that do not impose constraints on the STRSD code's use of PUCCH resource.

This embodiment has the benefit of supporting better performing STRSD codes by constraining the mapping to PUCCH resources. This can in general be done by splitting the PUCCH resource into multiple consecutive ranges, each range containing exactly one PUCCH PRB, and setting the PUCCH resource index to be the sum of a fixed offset and a dynamic offset, as is shown in FIG. 7. The fixed offset adjusts the beginning of a range of PUCCH resource, and the dynamic offset allows the PUCCH resources within the range to be addressed. For a UE, each contiguous block of PDCCH CCEs maps to the same PUCCH PRB, which results in a many to one or 'aliased' PUCCH resource mapping.

One way to express this when the PUCCH resource ranges are of equal size is through Equation 1 below:

$$n_{PUCCH,i}^{(1)} = (n_{CCE,i} + N_{PUCCH}^{(1)}) \bmod(C) + [N_{PUCCH}^{(1)}/C] \quad (1)$$

where: $C = cN_{sc}^{RB}/\Delta_{shift}^{PUCCH}$ and where c, $N_{sc}^{Rb}$, $\Delta_{shift}^{PUCCH}$, and $N_{PUCCH}^{(1)}$ are defined in section 5.4 of 3GPP TS 36.211 V10.1.0, "3rd Generation Partnership Project; Technical Specification Group Radio Access Network; Evolved Universal Terrestrial Radio Access (E-UTRA); Physical Channels and Modulation (Release 10)", March, 2011, and $n_{PUCCH,i}^{(1)}$ is the $i^{th}$ PUCCH resource.

Here, the fixed offset is $[N_{PUCCH}^{(1)}/C]$ and the dynamic offset is $(n_{CCE,i} + N_{PUCCH}^{(1)}) \bmod(C)$, the number of PUCCH resources in a range is C. Since $N_{PUCCH}^{(1)}$ as defined in Rel-8 can address each PUCCH resource in over 50 RBs, and since 50 PUCCH RBs should be more than enough even for 20 MHz (the largest carrier bandwidth defined in LTE Rel-10), its range is large enough such that no additional offset variable or constant is needed in equation 1 above. $N_{PUCCH}^{(1)}$ can be set to offset the PUCCH resource addressed by equation 1 above to the beginning of more than 50 PUCCH PRBs.

The second implicit PUCCH resource is preferably adjacent to the first implicit PUCCH resource, and thus a modification of Equation 1 can be expressed as in Equation 2 below:

$$n_{PUCCH,i+1}^{(1)} = (n_{CCE,i} + N_{PUCCH}^{(1)} + 1) \bmod(C) + [N_{PUCCH}^{(1)}/C] \quad (2)$$

Here, unless the first implicit PUCCH resource, $n_{PUCCH,i}^{(1)}$, is at the end of a PRB, the second PUCCH resource, $n_{PUCCH,i+1}^{(1)}$ will be adjacent to the first. Note that proper selection of $N_{PUCCH}^{(1)}$ allow this to be the case for up to C−1 values of $n_{PUCCH,i}^{(1)}$.

This embodiment has the following benefits:

1) Slight performance improvements are possible by allowing a less constrained STRSD code to be used. Time varying STRSD can be used to provide a couple of tenths dB better Nack to Ack performance at higher Nack to Ack error rates.

2) The UESS need not be redefined. Only the mapping of PUCCH resource is changed.

3) There are few scheduling constraints. The UE's PDCCH can be scheduled on any CCE, so long as it does not map to the same PUCCH resource that another UE's CCE in a different CCE block maps to. Since one out of every $cN_{sc}^{RB}/\Delta_{shift}^{PUCCH}$ that maps to a given PUCCH resource, and since each UE is semi-statically mapped to PUCCH PRBs, this should not impact the scheduler too much.

4) ARI resource selection is unconstrained. Explicit resource pairs for each ARI state can be in different PRBs.

Signaling ARI Resource in Multiple PRBs

Yet another embodiment can be understood by referring to FIG. 8 and the accompanying text below. In this embodiment, the ARI resource pairs are assigned to be in different PUCCH PRBs, but it can still be ensured that each pair is contained within one PRB. This will allow the implicit resource to be in different PRBs, and therefore allow UEs to be scheduled in more PDCCH CCE resources, since their UESS will more often map to implicit resource that is in the same PUCCH PRB as the ARI resource.

Figure 8:
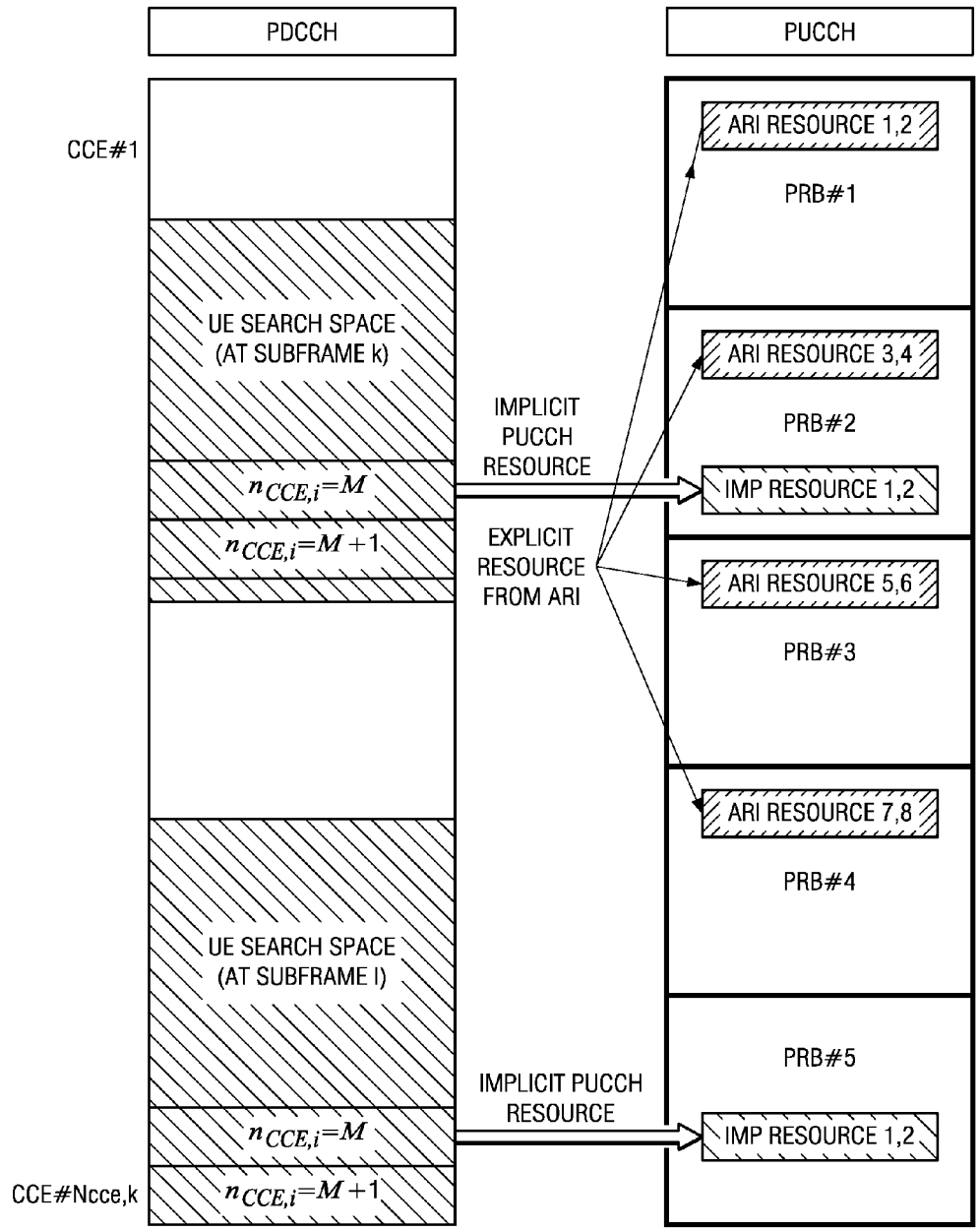
FIG. 8 illustrates the signaling of Ack/Nack Resource Indicator (ARI) resources in multiple physical resource blocks in accordance with embodiments of the disclosure.

FIG. 8 is an example of where 2 ARI bits are used to select among 4 PUCCH resource pairs, and 4 distinct PRBs are indicated. At subframe index k, at least one starting CCE index in the UESS is assumed to have a corresponding PUCCH resource in PRB#2.

This embodiment has the following benefits:

1) There is significantly more scheduling flexibility than the case where the ARI PUCCH are in a single PRB (as is the situation in embodiment #3). Up to N times more CCE locations can be selected when N different PUCCH PRBs are addressed by ARI (i.e., 4 times more in this case).

2) PUCCH resource is implicitly addressed using existing mechanisms from Rel-8 and Rel-10.

3) The UESS need not be redefined.

4) Simple mechanisms are used.

STRSD Code RRC Signaling Robustness and Efficiency

As described above in connection with PUCCH Resource Allocation for Channel Selection in Rel-10 Carrier Aggregation, the explicit resources signaled for ARI can be in the same PRB due to the structure of the resource allocation on PCell and SCell. Therefore, ARI resource allocation for all the embodiments above can be supported using Rel-10 signaling mechanisms. However, it may be desirable to reduce the RRC signaling overhead and to make it more error-proof by constraining the explicit resources to be in the same PRB.

In one embodiment (that is complementary to the above other disclosed embodiments), one of ways to achieve it is to only signal the first explicit PUCCH resource and to use the same rule that is used for the implicit signaling, where the two PUCCH resources are adjacent. This may be expressed as the following, and can be described in the context of the layer 1 (physical layer) specifications of LTE since the dependence of the second resource on the first is not configurable:

$$n_{PUCCH,i+j}^{(1)} = n_{PUCCH,i}^{(1)} + j \quad (3)$$

where $n_{PUCCH,i}^{(1)}$ is the first explicit PUCCH resource, the integer j>0, and $n_{PUCCH,i+j}^{(1)}$, is the $j^{th}$ PUCCH resource determined from the first explicit PUCCH resource.

Note that with equation (3), the network should avoid signaling $n_{PUCCH,i}^{(1)}$ near the end of a PUCCH PRB, since $n_{PUCCH,i+j}^{(1)}$ may be in a different PUCCH PRB. If additional signaling robustness is desired, $n_{PUCCH,i+j}^{(1)}$ can be made to 'wrap around' to the beginning of a PUCCH PRB by using the following equation (used in Embodiment #3) instead:

$$n_{PUCCH,i+j}^{(1)} = (n_{CCE,i} + N_{PUCCH}^{(1)} + j) \bmod(C) + [N_{PUCCH}^{(1)}/C] \quad (4)$$

Since PUCCH resource is addressed using 12 bits in Rel-10, this embodiment can save a significant percentage of the information used to configure PUCCH (the PUCCH-Config information elements). Perhaps more importantly, since STRSD requires the resources to be in the same PRB, this embodiment reduces the fraction of resource combinations with more than one PRB (in equation 3) or completely eliminates them (in equation 4). Consequently, the signaling with this embodiment is much less error prone than the more general signaling in Rel-10. Taken from another point of view, while the general signaling that allows different PRBs is fine for Rel-10 mechanisms, and provides flexibility, for STRSD it is solely a misconfiguration.

Variable Resource STRSD

Yet another embodiment of the disclosure relates to properties of a variable resource STRSD. A time varying STRSD has the property that it requires that the UE be signaled 3 or 4 resources for 12 of the 16 Ack/Nack bit states, for 4 of the states, 3 resources need to be signaled, and for 4 of the states, 2 resources need to be signaled. If 2 resources are signaled on PCell and 2 are signaled on SCell, then if either PCell or SCell is missed, and the UE needs to transmit one of the 12 Ack/Nack bit states, it will only know 2 of the 3 or 4 resources it needs. If one selects the Ack/Nack bit mapping such that where SCell is missed (i.e. for b3,b2,b1,b0=0000, 0001, 0010, and 0011), 2 resources are used and the Ack/Nack bit mapping is selected such that where PCell is missed (i.e. for b3,b2,b1,b0=1100, 0100, and 1000), 3 resources are used, only one additional resource needs to be signaled. Furthermore, because 3 resources are needed when PCell is missed but only two resources are needed when SCell is missed, one only needs to transmit the additional resource on SCell to solve the problem of missing PCell or SCell. Therefore, in a first embodiment, ARI will indicate 3 resources while 2 resources are still implicitly allocated. However, this first embodiment of the code has the additional constraint that resources 1 and 3 should be in the same PRB. This can be accomplished by choosing the PDCCH of PCell such that resource 1 is in the same PRB as resource 3 (which is explicitly allocated on SCell). This scheduling constraint may not always be desirable. Therefore, in another embodiment shown in Table 8, 4 resources on SCell are shown, since the additional resource on SCell can be easily constrained to be in the same PRB as resource 3.

A modified code for variable resource STRSD based on time varying STRSD is shown in Table 8. It uses the Ack/Nack bit mapping as described in first paragraph of this embodiment, and some slight modifications to time varying STRSD with respect to the resource usage. Since resources 0 and 1 are assumed to be transmitted from PCell in this embodiment, columns containing resource 1 and resource 2 were swapped. Also, data and/or reference signals are transmitted on resources 4 and 5 instead of resources 0 and 1 in the last 12 rows of the code. Note that the performance of this code may be as good or better than that of time varying STRSD, since additional coding gain can come from the use of additional resources. Furthermore, note that the explicit resource should be allocated such that resources 3 and 5 are in the same PUCCH RB, and resources 2 and 4 should also be in one PUCCH PRB (although resources 2 and 3 or 4 and 5 need not be in the same PUCCH PRBs). This ensures that when the reference signal and data are on different resources the data symbol and reference signal will be in the same PUCCH RB. Finally, it is noted that the implicitly signaled resources 0 and 1 need not be in the same PUCCH PRB as the explicitly signaled resources 2, 3, 4, and 5. This means that there is no scheduling constraint to align implicit and explicit PUCCH resource for this code.

TABLE 8

Variable Resource STRSD code

| | | | | Slot #0 | | | | | | | | | | | | Slot #1 | | | | | | | | | | |
|---|---|---|---|---|---|---|---|---|---|---|---|---|---|---|---|---|---|---|---|---|---|---|---|---|---|---|
| A/N Bits | | | | Antenna port #0 | | | | | | Antenna port #1 | | | | | | Antenna port #0 | | | | | | Antenna port #1 | | | | |
| b3 | b2 | b1 | b0 | C0 | C1 | C2 | C3 | C4 | C5 | C0 | C1 | C2 | C3 | C4 | C5 | C0 | C1 | C2 | C3 | C4 | C5 | C0 | C1 | C2 | C3 | C4 | C5 |
| 0 | 0 | 0 | 0 | s0, r | | | | | | s2, r | | | | | | s0, r | | | | | | s2, r | | | | | |
| 0 | 0 | 0 | 1 | s1, r | | | | | | s1, r | | | | | | s1, r | | | | | | s0, r | | | | | |
| 0 | 0 | 1 | 0 | s3, r | | | | | | s3, r | | | | | | s3, r | | | | | | s3, r | | | | | |
| 0 | 0 | 1 | 1 | s2, r | | | | | | s0, r | | | | | | s2, r | | | | | | s1, r | | | | | |
| 1 | 1 | 0 | 0 | | r | s0 | | | | s2, r | | | | | | | r | s0 | | | | s2, r | | | | | |
| 0 | 1 | 0 | 0 | | r | s1 | | | | s1, r | | | | | | | r | s1 | | | | s0, r | | | | | |
| 1 | 0 | 0 | 0 | | r | s3 | | | | s3, r | | | | | | | r | s3 | | | | s3, r | | | | | |
| 1 | 1 | 1 | 1 | | r | s2 | | | | s0, r | | | | | | | r | s2 | | | | s1, r | | | | | |
| 1 | 1 | 1 | 0 | s0, r | | | | | | r | s2 | | | | | s0 | r | | | | | s2 | | | | | r |
| 1 | 0 | 0 | 1 | s1, r | | | | | | r | s1 | | | | | s1 | r | | | | | s0 | | | | | r |
| 1 | 0 | 1 | 0 | s3, r | | | | | | r | s3 | | | | | s3 | r | | | | | s3 | | | | | r |
| 1 | 0 | 1 | 1 | s2, r | | | | | | r | s0 | | | | | s2 | r | | | | | s1 | | | | | r |
| 1 | 1 | 0 | 1 | s0 | r | | | | | s2 | r | | | | | s0, r | | | | | | | r | | | | s2 |
| 0 | 1 | 0 | 1 | s1 | r | | | | | s1 | r | | | | | s1, r | | | | | | | r | | | | s0 |
| 1 | 1 | 1 | 0 | s3 | r | | | | | s3 | r | | | | | s3, r | | | | | | | r | | | | s3 |
| 0 | 1 | 1 | 1 | s2 | r | | | | | s0 | r | | | | | s2, r | | | | | | | r | | | | s1 | resources are still implicitly allocated. However, this first embodiment of the code has the additional constraint that If six distinct resources are signaled, then the code operates as above, and 6 resources are used by the UE to signal Ack/

Nack. If implicit signaling indicates the same PUCCH resource for resource 0 as the PUCCH resource for resource 4 and from explicit signaling, as well as the same PUCCH resource for resource 1 as the PUCCH resource for resource 5 and from explicit signaling, then the code falls back to the same basic structure as time varying STRSD, as is shown in Table 9. Since there are no distinct 5$^{th}$ and 6$^{th}$ PUCCH resources, this is shown in the table by moving all transmission from resources 4 and 5 to resources 0 and 1, respectively. Therefore, it can be seen that only 4 resources are used for the UE's Ack/Nack transmissions. Note that since resources 2 and 4 as well as 3 and 5 are signaled to be in the same PUCCH RBs, when the implicit resource indicates the same resource for resources 0 and 4, and for resources 1 and 5, resource 0 will be in the same PUCCH PRB as resource 2 and resource 1 will be in the same PUCCH PRB as resource 3.

TABLE 9

Time varying STRSD with reordered PUCCH resource

| A/N Bits | | | | Slot #0 | | | | | | | | | | | | | Slot #1 | | | | | | | | | | | |
|---|---|---|---|---|---|---|---|---|---|---|---|---|---|---|---|---|---|---|---|---|---|---|---|---|---|---|---|---|
| | | | | Antenna port #0 | | | | | | Antenna port #1 | | | | | | Antenna port #0 | | | | | | Antenna port #1 | | | | | | |
| b3 | b2 | b1 | b0 | C0 | C1 | C2 | C3 | C4 | C5 | C0 | C1 | C2 | C3 | C4 | C5 | C0 | C1 | C2 | C3 | C4 | C5 | C0 | C1 | C2 | C3 | C4 | C5 |
| 0 | 0 | 0 | 0 | s0, r | | | | | | s2, r | | | | | | s0, r | | | | | | s2, r | | | | | |
| 0 | 0 | 0 | 1 | s1, r | | | | | | s1, r | | | | | | s1, r | | | | | | s0, r | | | | | |
| 0 | 0 | 1 | 0 | s3, r | | | | | | s3, r | | | | | | s3, r | | | | | | s3, r | | | | | |
| 0 | 0 | 1 | 1 | s2, r | | | | | | s0, r | | | | | | s2, r | | | | | | s1, r | | | | | |
| 1 | 1 | 0 | 0 | s0 | r | | | | | | | | | s2, r | | s0 | r | | | | | | | | | s2, r | |
| 0 | 1 | 0 | 0 | s1 | r | | | | | | | | | s1, r | | s1 | r | | | | | | | | | s0, r | |
| 1 | 0 | 0 | 0 | s3 | r | | | | | | | | | s3, r | | s3 | r | | | | | | | | | s3, r | |
| 1 | 1 | 1 | 1 | s2 | r | | | | | | | | | s0, r | | s2 | r | | | | | | | | | s1, r | |
| 1 | 1 | 1 | 0 | | | | s0, r | | | s2 | | | | | | | | r | s0 | | | | | r | s2 | | |
| 1 | 0 | 0 | 1 | | | | s1, r | | | s1 | | | | | | | | r | s1 | | | | | r | s0 | | |
| 1 | 0 | 1 | 0 | | | | s3, r | | | s3 | | | | | | | | r | s3 | | | | | r | s3 | | |
| 1 | 0 | 1 | 1 | | | | s2, r | | | s0 | | | | | | | | r | s2 | | | | | r | s1 | | |
| 1 | 1 | 0 | 1 | r | | | s0 | | | | | | r | s2 | | s0, r | | | | | | s2 | r | | | | |
| 0 | 1 | 0 | 1 | r | | | s1 | | | | | | r | s1 | | s1, r | | | | | | s0 | r | | | | |
| 1 | 1 | 1 | 0 | r | | | s3 | | | | | | r | s3 | | s3, r | | | | | | s3 | r | | | | |
| 0 | 1 | 1 | 1 | r | | | s2 | | | | | | r | s0 | | s2, r | | | | | | s1 | r | | | | |

Since resources 0 and 1 are implicitly signaled in this embodiment, they may use adjacent PUCCH resource when Rd-10 resource signaling is used. That is, the resources in this case may be determined as: $n_{PUCCH,1}^{(1)} = n_{PUCCH,0}^{(1)} + 1 = n_{CCE,0} + 1 + N_{PUCCH}^{(1)}$, where $n_{PUCCH,0}^{(1)}$ and $n_{PUCCH,1}^{(1)}$ are the PUCCH resource indices for resource 0 and resource 1 respectively, $n_{CCE,0}$ is the index of the first control channel element for the UE's grant on PCell PDCCH, and $N_{PUCCH}^{(1)}$ is defined in section 5.4 of Reference 2. Because they are adjacent, in this case where both resources 0 and 1 are signaled to be the same as explicit resources, explicit resources 2 and 3 will also therefore be configured to be adjacent. Those of skill in the art will appreciate that the network should not signal the same PUCCH resource for resources 0, 4, and 5 in this embodiment to avoid degradation in performance of the code.

TABLE 10

Variable Resource STRSD with identical resources 0, 4, and 5

| A/N Bits | | | | Slot #0 | | | | | | | | | | | | | Slot #1 | | | | | | | | | | | |
|---|---|---|---|---|---|---|---|---|---|---|---|---|---|---|---|---|---|---|---|---|---|---|---|---|---|---|---|---|
| | | | | Antenna port #0 | | | | | | Antenna port #1 | | | | | | Antenna port #0 | | | | | | Antenna port #1 | | | | | | |
| b3 | b2 | b1 | b0 | C0 | C1 | C2 | C3 | C4 | C5 | C0 | C1 | C2 | C3 | C4 | C5 | C0 | C1 | C2 | C3 | C4 | C5 | C0 | C1 | C2 | C3 | C4 | C5 |
| 0 | 0 | 0 | 0 | s0, r | | | | | | s2, r | | | | | | s0, r | | | | | | s2, r | | | | | | |
| 0 | 0 | 0 | 1 | s1, r | | | | | | s1, r | | | | | | s1, r | | | | | | s0, r | | | | | | |

TABLE 10-continued

Variable Resource STRSD with identical resources 0, 4, and 5

| A/N Bits | | | | Slot #0 | | | | | | | | | | | | Slot #1 | | | | | | | | | | | |
|---|---|---|---|---|---|---|---|---|---|---|---|---|---|---|---|---|---|---|---|---|---|---|---|---|---|---|---|
| | | | | Antenna port #0 | | | | | | Antenna port #1 | | | | | | Antenna port #0 | | | | | | Antenna port #1 | | | | | |
| b3 | b2 | b1 | b0 | C0 | C1 | C2 | C3 | C4 | C5 | C0 | C1 | C2 | C3 | C4 | C5 | C0 | C1 | C2 | C3 | C4 | C5 | C0 | C1 | C2 | C3 | C4 | C5 |
| 0 | 0 | 1 | 0 | s3, r | | | | | | s3, r | | | | | | s3, r | | | | | | s3, r | | | | | |
| 0 | 0 | 1 | 1 | s2, r | | | | | | s0, r | | | | | | s2, r | | | | | | s1, r | | | | | |
| 1 | 1 | 0 | 0 | s0 | r | | | | | | | | s2, r | | | s0 | r | | | | | | | s2, r | | | |
| 0 | 1 | 0 | 0 | s1 | r | | | | | | | | s1, r | | | s1 | r | | | | | | | s0, r | | | |
| 1 | 0 | 0 | 0 | s3 | r | | | | | | | | s3, r | | | s3 | r | | | | | | | s3, r | | | |
| 1 | 1 | 1 | 1 | s2 | r | | | | | | | | s0, r | | | s2 | r | | | | | | | s1, r | | | |
| 1 | 1 | 1 | 0 | | | | s0, r | | | s2 | | | r | | | | | | r | | | s0 | | | r | | s2 |
| 1 | 0 | 0 | 1 | | | | s1, r | | | s1 | | | r | | | | | | r | | | s1 | | | r | | s0 |
| 1 | 0 | 1 | 0 | | | | s3, r | | | s3 | | | r | | | | | | r | | | s3 | | | r | | s3 |
| 1 | 0 | 1 | 1 | | | | s2, r | | | s0 | | | r | | | | | | r | | | s2 | | | r | | s1 |
| 1 | 1 | 0 | 1 | r | s0 | | | | | r | | | s2 | | | s0, r | | | s2 | | | r | | | | | |
| 0 | 1 | 0 | 1 | r | s1 | | | | | r | | | s1 | | | s1, r | | | s0 | | | r | | | | | |
| 1 | 1 | 1 | 0 | r | s3 | | | | | r | | | s3 | | | s3, r | | | s3 | | | r | | | | | |
| 0 | 1 | 1 | 1 | r | s2 | | | | | r | | | s0 | | | s2, r | | | s1 | | | r | | | | | |

The scheduling constraints to set the implicitly allocated resources to be the same as the explicitly allocated resources can be significant. Embodiment 3 may be used to loosen some of the constraints. If PUCCH resource allocation is modified to use Equations 1 and 2 described above, then there may be a factor of m times more locations in which each UE can be scheduled, since there are m CCE blocks that alias to the same set of PUCCH resources.

Furthermore, note that it is possible to signal extra resources using implicit signaling as well. PUCCH resource indices for resources 2, 3, 4, and 5 could be implicitly signaled as $n_{PUCCH,i}^{(1)} = n_{CCE,i} + i + N_{PUCCH}^{(1)}$, where $i \in \{2,3,4,5\}$ is the resource number.

This embodiment has the following benefits:

1) Since the structure is that of time varying STRSD, it is expected to have similar performance advantages over Embodiment #1 to that of time varying STRSD as shown in Table 3.

2) The eNB can dynamically choose to use 4, 5, or 6 resources per UE, depending on if it aligns the implicitly or explicitly scheduled resources or not. This allows a tradeoff of scheduler complexity and link performance for spectral efficiency.

3) When 6 resources are used, the data and reference signal resources may be easily configured to be in the same PRB. This is because only resources 2 and 4 or 3 and 5 may have data and reference signals on different resources, and these resources are signaled from one cell (SCell).

4) PUCCH resource may be implicitly addressed using existing mechanisms from Rel-8 and Rel-10, especially when 6 resources are signaled.

Transmit Diversity for Transmission of 3 HARQ ACK Bits

In another embodiment, transmit diversity for transmission of 3 HARQ-Ack bits with channel selection using 4 resources is supported. This embodiment uses more than 3 PUCCH resources, that is, more than that used for single antenna transmission of 3 Ack/Nack bits using channel selection.

As shown in Reference1, Table 10.1.2.2.1-4, which is shown below in Table 11, 9 states have been defined for transmission of 3 HARQ-Ack bits when format 1b with channel selection is used in LTE Rel-10. It should be noted that the last two rows use the same resource and the same modulation symbol and are considered together to be a single codeword.

Note that in other STRSD embodiments described herein, each row of the code tables corresponds to one combination of information bits and one combination of orthogonal resources and modulation symbols. Therefore, in the other STRSD embodiments, a codeword identifies to a unique combination of information bits as well as orthogonal resources and modulation symbols. In order to maintain the property that codewords are unique, in this embodiment, a codeword is defined as a unique combination of orthogonal resources and modulation symbols used across one or more slots and one or more transmit antennas.

Also, in other STRSD embodiments described herein, each Ack/Nack state can be represented with one bit, with 0 corresponding to Nack/DTX and 1 corresponding to Ack. As can be seen from Table 11, when 3 HARQ-Ack bits are used, the HARQ-Ack states represented can be Ack, Nack, DTX, or Nack/DTX. Nevertheless, as is known to those skilled in the art, in LTE these 3 HARQ-Ack states are referred to as HARQ-Ack bits. These HARQ-Ack bits can therefore be considered information bits, and a combination of HARQ-ACK states can be considered a state of information bits.

TABLE 11

LTE Rel-10 Transmission of Format 1b
HARQ-ACK channel selection for A = 3

| HARQ-ACK(0) | HARQ-ACK(1) | HARQ-ACK(2) | $n_{PUCCH,i}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | No Transmission | |

Hence, the STRSD code should also have 9 codewords. Moreover, the code should have the resource allocation-related properties discussed for the 4-bit case, namely: Property (1) The code should be functional even if a PDCCH transmitted on serving cell 1 or serving cell 2 is missed (where the primary cell or a secondary cell can be a serving cell), and Property (2) For each antenna, each codeword (or row of the table) uses resources signaled from only one of the serving cells.

Since 4 resources are available for the 3-bit STRSD code, this code can be built on the 4-bit Common PRB STRSD code of Table 6 which was already developed with 4 resources and satisfies both properties above. The construction can be done in two steps: 1) Puncturing the 4-bit STRSD to reduce the number of codewords to 9. and then 2) Modifying the modulation coding on the punctured code.

The method can be in general used for constructing the 3-bit code based on any 4-bit code described in this disclosure. However, this method is illustrated for Table 6 here.

The Common PRB STRSD code of Table 6 has 16 codewords. In order to construct a 3 bit STRSD code, in this embodiment, the Common PRB STRSD code is punctured to obtain a new code with 9 codewords such that both Properties (1) and (2) above continue to hold. Since the number of resources is not changed from 4, property (2) automatically holds and only property (1) should be verified for the punctured code. If in the 3-bit code the number of available resources were less than 4, then property (2) would have to be verified as well.

Property (2) is automatically transferred to any punctured code. To satisfy Property (1), a number of codewords should be kept from the group of codewords that use only resources #0 and #1 and also a number of codewords should be kept from the group of codewords that use only resources #2 and #3. The specific number of codewords in each group is determined by examining Table 11 and determining the number of codewords that may be transmitted in case the PDCCH of serving cell 1 is missed and also the number of codewords that may be transmitted in case the PDCCH of serving cell 2 is missed. These numbers are 2 and 4 for the former and the latter cases, respectively.

The other three codewords to be kept in the punctured code may be selected from the other two groups of codewords (each group is a set of codewords that use the same resources). Choosing these three codewords from two groups (instead of one) yields to increased distance between the codewords. For the same reason, these codewords should not be selected from the group from which 2 codewords were selected for the case that PDCCH of serving cell 1 is missed. As a result, 2 codewords are chosen from the second group (rows 5-8 of Table 6) and one codeword is chosen from the third group (rows 9-12 of Table 6).

The punctured code obtained in the previous step includes 9 codewords which are split in 4 groups. The number of codewords in these groups are 4, 2, 2, and 1, respectively. For the group with 4 codewords, the modulation symbols from the 4-bit code can be reused. For groups with 2 codewords, however, the modulation coding (modulation symbols) can be modified to improve the distance properties of the code. More specifically, if one of the codewords uses symbol $s_0$ on a slot and an antenna, the other codeword should use $\bar{s}_0$ on the same slot and the same antenna for the maximum distance between the two codewords. In general, in groups having only two codewords should use antipodal modulation symbols, where the term "antipodal" refers to modulation symbols that have a phase difference of 180 degrees. While any pair of antipodal modulation symbols can be used, $s_0$ and $\bar{s}_0$ are selected for concreteness. Also, for these two codewords, $s_0$ may be kept fixed across the slots and across the antennas. For the group with one codeword, any modulation symbols may be used, and the symbol $s_0$ is selected for concreteness.

A code designed based on the procedure described above is shown in Table 12. Each row corresponds to a codeword that is associated with a combination of 3 HARQ states, where the HARQ states can be ACK, NACK, DTX, or NACK/DTX. The PUCCH resources used on each of the two antennas in each of the two slots are shown for each codeword. Note that the PUCCH resources used in this table are indexed from 1 to 4. The modulation symbols used on each of the two antennas in each of the two slots for each codeword are also shown, where b(0) and b(1) refer to the modulation symbols used in the first and second slots on an antenna, respectively.

TABLE 12

3 Bit STRSD code

| | | | A1 | | | A2 | | |
|---|---|---|---|---|---|---|---|---|
| HARQ-ACK(0) | HARQ-ACK(1) | HARQ-ACK(2) | Data Res. | RS Res. | b(0)b(1) | Data Res. | RS Res. | b(0)b(1) |
| ACK | ACK | ACK | 2 | 1 | s0, s0 | 3 | 4 | s0, s0 |
| ACK | NACK/DTX | ACK | 2 | 1 | s3, s3 | 3 | 4 | s3, s3 |
| NACK/DTX | ACK | ACK | 4 | 3 | s0, s0 | 1 | 2 | s0, s0 |
| NACK/DTX | NACK/DTX | ACK | 3 | 3 | s0, s0 | 4 | 4 | s0, s0 |
| ACK | ACK | NACK/DTX | 1 | 1 | s0, s0 | 2 | 2 | s2, s2 |
| ACK | NACK/DTX | NACK/DTX | 1 | 1 | s1, s1 | 2 | 2 | s1, s0 |
| NACK/DTX | ACK | NACK/DTX | 1 | 1 | s2, s2 | 2 | 2 | s0, s1 |
| NACK/DTX | NACK/DTX | NACK | 3 | 3 | s3, s3 | 4 | 4 | s3, s3 |
| NACK | NACK/DTX | DTX | 1 | 1 | s3, s3 | 2 | 2 | s3, s3 |
| NACK/DTX | NACK | DTX | 1 | 1 | s3, s3 | 2 | 2 | s3, s3 |
| DTX | DTX | DTX | | | No Transmission | | | |

Generalized Embodiments for STRSD Code

A generalized embodiment for an STRSD code that has fewer information bits than the number of orthogonal resources is now considered. In this embodiment, the code is constructed using a set of codeword groups, where the number of codeword groups is at least the number of orthogonal resources. This allows a maximum number of resources to be used and a good distribution of resources among the groups for the given number of information bits, resulting in good code performance Each codeword of the code is unique and is selected for transmission for one or more of the combinations of the information bits. A codeword group is defined as a set of codewords that use the same combination of orthogonal resources on the modulation symbols and on the RS (reference symbols) in both slots and on both antennas, such that the only difference between two codewords in a codeword group is between one or more of the modulation symbols.

Each codeword group is constructed such that the orthogonal resource used for the modulation symbols on one antenna is different from the orthogonal resource used on the other antenna. The orthogonal resource used for the reference signal is also different between antennas. The codeword groups are also constructed such that no two sub-codewords from different codeword groups have the same orthogonal resource on both the modulation and reference symbols, where a sub-codeword is defined as a part of a codeword transmitted on a certain antenna and in a certain time slot.

In one alternative embodiment, QPSK modulation is used and the number of codewords in each codeword group is one of 1, 2, or 4 codewords. Designs using three codewords per codeword group are not supported in this alternative embodiment because the minimum distance between any 3 QPSK symbols is uneven, leading to degraded performance. In the one codeword case, each codeword group can use any QPSK symbol, and s0 is selected for concreteness. In the two codeword case, any pair of antipodal QPSK symbols can be used, s0 and s0 are selected for concreteness In the 4 codeword case, all QPSK symbols are used.

In summary, there are fewer A/N bits than the number of orthogonal resources. In one embodiment, codewords are grouped such that the only difference between codewords in the group is the modulation symbol used. There can be a number of codeword groups equal to or greater than orthogonal resources. Additionally, there can be an unequal number of codewords between groups. In one embodiment, QPSK is used for the modulation symbols. In the embodiment, codeword groups can contain 1, 2, or 4 codewords. In such an embodiment, the codeword groups do not include 3 codewords.

Transmit diversity for transmission of 4 HARQ-Ack bits without varying modulation symbols across slots In another embodiment, an STRSD code for transmission of 4 HARQ-Ack bits with channel selection and with non-time-varying modulation symbols is proposed. The code is shown in Table 13 and has the same features and benefits as the STRSD code in Table 6.

One key feature common to the codes of Table 6 and Table 13 is that the modulation symbols used on antenna ports 0 and 1 are different. This feature improves the performance of the code relative to when the modulation symbols are the same on both antennas.

A second key feature common to the codes of Table 6 and Table 13 is that the distance between the modulation symbols for a given pair of codewords on one antenna is often different than the distance between the modulation symbols on the other antenna for the same pair of codewords. Balancing the distance of codeword pairs across antennas in this way can improve the performance of the code.

An example of different symbol distances on antennas of a codeword pair can be seen in codewords '0000' and '0011.' In codeword '0000,' s0 and s2 are transmitted on antenna ports 0 and 1, respectively. For codeword '0011,' s3 and s3 are transmitted on antenna ports 0 and 1, respectively. Since s3=−s0, the data symbols on the first antenna for codewords '0000,' and '0011' are antipodal, and therefore have the maximum distance attainable in QPSK modulation. However, because s2=j*s3, the data symbols on the second antenna for codewords '0000,' and '0011' are in quadrature, and therefore they have less than the maximum distance attainable in QPSK modulation.

In general then, this feature is generated when a first and a second codeword have antipodal modulation symbols for a first antenna, and the first and the second codeword have modulation symbols that are in quadrature for the second antenna, where a first modulation symbol x and a second modulation symbol y are defined to be in quadrature when $x=j*y$ or $x=-j*y$.

The common PRB STRSD code with non-time-varying modulation symbols (Table 13) is obtained from common PRB STRSD code (Table 6) by changing the modulation symbols on the second antenna of those codewords that use different modulation symbols on two slots. More specifically, in each group of codewords (a set of codewords using the same resources), there are two codewords that use (s1,s0) or (s0,s1) as their modulation symbols on the two slots on antenna port #1. To have a non-time-varying property, these pairs of modulation symbols are changed to (s0,s0) and (s1, s1).

Table 13 shows a first approach of such change in which (s1,s0) and (s0,s1) are changed to (s1,s1) and (s0,s0), respectively. A second approach is to change (s1,s0) and (s0,s1) to (s0,s0) and (s1,s1), respectively. Also, in Table 13 for all codeword groups the first approach has been used; however it is possible that for each codeword group either the first approach or the second approach is selected independently of other codeword groups.

TABLE 13

Common PRB STRSD code with non-time-varying modulation symbols

| A/N bits | | | | Antenna port #0 | | | | Antenna port #1 | | | |
|---|---|---|---|---|---|---|---|---|---|---|---|
| b3 | b2 | b1 | b0 | Ch #0 | Ch #1 | Ch #2 | Ch #3 | Ch #0 | Ch #1 | Ch #2 | Ch #3 |
| 0 | 0 | 0 | 0 | s0, s0, r | | | | | s2, s2, r | | |
| 0 | 0 | 0 | 1 | s1, s1, r | | | | | s1, s1, r | | |
| 0 | 0 | 1 | 0 | s2, s2, r | | | | | s0, s0, r | | |
| 0 | 0 | 1 | 1 | s3, s3, r | | | | | s3, s3, r | | |
| 1 | 1 | 0 | 1 | r | s0, s0 | | | | | s2, s2 | r |
| 0 | 1 | 0 | 1 | r | s1, s1 | | | | | s1, s1 | r |
| 0 | 1 | 1 | 0 | r | s2, s2 | | | | | s0, s0 | r |
| 0 | 1 | 1 | 1 | r | s3, s3 | | | | | s3, s3 | r |
| 1 | 1 | 1 | 0 | | | r | | s0, s0 | s2, s2 | r | |
| 1 | 0 | 0 | 1 | | | r | | s1, s1 | s1, s1 | r | |
| 1 | 0 | 1 | 0 | | | r | | s2, s2 | s0, s0 | r | |
| 1 | 0 | 1 | 1 | | | r | | s3, s3 | s3, s3 | r | |
| 1 | 1 | 0 | 0 | | | s0, s0, r | | | | | s2, s2, r |
| 0 | 1 | 0 | 0 | | | s1, s1, r | | | | | s1, s1, r |
| 1 | 0 | 0 | 0 | | | s2, s2, r | | | | | s0, s0, r |
| 1 | 1 | 1 | 1 | | | s3, s3, r | | | | | s3, s3, r |

In another embodiment, the mapping from HARQ-Ack bits combinations to codewords is changed so that the modulation symbols and the resource used for data symbols on the first antenna become similar to those in single antenna transmission as shown in Reference 1, Table 10.1.2.2.1-5. By only changing the mapping, one of the benefits of the code of Table 13, which is functionality with one DTX PDCCH, is lost. To preserve this property, the resources 2 and 3 should be switched before changing the mapping. The code obtained by these two changes (switching resources 2 and 3 and changing the mapping) from Table 13 is shown below in Table 14.

TABLE 14

Common PRB STRSD code with non-time-varying modulation symbols and with commonality with single antenna channel selection

| A/N bits | | | | Antenna port #0 | | | | Antenna port #1 | | | |
| --- | --- | --- | --- | --- | --- | --- | --- | --- | --- | --- | --- |
| b3 | b2 | b1 | b0 | Ch #0 | Ch #1 | Ch #2 | Ch #3 | Ch #0 | Ch #1 | Ch #2 | Ch #3 |
| 0 | 0 | 0 | 0 | s0, s0, r | | | | s2, s2, r | | | |
| 0 | 0 | 0 | 1 | s1, s1, r | | | | s1, s1, r | | | |
| 0 | 0 | 1 | 0 | s2, s2, r | | | | s0, s0, r | | | |
| 0 | 0 | 1 | 1 | s3, s3, r | | | | s3, s3, r | | | |
| 0 | 1 | 1 | 0 | r | s0, s0 | | | | | r | s2, s2 |
| 0 | 1 | 1 | 1 | r | s1, s1 | | | | | r | s1, s1 |
| 1 | 1 | 1 | 0 | r | s2, s2 | | | | | r | s0, s0 |
| 1 | 1 | 1 | 1 | r | s3, s3 | | | | | r | s3, s3 |
| 0 | 1 | 0 | 1 | | | s0, s0 | r | | | s2, s2 | r |
| 1 | 0 | 0 | 1 | | | s1, s1 | r | | | s1, s1 | r |
| 1 | 1 | 0 | 1 | | | s2, s2 | r | | | s0, s0 | r |
| 1 | 0 | 1 | 1 | | | s3, s3 | r | | | s3, s3 | r |
| 1 | 0 | 0 | 0 | | | | | s0, s0, r | | s2, s2, r | |
| 0 | 1 | 0 | 0 | | | | | s1, s1, r | | s1, s1, r | |
| 1 | 0 | 1 | 0 | | | | | s2, s2, r | | s0, s0, r | |
| 1 | 1 | 0 | 0 | | | | | s3, s3, r | | s3, s3, r | |

Transmit Diversity for Transmission of 3 HARQ-Ack Bits Without Varying Modulation Symbols Across Slots In another embodiment, an STRSD code for transmission of 3 HARQ-Ack bits with channel selection and with non-time-varying modulation symbols is proposed. The code is obtained from Table 12 by changing the modulation symbols of those codewords that use time varying modulation symbols. More specifically, there are two codewords in Table 12 that use different modulation symbols across the two slots on the second antenna port. The pair of modulation symbols for the second antenna for these two codewords are (s0,s1) and (s1,s0). A sample 3 bit STRSD code with non-time-varying modulation symbols is shown in Table 15 in which the symbol pairs (s0,s1) and (s1,s0) have been changed to (s1,s1) and (s0,s0), respectively. An alternative approach would be to change (s0,s1) and (s1,s0) to (s0,s0) and (s1,s1), respectively.

TABLE 15

3 Bit STRSD code with non-time-varying modulation symbols

| HARQ-ACK(0) | HARQ-ACK(1) | HARQ-ACK(2) | A1 | | | A2 | | |
| --- | --- | --- | --- | --- | --- | --- | --- | --- |
| | | | Data Res. | RS Res. | b(0)b(1) | Data Res. | RS Res. | b(0)b(1) |
| ACK | ACK | ACK | 2 | 1 | s0, s0 | 3 | 4 | s0, s0 |
| ACK | NACK/DTX | ACK | 2 | 1 | s3, s3 | 3 | 4 | s3, s3 |
| NACK/DTX | ACK | ACK | 4 | 3 | s0, s0 | 1 | 2 | s0, s0 |
| NACK/DTX | NACK/DTX | ACK | 3 | 3 | s0, s0 | 4 | 4 | s0, s0 |
| ACK | ACK | NACK/DTX | 1 | 1 | s0, s0 | 2 | 2 | s2, s2 |
| ACK | NACK/DTX | NACK/DTX | 1 | 1 | s1, s1 | 2 | 2 | s0, s0 |
| NACK/DTX | ACK | NACK/DTX | 1 | 1 | s2, s2 | 2 | 2 | s1, s1 |
| NACK/DTX | NACK/DTX | NACK | 3 | 3 | s3, s3 | 4 | 4 | s3, s3 |
| NACK | NACK/DTX | DTX | 1 | 1 | s3, s3 | 2 | 2 | s3, s3 |
| NACK/DTX | NACK | DTX | 1 | 1 | s3, s3 | 2 | 2 | s3, s3 |
| DTX | DTX | DTX | No Transmission | | | | | |

Unified STRSD

As is described in prior embodiments, STRSD schemes can require constraints on resource allocation in order to ensure that the resources needed for both antennas is available for all Ack/Nack states. If these constraints are not met in a given configuration, STRSD schemes may not be supported in that configuration. Because it is often desirable to support TxD across as many configurations of a device as possible, a unified approach may be needed.

When LTE TDD is configured to have more downlink subframes than uplink subframes, multiple downlink subframes can each carry a PDSCH transmission to the UE, all of which require Ack/Nack responses that must be transmitted in a single uplink subframe. UEs are configured such that they may receive at most M PDSCH transmissions on a cell that must be acknowledged in an uplink subframe. Each of the M PDSCHs may or may not be transmitted, and therefore the PDCCHs that carry the grants for the PDSCH transmissions may or may not be transmitted. Since PUCCH resources are typically derived from the PDCCH transmissions, and since different PDCCH transmissions can indicate different PUCCH resources, a varying number of PUCCH resources can be available to the UE, depending on how many PDSCHs are transmitted to it.

Transmit diversity schemes contemplated herein require the use of distinct orthogonal resources that are simultaneously transmitted on each antenna. Therefore, the general class of TxD schemes that use orthogonal resources require that a UE must be allocated at least two PUCCH resources if it is to transmit. Furthermore, the STRSD codes contemplated herein require that different combinations of resources be known according to the state of the Ack/Nack bits.

Because TDD can use more PDCCHs to allocate PUCCH resources needed by the UE in a given subframe, it imposes different requirements on resource allocation to support transmit diversity. For example, when M=4 is used with Rel-8 single antenna transmission, one PUCCH resource may be indicated by each PDCCH and anywhere between one and four PDCCHs are used to allocate one to four PUCCH resources to the UE. If only one PUCCH resource is available to a TxD UE, it could not transmit. Similarly, for STRSD, considering the common PRB STRSD code of Table 14, if only two PDCCHs are transmitted, and these allocate PUCCH resources 0 and 1, if A/N bits state 1111 is to be transmitted, since resource 3 is not available, the UE can't transmit.

By contrast, STRSD can be supported using FDD resource allocation techniques available in Rel-10 LTE. This difference in resource allocation is one motivation for a unified TxD scheme that supports the resource allocation behaviors of both TDD and FDD, while still using a small amount of PUCCH resource where possible.

In one embodiment, a second desirable characteristic of a unified TxD scheme would be to minimize redesign of the existing mappings for Ack/Nack bit state to PUCCH resource and modulation symbols. These designs are complex, as they try to minimize the transmission power needed by the UE, but need to be flexible to operate with a varying amount of PUCCH resource for a given number of Ack/Nack bits. While TxD transmission by its nature changes resource and/or modulation symbol mappings to at least a second antenna, TxD transmission can be designed such that changes are minimized with respect to the Ack/Nack bit states supported, and the mapping for at least the data portion on the first antenna.

In a further embodiment, a third desirable characteristic would be to avoid the need to modify RRC signaling to indicate additional PUCCH resources. This reduces signaling overhead, as well as simplifying the UE implementation.

One embodiment of unified STRSD supporting 2, 3, and 4 Ack/Nack bits using FDD parameters is described below using Table 16. Two primary components of the design are addressed in this table: mapping PUCCH resources from Rel-10 to the resources used on the transmit antennas and the definition of a shifted PUCCH reference signal.

TABLE 16

Unified STRSD PUCCH Resource and RS shift values

| $n_{PUCCH,i}^{(1)}$ | $n_{PUCCH,j}^{(1,\tilde{p}0)}$ | $n_{PUCCH,j}^{(1,\tilde{p}1)}$ | | | $\Delta_{RS}^{\tilde{p}}$ | |
|---|---|---|---|---|---|---|
| | | A = 2 | A = 3 | A = 4 | A = 3 | A = 4 |
| $n_{PUCCH,0}^{(1)}$ | $n_{PUCCH,0}^{(1)}$ | $n_{PUCCH,0}^{(1)} + 1$ | $n_{PUCCH,1}^{(1)}$ | $n_{PUCCH,1}^{(1)}$ | 0 | 0 |
| $n_{PUCCH,1}^{(1)}$ | $n_{PUCCH,1}^{(1)}$ | $n_{PUCCH,1}^{(1)} + 1$ | $n_{PUCCH,2}^{(1)} + 1$ | $n_{PUCCH,3}^{(1)}$ | −1 | −1 |
| $n_{PUCCH,2}^{(1)}$ | $n_{PUCCH,2}^{(1)}$ | — | $n_{PUCCH,2}^{(1)} + 1$ | $n_{PUCCH,0}^{(1)}$ | 0 | 1 |
| $n_{PUCCH,3}^{(1)}$ | $n_{PUCCH,3}^{(1)}$ | — | — | $n_{PUCCH,2}^{(1)}$ | — | 0 |

TABLE 17

4 resource STRSD code with same modulation symbol on ports 0 and 1

| HARQ-ACK(0) | HARQ-ACK(1) | HARQ-ACK(2) | HARQ-ACK(3) | Antenna Port 0 | | | | Antenna Port 1 | | | |
|---|---|---|---|---|---|---|---|---|---|---|---|
| | | | | Ch #0 | Ch #1 | Ch #2 | Ch #3 | Ch #0 | Ch #1 | Ch #2 | Ch #3 |
| NACK/DTX | NACK | NACK/DTX | NACK/DTX | 1, 1, r | | | | 1, 1, r | | | |
| NACK | NACK/DTX | NACK/DTX | NACK/DTX | 1, 1, r | | | | 1, 1, r | | | |
| ACK | NACK/DTX | NACK/DTX | NACK/DTX | j, j, r | | | | j, j, r | | | |
| NACK/DTX | ACK | NACK/DTX | NACK/DTX | −j, −j, r | | | | −j, −j, r | | | |
| ACK | ACK | NACK/DTX | NACK/DTX | −1, −1, r | | | | −1, −1, r | | | |
| NACK/DTX | ACK | ACK | NACK/DTX | r | 1, 1 | | | | r | 1, 1 | |
| ACK | ACK | ACK | NACK/DTX | r | j, j | | | | r | j, j | |
| NACK/DTX | ACK | ACK | ACK | r | −j, −j | | | | r | −j, −j | |
| ACK | ACK | ACK | ACK | r | −1, −1 | | | | r | −1, −1 | |
| NACK/DTX | NACK/DTX | NACK/DTX | ACK | | | 1, 1, r | | | | 1, 1, r | |

TABLE 17-continued 4 resource STRSD code with same modulation symbol on ports 0 and 1

| HARQ-ACK(0) | HARQ-ACK(1) | HARQ-ACK(2) | HARQ-ACK(3) | Antenna Port 0 | | | | Antenna Port 1 | | | |
|---|---|---|---|---|---|---|---|---|---|---|---|
| | | | | Ch #0 | Ch #1 | Ch #2 | Ch #3 | Ch #0 | Ch #1 | Ch #2 | Ch #3 |
| NACK/DTX | NACK/DTX | ACK | NACK/DTX | | | | j, j, r | | | j, j, r | |
| NACK/DTX | ACK | NACK/DTX | ACK | | | | -j, -j, r | | | -j, -j, r | |
| NACK/DTX | NACK/DTX | ACK | ACK | | | | -1, -1, r | | | -1, -1, r | |
| ACK | NACK/DTX | ACK | NACK/DTX | | | 1, 1 | r | 1, 1 | r | | |
| ACK | NACK/DTX | NACK/DTX | ACK | | | j, j | r | j, j | r | | |
| ACK | NACK/DTX | ACK | ACK | | | -j, -j | r | -j, -j | r | | |
| ACK | ACK | NACK/DTX | ACK | | | -1, -1 | r | -1, -1 | r | | |
| DTX | DTX | NACK/DTX | NACK/DTX | | | | No Transmission | | | | |

The mapping of Rel-10 PUCCH resources to the transmitted resource exploits a key characteristic of at least some STRSD codes wherein the resource used on the second antenna port can be uniquely determined from that used on the first antenna port. Consider for example a 4 resource STRSD code with same modulation symbol on ports 0 and 1 in Table 17. This table uses slightly different notation than other STRSD codes above wherein the QPSK modulation symbols $1, j, -1$, and $-j$ are shown instead of s0, s1, s2, and s3. For this STRSD code, when the data PUCCH resource on antenna port 0 is 0, 1, 2, or 3, the corresponding data PUCCH resource on antenna port 1 is 1, 3, 0, or 2, respectively. Therefore, the Ack/Nack bit state does not need to be known to determine the PUCCH resources used on antenna port 1, and as shown in Table 16, it can be defined without changing the Ack/Nack bit state to PUCCH resource mappings for the data transmission on antenna port 0.

The PUCCH reference shift allows STRSD to be supported in a simple way. Consider for example Table 17. Depending on the Ack/Nack state, reference signals are on the same resource as the data, or shifted one resource to the left or right of the data resource. Therefore, the resource used for the reference signal can be determined once the data resource is assigned. Further, in the STRSD code of Table 17, resources on both antenna ports are shifted in the same direction. Therefore it is sufficient for this embodiment to have a single reference signal shift parameter for both antennas. The resources used on antenna port 0 and port 1 are determined by the Rel-10 resource allocated to the UE. Table 16 supports transmission of 2, 3, or 4 Ack/Nack bits, corresponding to A=2, A=3, and A=4. Resource for the data portion of the transmission on antenna port 0 is indicated by the column headed by $n_{PUCCH,j}^{(1,\tilde{p}_0)}$ and resource for the data portion of the transmission on antenna port 1 is in the columns headed by $n_{PUCCH,j}^{(1,\tilde{p}_1)}$. The Rel-10 PUCCH resource determined using channel selection is indicated in the column with the heading $n_{PUCCH,i}^{(1)}$. The values of $n_{PUCCH,i}^{(1)}$ are determined as in section 10.1 of 36.213. For example, for FDD, $n_{PUCCH,i}^{(1)}$ can be determined in Tables 10.1.2.2.1-3, 10.1.2.2.1-4, and 10.1.2.2.1-5 for 2, 3, and 4 Ack/Nack bits, respectively. Resources indicated as $n_{PUCCH,i}^{(1)}+1$ are those whose PUCCH resources are one greater than the PUCCH resource with index $n_{PUCCH,i}^{(1)}$. The PUCCH resource shift is given by the columns headed by $\Delta_{RS}^{\tilde{p}}$. This embodiment of Table 16 uses the same resource shift on both antenna ports, so the resource shift on antenna port 0, $\Delta_{RS}^{\tilde{p}_0}$, is the same as the resource shift on port 1, $\Delta_{RS}^{\tilde{p}_1}$, and so $\Delta_{RS}^{\tilde{p}_0}=\Delta_{RS}^{\tilde{p}_1}=\Delta_{RS}^{\tilde{p}}$. The index of the reference signal PUCCH resource used is the index of the allocated resource, offset by $\Delta_{RS}^{\tilde{p}}$. That is, the index can be expressed approximately as: $n_{PUCCH\_RS,j}^{(1,\tilde{p}_0)}=n_{PUCCH,j}^{(1,\tilde{p}_0)}+\Delta_{RS}^{\tilde{p}_0}$ for antenna port 0 and $n_{PUCCH\_RS,j}^{(1,\tilde{p}_1)}=n_{PUCCH,j}^{(1,\tilde{p}_1)}+\Delta_{RS}^{\tilde{p}_1}$ for antenna port 1. The definition of the shifted PUCCH reference signal will be discussed further herein.

An example of a 4-resource 3-HARQ-Ack bit STRSD code with the same modulation symbol on ports 0 and 1 is shown in Table 18. This code has common properties with that of Table 17: the PUCCH resource on antenna port 1 can be determined solely by the PUCCH resource on antenna port 0, and the reference signal shifts are in the same direction on both antenna ports. These common properties enable the unified STRSD technique of Table 16 to support both A=3 and A=4. All that is needed in the common code to add support for A=3 is to include columns for A=3 containing values for $n_{PUCCH,j}^{(1,\tilde{p}_1)}$ and $\Delta_{RS}^{\tilde{p}}$.

TABLE 18

4 resource, 3 Ack/Nack bit STRSD code with same modulation symbol on ports 0 and 1

| HARQ-ACK(0) | HARQ-ACK(1) | HARQ-ACK(2) | Antenna Port 0 | | | | Antenna Port 1 | | | |
|---|---|---|---|---|---|---|---|---|---|---|
| | | | Ch #0 | Ch #1 | Ch #2 | Ch #3 | Ch #0 | Ch #1 | Ch #2 | Ch #3 |
| NACK/DTX | NACK | DTX | 1, 1, r | | | | 1, 1, r | | | |
| NACK | NACK/DTX | DTX | 1, 1, r | | | | 1, 1, r | | | |
| ACK | NACK/DTX | NACK/DTX | j, j, r | | | | j, j, r | | | |
| NACK/DTX | ACK | NACK/DTX | -j, -j, r | | | | -j, -j, r | | | |
| ACK | ACK | NACK/DTX | -1, -1, r | | | | -1, -1, r | | | |
| ACK | ACK | ACK | r | -1, -1 | | | r | | | -1, -1 |
| ACK | NACK/DTX | ACK | r | j, j | | | r | | | j, j |
| NACK/DTX | NACK/DTX | NACK | | | 1, 1, r | | | | 1, 1, r | |
| NACK/DTX | NACK/DTX | ACK | | | -1, -1, r | | | | -1, -1, r | |
| NACK/DTX | ACK | ACK | r | -j, -j | | | r | | | -j, -j |
| DTX | DTX | DTX | | | | No Transmission | | | | |

When two Ack/Nack bits are transmitted in the embodiment of Table 16, no reference signal shift is used, and the data and reference signal are on the same PUCCH resource for a given state of Ack/Nack bits. This means that $\Delta_{RS}^{\tilde{p}}=0$ for both antenna ports. Therefore, the A=2 case is a simplified version of STRSD that only requires the PUCCH resources used on the antenna ports in Table 16.

Unified support of both fully resource efficient and less resource efficient modes of operation is given by Table 16. If we consider the A=4 case, four PUCCH resources are used on antenna port 0, and the same four resources are used on antenna port 1, although in a different order. Since 4 resources are used to transmit 4 Ack/Nack bits, and this is the amount of resource needed for single antenna transmission, fully resource efficient operation is possible. For A=2, two PUCCH resources are used on antenna port 0, and two neighboring PUCCH resources (having PUCCH resource indices one greater than those used on antenna port 0) are used on antenna port 1. Since 4 PUCCH resources are used to transmit 2 Ack/Nack bits, this is less PUCCH resource efficient than when 4 A/N bits can be communicated with 4 PUCCH resources.

In one embodiment of unified STRSD, the modulation symbols transmitted simultaneously on two antennas can be different between antenna port 0 and antenna port 1. The modulation symbols may also vary between two slots of a subframe. This antenna-specific and slot-specific modulation is captured in Table 19. Here, the modulation symbol determined using Rel-10 Ack/Nack mapping, b(0)b(1), is used to calculate the modulation symbol used on the antenna ports. Similar to the case of the PUCCH resource mappings of Table 16, since the modulation symbols are determined from the Rel-10 Ack/Nack mapping, they are determined without directly using the Ack/Nack bit states, and so the Rel-10 Ack/Nack mappings do not require modification.

The modulation symbol used on antenna port 0 is the same as in Rel-10, and is the same in both slots of a subframe. This is shown by the column headed by $b^{\tilde{p}0}(0)b^{\tilde{p}0}(1)$, where the values are the same as the column headed by b(0)b(1). The bits b(0)b(1) are the two bits defined in section 5.4.1 of 3GPP TS 36.211, and whose values are assigned in section 10.1 of 3GPP TS 36.213. One example of changes to 3GPP TS 36.213, section 10.1.2.2.1 is shown in bold and italics in Appendix D. The modulation symbol used on antenna port 0 in both slots is indicated by $b^{\tilde{p}0}(0)b^{\tilde{p}0}(1)$, whereas the modulation symbol on antenna port 1 in slot $n'_s$ is indicated by $b^{\tilde{p}1}(0, n'_s)b^{\tilde{p}1}(1, n'_s)$. The modulation symbol slot index $n'_s$ can be either 0 or 1 and is calculated as $n'_s=n_s$ mod 2, where $n_s$ is the slot number from 3GPP TS 36.211. The modulation symbol for antenna port 1 is looked up on the row indicated by the modulation symbol selected by the Rel-10 mappings. For example, if the Rel-10 value of b(0)b(1) is 01, a modulation symbol from one of the values on the second row will be transmitted on antenna port 1. For A=4 Ack/Nack bits, the modulation symbol on antenna port 1 is independent of the Rel-10 PUCCH resource. This is indicated in Table 19 with 'A=4: any $n_{PUCCH,i}^{(1)}$'. For example, if b(0)b(1) is 01, modulation symbol 00 will be transmitted in a first slot (the slot in which $n'_s=0$) on antenna port 1, and modulation symbol 10 will be transmitted in the second slot (the slot in which $n'_s=1$) on antenna port 1.

For A=3 Ack/Nack bits, the Rel-10 PUCCH resource is also used to calculate the modulation symbol on antenna port 1. The dependence on PUCCH resource for A=3 is indicated by 'A=3: $n_{PUCCH,0}^{(1)}$, $n_{PUCCH,1}^{(1)}$' and 'A=3: $n_{PUCCH,2}^{(1)}$' in the table. When the Rel-10 mapping selects $n_{PUCCH,0}^{(1)}$ or $n_{PUCCH,1}^{(1)}$ modulation symbols 01, 00, 10, or 11 may be transmitted in the first slot, whereas 01, 10, 00, or 11 is transmitted on the second slot. However, if $n_{PUCCH,2}^{(1)}$ is selected, 00 or 11 is used in both the first and second slots. Those skilled in the art would note that there are no Ack/Nack bit states corresponding to the second and third rows of the table when A=3 and $n_{PUCCH,2}^{(1)}$ is selected, and so these values in Table 19 are not needed and undefined.

While not shown in Table 19, for A=2 Ack/Nack bits, the modulation symbols are the same on both antenna ports and in both slots. This is because for A=2, any PUCCH resource used on antenna port 0 is not used on antenna port 1, and therefore using different modulation symbols across antennas does not improve the performance of the STRSD codes herein.

TABLE 19

Unified STRSD Modulation symbols for FDD with A = 3 and A = 4

| | | A = 3: $n_{PUCCH,0}^{(1)}$, $n_{PUCCH,1}^{(1)}$ A = 4: any $n_{PUCCH,i}^{(1)}$ | | A = 3: $n_{PUCCH,2}^{(1)}$ |
|---|---|---|---|---|
| b(0)b(1) | $b^{\tilde{p}0}(0)b^{\tilde{p}0}(1)$ | $b^{\tilde{p}1}(0, 0)b^{\tilde{p}1}(1, 0)$ | $b^{\tilde{p}1}(0, 1)b^{\tilde{p}1}(1, 1)$ | $b^{\tilde{p}1}(0)b^{\tilde{p}1}(1)$ |
| 00 | 00 | 01 | 01 | 00 |
| 01 | 01 | 00 | 10 | — |
| 10 | 10 | 10 | 00 | — |
| 11 | 11 | 11 | 11 | 11 |

Alternative embodiments of unified STRSD use only part of or none of Table 19. In a first alternative unified STRSD embodiment, the same modulation symbols are used in both slots on antenna port 1. In this case, $b^{\tilde{p}1}(0,0)b^{\tilde{p}1}(1,0)$ is used in both slots. In a second alternative embodiment, $b^{\tilde{p}0}(0)b^{\tilde{p}0}(1)$ from antenna port 0 is used in both slots on antenna port 1. Both of these alternative embodiments tend to have poorer link performance than the embodiment of Table 19, but have the benefit of reduced implementation complexity.

The parameterization of Table 16 supports FDD. Rel-10 TDD Ack/Nack bit mappings for M=1 are similar, but not identical to FDD. In particular, Rel-10 TDD Ack/Nack bit mappings for M=1 in 3GPP TS 36.213 Table 10.1.3.2-3 and Table 10.1.3.2-4 use PUCCH resource $n_{PUCCH,1}^{(1)}$ when Ack/Nack bits 2 and/or 3 may be DTX, which means that while resource 1 is known, PUCCH resources 2 and/or 3 may not be known. This is incompatible with the PUCCH resource combinations used in the STRSD code of Table 14 used for the design of unified STRSD for A=4, where if resource 1 is used on antenna port 0, resource 3 should be transmitted on antenna port 1. In general, the TDD Ack/Nack bit mappings' use of both resources 0 and 1 when SCell is DTX makes it challenging to develop a simple design that uses 4 resources for the A=3 and A=4 Ack/Nack bit cases. We therefore consider alternatives that use more than 4 PUCCH resources for a unified STRSD design.

In one example, an embodiment of unified STRSD for TDD with M=1 using at most 5 resources is shown in Table 20. For A=2 and A=3, the PUCCH resources are determined using only $n_{PUCCH,i}^{(1)}$, as was done in Table 16. Also, for A=2, the resources used for both data and reference signals are the same as those in Table 16. However, for A=3, in TDD SCell may be DTX and therefore resource $n_{PUCCH,2}^{(1)}$ may not be always available when $n_{PUCCH,1}^{(1)}$ is available. Therefore, for A=3, $n_{PUCCH,1}^{(1)}$+1 is additionally used, for a total of 5 resources. In Table 20 for A=3, the data and reference signal on antenna port 0 are transmitted on the same PUCCH resource. In other words, the shift for antenna port 0, $\Delta_{RS}^{\tilde{p}0}$, is zero. Because it is a constant, the shift is not included in the table for A=3. However, the reference signal resource shift on antenna port 1, $\Delta_{RS}^{\tilde{p}1}$, is not a constant for A=3. When $n_{PUCCH,0}^{(1)}$ is selected $\Delta_{RS}^{\tilde{p}1}$ is 1, and $\Delta_{RS}^{\tilde{p}1}$ is 0 when $n_{PUCCH,1}^{(1)}$ or $n_{PUCCH,2}^{(1)}$ is selected.

For A=4, unlike Table 16, the PUCCH resource and reference signal resource shifts in Table 20 are determined using b(0)b(1) as well as $n_{PUCCH,i}^{(1,\tilde{p})}$. When b(0)b(1)=00 or b(0)b(1)=11, the PUCCH resources under column b(0)b(1)={00, 11} are used to determine the PUCCH resource, and when b(0)b(1)=01 or b(0)b(1)=10, the columns under b(0)b(1)={01,10} are used to determine the PUCCH resource and shifts. For example, when b(0)b(1)=01 and $n_{PUCCH,0}^{(1)}$ is selected, PUCCH resource on antenna port 1 is $n_{PUCCH,3}^{(1)}$, and the PUCCH resource shifts on antenna ports 0 and 1, respectively, are 1 and −1. As is the case for A=3, 5 resources are used for A=4. Also the additional resource beyond those used for single antenna transmission with A=4 is $n_{PUCCH,3}^{(1)}$+1.

TABLE 20

TDD Unified STRSD PUCCH Resource and RS values with at most 5 resources

| | | | | A = 4 | | | | | |
|---|---|---|---|---|---|---|---|---|---|
| A = 2 | A = 3 | | | b(0)b(1) = {00, 11} | | | b(0)b(1) = {01, 10} | | |
| $n_{PUCCH,i}^{(1)}$ | $n_{PUCCH,j}^{(1,\tilde{p}0)}$ | $n_{PUCCH,j}^{(1,\tilde{p}1)}$ | $n_{PUCCH,j}^{(1,\tilde{p}1)}$ | $\Delta_{RS}^{\tilde{p}1}$ | $n_{PUCCH,j}^{(1,\tilde{p}1)}$ | $\Delta_{RS}^{\tilde{p}0}$ | $\Delta_{RS}^{\tilde{p}1}$ | $n_{PUCCH,j}^{(1,\tilde{p}1)}$ | $\Delta_{RS}^{\tilde{p}0}$ | $\Delta_{RS}^{\tilde{p}1}$ |
| $n_{PUCCH,0}^{(1)}$ | $n_{PUCCH,0}^{(1)}$ | $n_{PUCCH,0}^{(1)}$+1 | $n_{PUCCH,1}^{(1)}$ | 1 | $n_{PUCCH,1}^{(1)}$ | 0 | 0 | $n_{PUCCH,3}^{(1)}$ | 1 | −1 |
| $n_{PUCCH,1}^{(1)}$ | $n_{PUCCH,1}^{(1)}$ | $n_{PUCCH,1}^{(1)}$+1 | $n_{PUCCH,1}^{(1)}$+1 | 0 | $n_{PUCCH,3}^{(1)}$ | −1 | −1 | $n_{PUCCH,0}^{(1)}$ | 0 | 0 |
| $n_{PUCCH,2}^{(1)}$ | $n_{PUCCH,2}^{(1)}$ | — | $n_{PUCCH,2}^{(1)}$+1 | 0 | $n_{PUCCH,3}^{(1)}$+1 | 0 | 0 | $n_{PUCCH,3}^{(1)}$+1 | 0 | 0 |
| $n_{PUCCH,3}^{(1)}$ | $n_{PUCCH,3}^{(1)}$ | — | — | 0 | $n_{PUCCH,2}^{(1)}$ | 0 | 2 | $n_{PUCCH,2}^{(1)}$ | 0 | 2 |

As for FDD, an embodiment with improved performance can be obtained for TDD with M=1 when the modulation symbols transmitted simultaneously on two antennas are different between antenna port 0 and antenna port 1 and when they vary between slots. This is represented in Table 21, using the same notation and methods for determining the modulation symbols on the antennas and slots from b(0)b(1) and/or $n_{PUCCH,i}^{(1)}$ as in Table 19. However, in Rel-10 specifications for TDD with M=1 with A=3, PUCCH resource $n_{PUCCH,0}^{(1)}$ is transmitted with only two values of the modulation symbol: b(0)b(1)=00 or b(0)b(1)=11. By contrast, FDD can attain all 4 values of the modulation symbol, i.e. b(0)b(1)={00,01,10,11}. Because of this difference, the modulation symbol mapping used in this embodiment with Table 21 is different for A=3 than for FDD in Table 19. One set of four modulation values that are the same for both slots is associated with resources $n_{PUCCH,0}^{(1)}$ and $n_{PUCCH,1}^{(1)}$, whereas another set of modulation values that can vary across the slots is associated with $n_{PUCCH,2}^{(1)}$. Similarly, for unified STRSD with A=4, only two values of the modulation symbols are transmitted on resources $n_{PUCCH,0}^{(1)}$ and $n_{PUCCH,1}^{(1)}$ on antenna port 1. This allows the same values for $b^{\tilde{p}1}(0)b^{\tilde{p}1}(1)$ to be used for both A=3 and A=4 when $n_{PUCCH,0}^{(1)}$ and $n_{PUCCH,1}^{(1)}$ are selected. Also, because the modulation symbols are distributed evenly over each resource, in Table 21 when $n_{PUCCH,2}^{(1)}$ is selected for A=3, or for A=4 when $n_{PUCCH,2}^{(1)}$ or $n_{PUCCH,3}^{(1)}$ are selected, the same modulation values can be used for both slots as for FDD in Table 19 with A=4. An example of changes to the 3GPP TS 36.213, section 10.1.3.2.1 is shown in bold and italics in Appendix E.

TABLE 21

Unified STRSD Modulation symbols for TDD with M = 1 and A = 3 and A = 4 with at most 5 resources

| | A = 3, A = 4: $n_{PUCCH,0}^{(1)}$, $n_{PUCCH,1}^{(1)}$ | | A = 3: $n_{PUCCH,2}^{(1)}$ A = 4: $n_{PUCCH,2}^{(1)}$, $n_{PUCCH,3}^{(1)}$ | |
|---|---|---|---|---|
| b(0)b(1) | $b^{\tilde{p}0}(0)b^{\tilde{p}0}(1)$ | $b^{\tilde{p}1}(0)b^{\tilde{p}1}(1)$ | $b^{\tilde{p}1}(0,0)b^{\tilde{p}1}(1,0)$ | $b^{\tilde{p}1}(0,1)b^{\tilde{p}1}(1,1)$ |
| 00 | 00 | 00 | 01 | 01 |
| 01 | 01 | 01 | 00 | 10 |

TABLE 21-continued

Unified STRSD Modulation symbols for TDD with M = 1 and
A = 3 and A = 4 with at most 5 resources

| | | A = 3, A = 4: $n_{PUCCH,0}^{(1)}, n_{PUCCH,1}^{(1)}$ | A = 3: $n_{PUCCH,2}^{(1)}$ A = 4: $n_{PUCCH,2}^{(1)}, n_{PUCCH,3}^{(1)}$ | |
|---|---|---|---|---|
| b(0)b(1) | $b^{\tilde{p}0}(0)b^{\tilde{p}0}(1)$ | $b^{\tilde{p}1}(0)b^{\tilde{p}1}(1)$ | $b^{\tilde{p}1}(0,0)b^{\tilde{p}1}(1,0)$ | $b^{\tilde{p}1}(0,1)b^{\tilde{p}1}(1,1)$ |
| 10 | 10 | 10 | 10 | 00 |
| 11 | 11 | 11 | 11 | 11 |

Alternative embodiments of unified STRSD using Table 20 and Table 21 use only part of or none of Table 21. In a first alternative of the unified STRSD embodiment of Table 21, the same modulation symbols are used in both slots on antenna port 1. In this case, $b^{\tilde{p}1}(0,0)b^{\tilde{p}1}(1,0)$ is used in both slots. In a second alternative embodiment, $b^{\tilde{p}0}(0)b^{\tilde{p}0}(1)$ from antenna port 0 is used in both slots on antenna port 1. Both of these alternative embodiments tend to have poorer link performance than the embodiment of Table 21, but have the benefit of reduced implementation complexity.

The embodiment of Table 20 is advantageous in that it uses 5 PUCCH resources for up to 4 Ack/Nack bits, and is therefore relatively resource efficient. However, a less complex, but somewhat less resource efficient embodiment using 6 PUCCH resources for TDD with M=1 and A=4 is also possible. This is provided in Table 22. The elements of the) table for A=2 and A=3 are the same as those of Table 20. However, for A=4, two more resources beyond those used for single antenna transmission are used: $n_{PUCCH,1}^{(1)}+1$ and $n_{PUCCH,3}^{(1)}+1$. Unlike Table 20, for A=4, the PUCCH resource $n_{PUCCH,j}^{(1,\tilde{p}1)}$ and the reference signal shift $\Delta_{RS}^{\tilde{p}1}$ used on antenna port 1 do not depend on b(0)b(1). Instead, $n_{PUCCH,j}^{(1,\tilde{p}1)}$ and $\Delta_{RS}^{\tilde{p}1}$ are determined from the Rel-10 selected PUCCH resource, $n_{PUCCH,j}^{(1)}$. The increased number of resources allows this simpler mapping to be used.

TABLE 22

TDD Unified STRSD PUCCH Resource
and RS values at most 6 PUCCH resources

| A = 2 | | A = 3 | | | A = 4 | |
|---|---|---|---|---|---|---|
| $n_{PUCCH,j}^{(1)}$ | $n_{PUCCH,j}^{(1,\tilde{p}0)}$ | $n_{PUCCH,j}^{(1,\tilde{p}1)}$ | $n_{PUCCH,j}^{(1,\tilde{p}1)}$ | $\Delta_{RS}^{\tilde{p}1}$ | $n_{PUCCH,j}^{(1,\tilde{p}1)}$ | $\Delta_{RS}^{\tilde{p}1}$ |
| $n_{PUCCH,0}^{(1)}$ | $n_{PUCCH,0}^{(1)}$ | $n_{PUCCH,0}^{(1)}+1$ | $n_{PUCCH,1}^{(1)}$ | 1 | $n_{PUCCH,1}^{(1)}$ | 1 |
| $n_{PUCCH,1}^{(1)}$ | $n_{PUCCH,1}^{(1)}$ | $n_{PUCCH,1}^{(1)}+1$ | $n_{PUCCH,1}^{(1)}+1$ | 0 | $n_{PUCCH,1}^{(1)}+1$ | 0 |
| $n_{PUCCH,2}^{(1)}$ | $n_{PUCCH,2}^{(1)}$ | — | $n_{PUCCH,2}^{(1)}+1$ | 0 | $n_{PUCCH,3}^{(1)}$ | 1 |
| $n_{PUCCH,3}^{(1)}$ | $n_{PUCCH,3}^{(1)}$ | — | — | 0 | $n_{PUCCH,3}^{(1)}+1$ | 0 |

The performance of the embodiment of Table 22 can be improved (at the cost of some additional complexity) by using the modulation coding of Table 23 in the same way as was done for Table 20 using Table 21. This embodiment uses the resources determined by Table 22 and the modulation symbols for each antenna and slot determined by Table 23. Table 23 has the same values as Table 21 for A=3, but is different because A=4 in Table 22 uses 6 resources with a different distribution of modulation symbols over the PUCCH resources than Table 20. Since for A=4 in Table 22, the modulation symbols are distributed evenly over each resource, the same modulation values can be used for both slots as for FDD for A=4.

TABLE 23

Unified STRSD Modulation symbols for TDD with M = 1 and
A = 3 and A = 4 with at most 6 resources

| | | A = 3: $n_{PUCCH,0}^{(1)}, n_{PUCCH,1}^{(1)}$ | A = 3: $n_{PUCCH,2}^{(1)}$ A = 4: any $n_{PUCCH,i}^{(1)}$ | |
|---|---|---|---|---|
| b(0)b(1) | $b^{\tilde{p}0}(0)b^{\tilde{p}0}(1)$ | $b^{\tilde{p}1}(0)b^{\tilde{p}1}(1)$ | $b^{\tilde{p}1}(0,0)b^{\tilde{p}1}(1,0)$ | $b^{\tilde{p}1}(0,1)b^{\tilde{p}1}(1,1)$ |
| 00 | 00 | 00 | 01 | 01 |
| 01 | 01 | 01 | 00 | 10 |
| 10 | 10 | 10 | 10 | 00 |
| 11 | 11 | 11 | 11 | 11 |

Alternative embodiments of unified STRSD using Table 22 and Table 23 use only part of Table 23. In a first alternative to the unified STRSD embodiment of Table 22 and Table 23, the same modulation symbols are used in both slots on antenna port 1. In this case, $b^{\tilde{p}1}(0,0)b^{\tilde{p}1}(1,0)$ is used in both slots. In a second alternative embodiment, $b^{\tilde{p}0}(0)b^{\tilde{p}0}(1)$ from antenna port 0 is used in both slots on antenna port 1. Both of these alternative embodiments tend to have poorer link performance than the embodiment of Table 22 and Table 23, but have the benefit of reduced implementation complexity.

The performance of embodiments using Table 22 can be further improved for A=4 by instead using Table 24 to determine PUCCH resources. In this case, with A=4, the PUCCH resource used on antenna port 1 and the reference signal shift depend on both $n_{PUCCH,i}^{(1)}$ and b (0)b(1). This dependency is similar to that of Table 20, and the same notation is used as in Table 20. The additional performance stems from the better distance properties achieved for this unified STRSD code with the additional dependency on b (0)b(1).

needed for antenna port 1 in STRSD schemes may not be available. Therefore, resources for antenna port 1 are determined differently when two antenna ports are configured for PUCCH and for a subframe with M>1. In this case, the PUCCH resources transmitted on the antenna ports are determined according to $n_{PUCCH,i}^{(1,\tilde{p}0)}=n_{PUCCH,i}^{(1)}$ and $n_{PUCCH,i}^{(1,\tilde{p}1)}=n_{PUCCH,i}^{(1)}+1$, and the same modulation symbol is transmitted on antenna ports 0 and 1. For TDD in a subframe with M=1, resources are determined according to Table 20.

Determining the PUCCH resource for antenna port 1 from $n_{PUCCH,i}^{(1)}$ with this fixed offset and transmitting the same modulation symbol on both antenna ports can provide a low complexity TxD technique. Determining $n_{PUCCH,i}^{(1,\tilde{p}1)}$ using $n_{PUCCH,i}^{(1,\tilde{p}1)}=n_{PUCCH,i}^{(1)}+1$ can have the further advantage that RRC signaling to indicate the resources that may be used on antenna port 1 is not needed. This can reduce the downlink signaling overhead, as well as signaling protocol complexity. Because the transmissions on antenna port 0 are the same for

TABLE 24

Alternative TDD Unified STRSD PUCCH Resource and RS values with at most 6 resources

| | A = 2 | A = 3 | | A = 4 | | | | | |
|---|---|---|---|---|---|---|---|---|---|
| | | | | b(0)b(1) = {00, 11} | | | b(0)b(1) = {01, 10} | | |
| $n^{(1)}_{PUCCH,i}$ | $n_{PUCCH,j}^{(1,\tilde{p}0)}$ | $n_{PUCCH,j}^{(1,\tilde{p}1)}$ | $n_{PUCCH,j}^{(1,\tilde{p}1)}$ | $\Delta_{RS}^{\tilde{p}1}$ | $n_{PUCCH,j}^{(1,\tilde{p}1)}$ | $\Delta_{RS}^{\tilde{p}0}$ | $\Delta_{RS}^{\tilde{p}1}$ | $n_{PUCCH,j}^{(1,\tilde{p}1)}$ | $\Delta_{RS}^{\tilde{p}0}$ | $\Delta_{RS}^{\tilde{p}1}$ |
| $n_{PUCCH,0}^{(1)}$ | $n_{PUCCH,0}^{(1)}$ | $n_{PUCCH,0}^{(1)}+1$ | $n_{PUCCH,1}^{(1)}$ | 1 | $n_{PUCCH,1}^{(1)}+1$ | 0 | 0 | $n_{PUCCH,1}^{(1)}+1$ | 0 | 0 |
| $n_{PUCCH,1}^{(1)}$ | $n_{PUCCH,1}^{(1)}$ | $n_{PUCCH,1}^{(1)}+1$ | $n_{PUCCH,1}^{(1)}+1$ | 0 | $n_{PUCCH,3}^{(1)}+1$ | 0 | −1 | $n_{PUCCH,0}^{(1)}$ | 0 | 2 |
| $n_{PUCCH,2}^{(1)}$ | $n_{PUCCH,2}^{(1)}$ | — | $n_{PUCCH,2}^{(1)}+1$ | 0 | $n_{PUCCH,3}^{(1)}$ | 0 | 1 | $n_{PUCCH,1}^{(1)}+1$ | 0 | −2 |
| $n_{PUCCH,3}^{(1)}$ | $n_{PUCCH,3}^{(1)}$ | — | — | 0 | $n_{PUCCH,3}^{(1)}+1$ | 0 | 0 | $n_{PUCCH,3}^{(1)}+1$ | 0 | 0 |

The performance of the embodiment of Table 24 can be improved (at the cost of some additional complexity) by using the modulation coding of Table 25 in the same way as was done for Table 20 using Table 21. This embodiment uses the resources determined by Table 24 and the modulation symbols for each antenna and slot determined by Table 25.

single antenna transmission and for transmit diversity and since the PUCCH transmissions on the antennas are on orthogonal resources, another benefit is that the eNB can receive as though the UE is transmitting on one antenna while the UE is being reconfigured between single antenna transmission and transmit diversity. Furthermore, transmitting the

TABLE 25

Alternative TDD Unified STRSD Modulation symbols with at most 6 resources

| | | | A = 3: $n_{PUCCH,2}^{(1)}$ | |
| | | A = 3: $n_{PUCCH,0}^{(1)}, n_{PUCCH,1}^{(1)}$ | A = 4: $n_{PUCCH,0}^{(1)}, n_{PUCCH,3}^{(1)}$ | |
| | | A = 4: $n_{PUCCH,1}^{(1)}, n_{PUCCH,2}^{(1)}$ | | |
| b(0)b(1) | $b^{\tilde{p}0}(0)b^{\tilde{p}0}(1)$ | $b^{\tilde{p}1}(0)b^{\tilde{p}1}(1)$ | $b^{\tilde{p}1}(0,0)b^{\tilde{p}1}(1,0)$ | $b^{\tilde{p}1}(0,1)b^{\tilde{p}1}(1,1)$ |
|---|---|---|---|---|
| 00 | 00 | 00 | 01 | 01 |
| 01 | 01 | 01 | 00 | 10 |
| 10 | 10 | 10 | 10 | 00 |
| 11 | 11 | 11 | 11 | 11 |

Alternative embodiments of unified STRSD using Table 24 and Table 25 use only part of Table 25. In a first alternative of the unified STRSD embodiment of Table 24 and Table 25, the same modulation symbols are used in both slots on antenna port 1. In this case, $b^{\tilde{p}1}(0,0)b^{\tilde{p}1}(1,0)$ is used in both slots. In a second alternative embodiment, $b^{\tilde{p}0}(0)b^{\tilde{p}0}(1)$ from antenna port 0 is used in both slots on antenna port 1. Both of these alternative embodiments tend to have poorer link performance than the embodiment of Table 24 and Table 25, but have the benefit of reduced implementation complexity.

Rel-10 TDD HARQ-ACK multiplexing supports M up to 4, and so in one embodiment, TxD can be supported for M>1. Rel-10 TDD Ack/Nack states for M>1 are such that resources same modulation symbol on the two ports using two distinct PUCCH resources can provide good diversity gain. This approach doubles the number of PUCCH resources over that used by a single antenna, but in cases where it is not necessary to minimize the number of PUCCH resources used, it may be an attractive approach. Therefore, an embodiment for both FDD and all values of M for TDD determines the PUCCH resources transmitted on antenna ports 0 and 1 according to $n_{PUCCH,i}^{(1,\tilde{p}0)}=n_{PUCCH,i}^{(1)}$ and $n_{PUCCH,i}^{(1,\tilde{p}1)}=n_{PUCCH,i}^{(1)}+1$, and transmits the same modulation symbol on both antennas. In general, the embodiment may use offsets other than 1, such that the orthogonal resource transmitted on antenna port 1 is an orthogonal resource whose index is the sum of a predetermined offset and an index of the orthogonal resource used on antenna port 0. This may be expressed as $n_{PUCCH,i}^{(1,\tilde{p}1)} = n_{PUCCH,i}^{(1)} + \Delta_{offset}^{PUCCH}$, where $\Delta_{offset}^{PUCCH}$ is an integer and is known to both the eNB and UE. The orthogonal resource offset $\Delta_{offset}^{PUCCH}$ may be predetermined via RRC signaling or a fixed value set in specifications. This embodiment can be used when PUCCH resources are explicitly signaled, such as when the UE is configured for semi-persistent scheduling or is configured to use ARI in carrier aggregation.

An alternative embodiment of the low complexity TxD technique can improve implicit resource allocation performance for FDD or for TDD with M=1 when the UE is configured for 2 downlink cells and at least one cell uses MIMO. As in the first embodiment of the low complexity TxD technique, $n_{PUCCH,i}^{(1,\tilde{p}0)} = n_{PUCCH,i}^{(1)}$. However, it can be advantageous to use two values for $\Delta_{offset}^{PUCCH}$, depending on whether a serving cell is configured for MIMO or not. In the first embodiment of the low complexity TxD technique, one offset is used independently of whether MIMO is used on a cell or not. When $\Delta_{offset}^{PUCCH} > 1$, the PUCCH resources on antenna port 1 are farther apart from those used on antenna port 0, thus likely requiring the UE to use more PUCCH resources than when $\Delta_{offset}^{PUCCH} = 1$. However, it can be desirable to have $\Delta_{offset}^{PUCCH} > 1$ when MIMO is used in order to ensure that different resources are used on antenna ports 0 and 1.

Therefore, in this alternative embodiment for FDD or for TDD in a subframe with M=1, when $n_{PUCCH,i}^{(1)}$ is implicitly allocated, being determined at least in part by the index of the first PDCCH CCE occupied by the grant transmitted to the UE, then $n_{PUCCH,i}^{(1,\tilde{p}1)} = n_{PUCCH,i}^{(1)} + \Delta_{offset,c}^{PUCCH}$, where $\Delta_{offset,c}^{PUCCH} = 1$ when 1 transport block is transmitted on the PDSCH of serving cell c using a transmission mode that supports 1 transport block (for example when MIMO transmission to the UE is not configured for the serving cell), and $\Delta_{offset,c}^{PUCCH} = 2$ when 1 or 2 transport blocks are transmitted on the PDSCH of serving cell c using a transmission mode that supports up to two transport blocks (for example when MIMO transmission to the UE is configured for the serving cell). The index c is the index of the serving cell transmitting a PDSCH for which HARQ-Ack bit(s) are indicated by the UE using one or more of the resource pairs $n_{PUCCH,i}^{(1,\tilde{p}0)}$ and $n_{PUCCH,i}^{(1,\tilde{p}1)}$. For TDD with M>1, $n_{PUCCH,i}^{(1,\tilde{p}1)} = n_{PUCCH,i}^{(1)} + \Delta_{offset,c}^{PUCCH}$ is also used, but $\Delta_{offset,c}^{PUCCH} = 1$ regardless of whether a cell is configured for MIMO or not. This is because Rel-10 LTE TDD uses a single HARQ-Ack bit for both MIMO transport blocks when M>1, and the needed number of Ack/Nack bits and PUCCH resources is the same whether MIMO is configured or not. In general, all versions of this alternative embodiment determine implicitly allocated PUCCH resources using the position of scheduling grants in downlink control channels that allocate the PDSCH's transmission to the UE. Therefore, the versions of this alternative embodiment are not restricted to using PDCCH.

The operation of the alternative embodiment for FDD or for TDD in a subframe with M=1 can be further understood using Table 26 below. The PUCCH resources on antenna port 1, $n_{PUCCH,i}^{(1,\tilde{p}1)}$, are associated with the offset for the serving cells $\Delta_{offset,c}^{PUCCH}$ according to the MIMO configuration, as shown in the table. The values of $n_{PUCCH,i}^{(1,\tilde{p}1)}$ are given in the columns of the table according to the number of HARQ-Ack bits transmitted, A. Considering for example the 3 HARQ-Ack bit case, the resources $n_{PUCCH,0}^{(1)}$, $n_{PUCCH,1}^{(1)}$, or $n_{PUCCH,2}^{(1)}$ are transmitted on antenna port 0, the associated serving cell offsets are $\Delta_{offset,0}^{PUCCH} = 2$, $\Delta_{offset,0}^{PUCCH} = 2$, and $\Delta_{offset,1}^{PUCCH} = 1$, respectively, and the resources transmitted on antenna port 1 are $n_{PUCCH,0}^{(1)} + 2$, $n_{PUCCH,1}^{(1)} + 2$, and $n_{PUCCH,2}^{(1)} + 2$, respectively. Only one column is needed for A=3 in this embodiment because when there are 3 HARQ-Ack bits, the cell configured for MIMO, is always indexed first, corresponding to c=0.

TABLE 26

PUCCH resources used on antenna port 1 for 2, 3, and 4 HARQ-Ack bits $n_{PUCCH,i}^{(1,\tilde{p}1)}$

| A = 2 | A = 3 | A = 4 |
|---|---|---|
| $n_{PUCCH,0}^{(1)} + \Delta_{offset,0}^{PUCCH} = n_{PUCCH,0}^{(1)} + 1$ <br> $n_{PUCCH,1}^{(1)} + \Delta_{offset,1}^{PUCCH} = n_{PUCCH,1}^{(1)} + 1$ | $n_{PUCCH,0}^{(1)} + \Delta_{offset,0}^{PUCCH} = n_{PUCCH,0}^{(1)} + 2$ <br> $n_{PUCCH,1}^{(1)} + \Delta_{offset,0}^{PUCCH} = n_{PUCCH,1}^{(1)} + 2$ <br> $n_{PUCCH,2}^{(1)} + \Delta_{offset,1}^{PUCCH} = n_{PUCCH,2}^{(1)} + 1$ | $n_{PUCCH,0}^{(1)} + \Delta_{offset,0}^{PUCCH} = n_{PUCCH,0}^{(1)} + 2$ <br> $n_{PUCCH,1}^{(1)} + \Delta_{offset,0}^{PUCCH} = n_{PUCCH,1}^{(1)} + 2$ <br> $n_{PUCCH,2}^{(1)} + \Delta_{offset,1}^{PUCCH} = n_{PUCCH,2}^{(1)} + 2$ <br> $n_{PUCCH,3}^{(1)} + \Delta_{offset,1}^{PUCCH} = n_{PUCCH,3}^{(1)} + 2$ |

A benefit of the alternative embodiment of the low complexity TxD technique can be seen by considering how many times $\Delta_{offset,c}^{PUCCH} = 2$ is used for a given number of HARQ-Ack bits. For example, for 2 HARQ-Ack bits, $\Delta_{offset,c}^{PUCCH} = 1$, and so the PUCCH resources used on antenna port 1 are $n_{PUCCH,0}^{(1,\tilde{p}1)} = n_{PUCCH,0}^{(1)} + 1$ and $n_{PUCCH,1}^{(1,\tilde{p}1)} = n_{PUCCH,1}^{(1)} + 1$, and both are adjacent to those used on antenna port 0. If $n_{PUCCH,0}^{(1)}$ and $n_{PUCCH,1}^{(1)}$ are derived implicitly from PDCCHs with aggregation level 2 or more, then because single layer transmission is used for both cells, and the PUCCH resources $n_{PUCCH,0}^{(1)} + 1$ and $n_{PUCCH,1}^{(1)} + 1$ would not normally be usable. Therefore, in this case, the additional resources used on antenna port 1 for transmit diversity have little or no impact on PUCCH resource efficiency for implicitly derived PUCCH resources. By contrast, if a fixed value of $\Delta_{offset,c}^{PUCCH} = 2$ is used for both single layer and MIMO transmission, then for 2 HARQ-Ack bits, PUCCH resources $n_{PUCCH,0}^{(1,\tilde{p}1)} = n_{PUCCH,0}^{(1)} + 2$ and $n_{PUCCH,1}^{(1,\tilde{p}1)} = n_{PUCCH,1}^{(1)} + 2$ are used. Because the resources on antenna port 0 and 1 separated by two, then the implicit PUCCH resource efficiency is not as good, because the PDCCH aggregation levels must be 4 or more to have little or no impact on resource efficiency.

A first version of the alternative embodiment of the low complexity TxD technique is applied for both implicitly and explicitly allocated PUCCH resources, as is done in the first embodiment of the low complexity TxD technique. In this case, $n_{PUCCH,i}^{(1,\tilde{p}1)} = n_{PUCCH,i}^{(1)} + \Delta_{offset,c}^{PUCCH}$ is used to assign PUCCH resources for antenna port 1 when $n_{PUCCH,i}^{(1)}$ is either explicitly or implicitly allocated. As described above, when $n_{PUCCH,i}^{(1)}$ is implicitly allocated, being determined at least in part by the position of a grant in a downlink control channel, then $\Delta_{offset,c}^{PUCCH} = 1$ or $\Delta_{offset,c}^{PUCCH} = 2$, depending on the number of transport blocks transmitted on the PDSCH of serving cell c. When $n_{PUCCH,i}^{(1)}$ is explicitly allocated, being determined at least in part by selecting a resource from a list of resources allocated to the UE in UE specific signaling, then $\Delta_{offset,c}^{PUCCH}=1$. Because the resources on antenna ports 0 and 1 are directly derived from PUCCH resources already allocated by Rel-10 signaling, that is, since $n_{PUCCH,i}^{(1,\tilde{p}_0)}=n_{PUCCH,i}^{(1)}$ and $n_{PUCCH,i}^{(1,\tilde{p}_1)}=n_{PUCCH,i}^{(1)}+\Delta_{offset,c}^{PUCCH}$, when all values of $\Delta_{offset,c}^{PUCCH}$ are determined by rules in specifications, no additional UE specific signaling such as RRC signaling is needed to indicate to the UE which PUCCH resources are needed for transmit diversity or to indicate $\Delta_{offset,c}^{PUCCH}$.

A second version of the alternative embodiment of the low complexity TxD technique assigns PUCCH resources for antenna ports 0 and 1 with $n_{PUCCH,i}^{(1,\tilde{p}_0)}=n_{PUCCH,i}^{(1)}$ and $n_{PUCCH,i}^{(1,\tilde{p}_1)}=n_{PUCCH,i}^{(1)}+\Delta_{offset,c}^{PUCCH}$ only for implicit PUCCH resources. In this case, PUCCH resources for a PDSCH transmission on a cell where there is not a corresponding PDCCH are derived from sets of explicitly signaled PUCCH resource pairs, the pairs corresponding to antenna ports 0 and 1. When ARI is used and 1 transport block is transmitted to the UE on the PDSCH of serving cell c using a transmission mode that supports 1 transport block, each value of the ARI corresponds to a pair of resources used on antenna ports 0 and 1, ($n_{PUCCH,i}^{(1,\tilde{p}_0)}$, $n_{PUCCH,i}^{(1,\tilde{p}_1)}$). When ARI is used and 1 or 2 transport blocks are transmitted to the UE on the PDSCH of serving cell c using a transmission mode that supports up to two transport blocks, each value of the ARI corresponds to a group of 4 resources used on antenna ports 0 and 1, ($n_{PUCCH,i}^{(1,\tilde{p}_0)}$, $n_{PUCCH,i}^{(1,\tilde{p}_1)}$, $n_{PUCCH,i+1}^{(1,\tilde{p}_0)}$, $n_{PUCCH,i+1}^{(1,\tilde{p}_1)}$). The resource pairs or groups for each ARI value are signaled to the UE using dedicated signaling such as RRC signaling. When ARI is not used for explicitly allocated PUCCH resources (such as when PDSCH is semi-persistently scheduled), one PUCCH resource pair or group for antenna ports 0 and 1 is used per PDSCH transmission on a cell, where a group is used when 1 or 2 transport blocks are transmitted to the UE on the PDSCH of serving cell c using a transmission mode that supports up to two transport blocks, and a pair is used when 1 transport block is transmitted to the UE on the PDSCH of serving cell c using a transmission mode that supports one transport block. The resource pairs or groups are signaled to the UE using dedicated signaling such as RRC signaling.

When PUCCH resources are allocated by a mixture of implicit and explicit resource allocation, the UE selects the orthogonal resources to transmit from a union of the implicitly and explicitly allocated resources. In this case, some resources will be allocated implicitly using $n_{PUCCH,i}^{(1,\tilde{p}_0)}=n_{PUCCH,i}^{(1)}$ and $n_{PUCCH,i}^{(1,\tilde{p}_1)}=n_{PUCCH,i}^{(1)}+\Delta_{offset,c}^{PUCCH}$, while others will be allocated explicitly using ($n_{PUCCH,j}^{(1,\tilde{p}_0)}$, $n_{PUCCH,j}^{(1,\tilde{p}_1)}$) or ($n_{PUCCH,j}^{(1,\tilde{p}_0)}$, $n_{PUCCH,j}^{(1,\tilde{p}_1)}$, $n_{PUCCH,j+1}^{(1,\tilde{p}_0)}$, $n_{PUCCH,j+1}^{(1,\tilde{p}_1)}$), where i≠j and i≠j+1 for all values of i and j. In this way, each PUCCH resource in the union of resources is allocated once, even though the resources are allocated by different mechanisms.

In summary, unified STRSD can support all Rel-10 modes of FDD and TDD where channel selection is used. Resource efficient operation is supported for FDD and TDD with M=1, whereas a less resource efficient operation (but still with improved required transmit power relative to single antenna transmission) is used for TDD with M>1. Unified STRSD can be implemented without changing Rel-10 Ack/Nack mapping tables in section 10.1 of 36.213, which simplifies the design as well as the specification effort of PUCCH TxD. Because all PUCCH resources can be determined with fixed rules from the Rel-10 allocated resource, additional RRC signaling to indicate the PUCCH resources used on antenna port 1 is not needed.

As described above, 'PUCCH resource' in 3GPP parlance refers to an indexed resource referring to a resource block and an orthogonal resource used to carry data and reference signals. Orthogonal resources used for reference symbols are generated in a similar manner as data symbols. They are also generated using a cyclic shift and an orthogonal cover sequence applied to multiple reference signal uplink modulation symbols. Because there are a different number of reference and data modulation symbols in a slot, the orthogonal cover sequences are of different length for data and for reference signals. Nevertheless, there are an equal number of orthogonal resources available for data and for reference signals. Therefore, a single index can be used to refer to the two orthogonal resources used by a UE for both the data and reference signals, and this has been used since Rel-8. This index is signaled in Rel-8 as a PUCCH resource index, and is indicated in the LTE specifications as the variable $n_{PUCCH}^{(1)}$.

With regard to shifted PUCCH reference signal, in accordance with 3GPP TS 36.211, the reference symbol sequence is determined based on a sequence found in Section 5.5.1, where the antenna port specific cyclic shift $\alpha_{\tilde{p}}(n_s,l)$ for a particular symbol and slot, with $M_{sc}^{RS}=12$ and a PUCCH format 1, 1a and 1b, is denoted by:

$$\bar{n}_{oc}^{(\tilde{p})}(n_s) = \lfloor n'_{\tilde{p}}(n_s) \cdot \Delta_{shift}^{PUCCH}/N' \rfloor$$

$$\alpha_{\tilde{p}}(n_s, l) = 2\pi \cdot \bar{n}_{cs}^{(\tilde{p})}(n_s, l)/N_{sc}^{RB}$$

$$\bar{n}_{cs}^{(\tilde{p})}(n_s, l) = \begin{cases} [n_{cs}^{cell}(n_s, l) + (n'_{\tilde{p}}(n_s) \cdot \Delta_{shift}^{PUCCH} + (\bar{n}_{oc}^{(\tilde{p})}(n_s) \bmod \Delta_{shift}^{PUCCH})) \bmod N'] \bmod N_{sc}^{RB} & \text{for normal cyclic prefix} \\ [n_{cs}^{cell}(n_s, l) + (n'_{\tilde{p}}(n_s) \cdot \Delta_{shift}^{PUCCH} + \bar{n}_{oc}^{(\tilde{p})}(n_s)) \bmod N'] \bmod N_{sc}^{RB} & \text{for extended cyclic prefix} \end{cases}$$

In the above equation, the cyclic shift $\alpha_{\tilde{p}}(n_s,l)$ is proportional to the cell specific cyclic shift $n_{cs}^{cell-k}(n_s,l)$, which includes an orthogonal sequence index $n_{oc}^{(\tilde{p})}(n_s)$ term.

As provided with regards to Table 16, Table 17, Table 18, Table 20, Table 22, and other embodiments above, the reference signal may be shifted to a different resource than the data. The reference signal is then a shifted PUCCH reference signal having a shifted PUCCH resource. In order to support such shift, variables used to define the reference signal PUCCH resource may be redefined as:

$$\bar{n}_{oc}^{(\tilde{p})}(n_s) = \lfloor n''_{\tilde{p}}(n_s) \cdot \Delta_{shift}^{PUCCH}/N' \rfloor$$

$$\alpha_{\tilde{p}}(n_s, l) = 2\pi \cdot \bar{n}_{cs}^{(\tilde{p})}(n_s, l)/N_{sc}^{RB}$$

$$\bar{n}_{cs}^{(\tilde{p})}(n_s, l) = \begin{cases} [n_{cs}^{cell}(n_s, l) + (n''_{\tilde{p}}(n_s) \cdot \Delta_{shift}^{PUCCH} + (\bar{n}_{oc}^{(\tilde{p})}(n_s) \bmod \Delta_{shift}^{PUCCH})) \bmod N'] \bmod N_{sc}^{RB} & \text{for normal cyclic prefix} \\ [n_{cs}^{cell}(n_s, l) + (n''_{\tilde{p}}(n_s) \cdot \Delta_{shift}^{PUCCH} + \bar{n}_{oc}^{(\tilde{p})}(n_s)) \bmod N'] \bmod N_{sc}^{RB} & \text{for extended cyclic prefix} \end{cases}$$

where
The resource indices within the two resource blocks in the two slots of a subframe to which the PUCCH reference signal is mapped are given by $$n''_{\tilde{p}}(n_s) = \begin{cases} n'^{(1,\tilde{p})}_{PUCCH} & \text{if } n'^{(1,\tilde{p})}_{PUCCH} < c \cdot N^{(1)}_{cs}/\Delta^{PUCCH}_{shift} \\ (n'^{(1,\tilde{p})}_{PUCCH} - c \cdot N^{(1)}_{cs}/\Delta^{PUCCH}_{shift}) \bmod (c \cdot N^{RB}_{sc}/\Delta^{PUCCH}_{shift}) & \text{otherwise} \end{cases}$$

$$n'^{(1,\tilde{p})}_{PUCCH} = \begin{cases} n^{(1,\tilde{p})}_{PUCCH} + \Delta^{\tilde{p}}_{RS} & \text{if } n^{(1,\tilde{p})}_{PUCCH} + \Delta^{\tilde{p}}_{RS} \geq 0 \\ 0 & \text{otherwise} \end{cases}$$

for $n_s \bmod 2=0$ and by $$n''_{\tilde{p}}(n_s) = \begin{cases} [c(n''_{\tilde{p}}(n_s-1)+1)] \bmod (cN^{RB}_{sc}/\Delta^{PUCCH}_{shift}+1)-1 & n'^{(1,\tilde{p})}_{PUCCH} \geq c \cdot N^{(1)}_{cs}/\Delta^{PUCCH}_{shift} \\ \lfloor h_{\tilde{p}}/c \rfloor + (h_{\tilde{p}} \bmod c)N'/\Delta^{PUCCH}_{shift} & \text{otherwise} \end{cases}$$

for $n_s \bmod 2=1$, where $h_{\tilde{p}}=(n''_{\tilde{p}}(n_s-1)+d) \bmod (cN'/\Delta^{PUCCH}_{shift})$, with c=3 and d=2 for normal cyclic prefix, c=2 and d=0 for extended cyclic prefix.

In the above, N', $\Delta^{PUCCH}_{shift}$ and $n^{cell}_{cs}(n_s,1)$ are defined by 3GPP TS Section 5.4.1 and $\Delta^{\tilde{p}}_{RS}$ is 0 unless given by a table such as Table 16, Table 20, or Table 22.

The addition of the $\Delta^{\tilde{p}}_{RS}$ term allows for the shift of a reference symbol to a different resource than that of the data, as described above. The constraint $n^{(1,\tilde{p})}_{PUCCH}+\Delta^{\tilde{p}}_{RS} \geq 0$ is used to prevent the PUCCH resource index used for the reference signal, $n'^{(1,\tilde{p})}_{PUCCH}$, from being negative because PUCCH resources with indices are undefined in current releases of LTE. One example of the above is shown in bold and italics in Appendix C.

With regard to antenna-specific and slot-specific modulation, 3GPP TS 36.211, the transmitted modulation symbol is presently determined in Section 5.41 using the following:

The block of bits $b(0), \ldots, b(M_{bit}-1)$ shall be modulated as described in Table 5.4.1-1, resulting in a complex-valued symbol d(0). The modulation schemes for the different PUCCH formats are given by Table 5.4-1.

The complex-valued symbol d(0) shall be multiplied with a cyclically shifted length $N^{PUCCH}_{seq}=12$ sequence $r^{(\alpha_{\tilde{p}})}_{u,v}(n)$ for each of the P antenna ports used for PUCCH transmission according to $$y^{(\tilde{p})}(n) = \frac{1}{\sqrt{P}} d^{\tilde{p}}(0) \cdot r^{(\alpha_{\tilde{p}})}_{u,v}(n), n=0, 1, \ldots, N^{PUCCH}_{seq}-1$$

where $r^{(\alpha_{\tilde{p}})}_{u,v}(n)$ is defined by section 5.5.1 with $M^{RS}_{sc}=N^{PUCCH}_{seq}$. The antenna-port specific cyclic shift $\alpha_{\tilde{p}}$ varies between symbols and slots as defined below.

The block of complex-valued symbols $y^{(\tilde{p})}(0), \ldots, y^{(\tilde{p})}(N^{PUCCH}_{seq}-1)$ shall be scrambled by $S(n_s)$ and block-wise spread with the antenna-port specific orthogonal sequence $$w_{n_{oc}^{(\tilde{p})}}(i)$$

according to $$z^{(\tilde{p})}(m' \cdot N^{PUCCH}_{SF} \cdot N^{PUCCH}_{seq} + m \cdot N^{PUCCH}_{seq} + n) = S(n_s) \cdot w_{n_{oc}^{(\tilde{p})}}(m) \cdot y^{(\tilde{p})}(n)$$

As provided with regards to Table 19, Table 21, Table 23, and other embodiments above, different modulation symbols may be transmitted on the antenna ports, and these modulation symbols may be different between slots. In order to support the transmission of different modulation symbols across antennas or slots, variables used above with respect to section 5.4.1 to determine the transmitted modulation symbols may be redefined as follows. An example of a change to Section 5.4.1 is shown in bold and italics in Appendix B. An antenna- and slot-specific block of bits $b^{\tilde{p}}(0, n'_s), \ldots, b^{\tilde{p}}(M_{bit}-1, n'_s)$ replaces $b(0), \ldots, b(M_{bit}-1)$, where the slot index is defined as $n'_s=n_s \bmod 2$, as described with respect to the embodiment of Table 19. Unless values of the block of bits $b^{\tilde{p}}(0, n'_s), \ldots, b^{\tilde{p}}(M_{bit}-1, n'_s)$, where i=0, \ldots, M_{bit}-1$, are provided by a table such as Table 19, Table 21, or Table 23, the block of bits does not vary across antennas or slots, that is, $b^{\tilde{p}1}(i, n'_s)=b^{\tilde{p}0}(i, n'_s)=b(i)$. The bits $b^{\tilde{p}}(0, n'_s), \ldots, b^{\tilde{p}}(M_{bit}-1, n'_s)$ are modulated as described in Table 5.4.1-1, resulting in an antenna- and slot-specific complex-valued symbol $d^{\tilde{p}}(n'_s)$. This complex-valued symbol is cyclically shifted according to $$y^{(\tilde{p})}(n, n'_s) = \frac{1}{\sqrt{P}} d^{\tilde{p}}(n'_s) \cdot r^{(\alpha_{\tilde{p}})}_{u,v}(n),$$

n=0, 1, \ldots, N^{PUCCH}_{seq}-1$, and then the block of complex-valued symbols $y^{(\tilde{p})}(0, n'_s), \ldots, y^{(\tilde{p})}(N^{PUCCH}_{seq}-1, n'_s)$ is scrambled and block-wise spread according to $$z^{(\tilde{p})}(m' \cdot N^{PUCCH}_{SF} \cdot N^{PUCCH}_{seq} + m \cdot N^{PUCCH}_{seq} + n) = S(n_s) \cdot w_{n_{oc}^{(\tilde{p})}}(m) \cdot y^{(\tilde{p})}(n, n'_s).$$

In the preceding $\tilde{p}$, $M_{bit}$, $n_s$, n, P, $r^{(\alpha_{\tilde{p}})}_{u,v}(n)$, $N^{PUCCH}_{seq}$, m, m', $S(n_s)$, $$w_{n_{oc}^{(\tilde{p})}}(m)$$

are defined as in section 5.4.1

The particular embodiments disclosed above are illustrative only and should not be taken as limitations upon the present disclosure, as the embodiments may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

Appendix A

Abbreviations & Terminology

| Acronym | Full text | Brief Description |
|---|---|---|
| Ack | Acknowledgement | |
| ARI | Ack/Nack Resource Indicator | |
| CC | Component Carrier | |
| DFT | Discrete Fourier Transform | |
| DL | DownLink | |
| eNB | E_UTRAN Node B | |
| FDD | Frequency Division Duplex | |
| FEC | Forward Error Correction | |
| HARQ | Hybrid Automatic Repeat Request | |
| IDFT | Inverse Discrete Fourier Transform | |
| LTE | Long Term Evolution | |
| LTE-A | LTE-Advanced | |
| Nack | Negative Acknowledgement | |
| PCC | Primary Component Carrier | Also known as a 'primary cell' or 'PCell' |
| PRB | Physical Resource Block | |
| PUCCH | Physical Uplink Control Channel | |
| PUSCH | Physical Uplink Shared Channel | |
| RB | Resource Block | |
| SCC | Secondary Component Carrier | Also known as a 'secondary cell' or 'SCell' |
| SNR | Signal to Noise Ratio | |
| STRSD | Space Time Resource Selection Diversity | |
| TDD | Time Division Duplex | |
| UE | User Equipment | |
| UESS | UE specific search space | |
| UL | UpLink | |

Appendix B

---

TS 36.211 - 5.4.1 PUCCH formats 1, 1a and 1b

For PUCCH format 1, information is carried by the presence/absence of transmission of PUCCH from the UE. In the remainder of this section, $d^{\tilde{p}}(n_s)=1$ shall be assumed for PUCCH format 1.

For PUCCH formats 1a and 1b, one or two explicit bits are transmitted, respectively. The block of bits $b^{\tilde{p}}(0,n'_s),\ldots,b^{\tilde{p}}(M_{\text{bit}}-1,n'_s)$ *for each slot and each of the $P$ antenna ports* shall be modulated as described in Table 5.4.1-1, resulting in a complex-valued symbol $d^{\tilde{p}}(n'_s)$. *The bits* $b^{\tilde{p}_1}(i,n'_s)=b^{\tilde{p}_0}(i,n'_s)=b(i)$ *where* $i=0,\ldots,M_{\text{bit}}-1$ *and* $n'_s = n_s \bmod 2$ *unless* $b^{\tilde{p}}(n'_s)$ *is given by Section 10.1.2.2.1 in [4]*. The modulation schemes for the different PUCCH formats are given by Table 5.4-1.

*The complex-valued symbol $d^{\tilde{p}}(n'_s)$ shall be multiplied with a cyclically shifted length $N_{\text{seq}}^{\text{PUCCH}} = 12$ sequence $r_{u,v}^{(\alpha_{\tilde{p}})}(n)$ for each of the $P$ antenna ports used for PUCCH transmission according to*

$$y^{(\tilde{p})}(n,n'_s) = \frac{1}{\sqrt{P}} d^{\tilde{p}}(n'_s) \cdot r_{u,v}^{(\alpha_{\tilde{p}})}(n), \qquad n=0,1,\ldots,N_{\text{seq}}^{\text{PUCCH}}-1$$

*where $r_{u,v}^{(\alpha_{\tilde{p}})}(n)$ is defined by section 5.5.1 with $M_{\text{sc}}^{\text{RS}} = N_{\text{seq}}^{\text{PUCCH}}$. The antenna-port specific cyclic shift $\alpha_{\tilde{p}}$ varies between symbols and slots as defined below.*

*The block of complex-valued symbols $y^{(\tilde{p})}(0,n'_s),\ldots,y^{(\tilde{p})}(N_{\text{seq}}^{\text{PUCCH}}-1,n'_s)$ shall be scrambled by $S(n_s)$ and block-wise spread with the antenna-port specific orthogonal sequence $w_{n_{oc}^{(\tilde{p})}}(i)$ according to*

$$z^{(\tilde{p})}\left(m' \cdot N_{\text{SF}}^{\text{PUCCH}} \cdot N_{\text{seq}}^{\text{PUCCH}} + m \cdot N_{\text{seq}}^{\text{PUCCH}} + n\right) = S(n_s) \cdot w_{n_{oc}^{(\tilde{p})}}(m) \cdot y^{(\tilde{p})}(n,n'_s)$$

*where*

$$m = 0, \ldots, N_{SF}^{PUCCH} - 1$$
$$n = 0, \ldots, N_{seq}^{PUCCH} - 1$$
$$m' = 0, 1$$

and $$S(n_s) = \begin{cases} 1 & \text{if } n'_{\tilde{p}}(n_s) \bmod 2 = 0 \\ e^{j\pi/2} & \text{otherwise} \end{cases}$$

with $N_{SF}^{PUCCH} = 4$ for both slots of normal PUCCH formats 1/1a/1b, and $N_{SF}^{PUCCH} = 4$ for the first slot and $N_{SF}^{PUCCH} = 3$ for the second slot of shortened PUCCH formats 1/1a/1b. The sequence $w_{n_{oc}^{(\tilde{p})}}(i)$ is given by Table 5.4.1-2 and Table 5.4.1-3 and $n'_{\tilde{p}}(n_s)$ is defined below.

Resources used for transmission of PUCCH format 1, 1a and 1b are identified by a resource index $n_{PUCCH}^{(1,\tilde{p})}$ from which the orthogonal sequence index $n_{oc}^{(\tilde{p})}(n_s)$ and the cyclic shift $\alpha_{\tilde{p}}(n_s, l)$ are determined according to $$n_{oc}^{(\tilde{p})}(n_s) = \begin{cases} \lfloor n'_{\tilde{p}}(n_s) \cdot \Delta_{shift}^{PUCCH} / N' \rfloor & \text{for normal cyclic prefix} \\ 2 \cdot \lfloor n'_{\tilde{p}}(n_s) \cdot \Delta_{shift}^{PUCCH} / N' \rfloor & \text{for extended cyclic prefix} \end{cases}$$

$$\alpha_{\tilde{p}}(n_s, l) = 2\pi \cdot n_{cs}^{(\tilde{p})}(n_s, l) / N_{sc}^{RB}$$

$$n_{cs}^{(\tilde{p})}(n_s, l) = \begin{cases} \left[ n_{cs}^{cell}(n_s, l) + \left( n'_{\tilde{p}}(n_s) \cdot \Delta_{shift}^{PUCCH} + (n_{oc}^{(\tilde{p})}(n_s) \bmod \Delta_{shift}^{PUCCH}) \right) \bmod N' \right] \bmod N_{sc}^{RB} & \text{for normal cyclic prefix} \\ \left[ n_{cs}^{cell}(n_s, l) + \left( n'_{\tilde{p}}(n_s) \cdot \Delta_{shift}^{PUCCH} + n_{oc}^{(\tilde{p})}(n_s) / 2 \right) \bmod N' \right] \bmod N_{sc}^{RB} & \text{for extended cyclic prefix} \end{cases}$$

where $$N' = \begin{cases} N_{cs}^{(1)} & \text{if } n_{PUCCH}^{(1,\tilde{p})} < c \cdot N_{cs}^{(1)} / \Delta_{shift}^{PUCCH} \\ N_{sc}^{RB} & \text{otherwise} \end{cases}$$

$$c = \begin{cases} 3 & \text{normal cyclic prefix} \\ 2 & \text{extended cyclic prefix} \end{cases}$$

The resource indices within the two resource blocks in the two slots of a subframe to which the PUCCH is mapped are given by $$n'_{\tilde{p}}(n_s) = \begin{cases} n_{PUCCH}^{(1,\tilde{p})} & \text{if } n_{PUCCH}^{(1,\tilde{p})} < c \cdot N_{cs}^{(1)} / \Delta_{shift}^{PUCCH} \\ \left( n_{PUCCH}^{(1,\tilde{p})} - c \cdot N_{cs}^{(1)} / \Delta_{shift}^{PUCCH} \right) \bmod \left( c \cdot N_{sc}^{RB} / \Delta_{shift}^{PUCCH} \right) & \text{otherwise} \end{cases}$$

for $n_s \bmod 2 = 0$ and by $$n'_{\tilde{p}}(n_s) = \begin{cases} [c(n'_{\tilde{p}}(n_s-1)+1)] \bmod(cN_{sc}^{RB}/\Delta_{shift}^{PUCCH}+1)-1 & n_{PUCCH}^{(1,\tilde{p})} \geq c \cdot N_{cs}^{(1)}/\Delta_{shift}^{PUCCH} \\ \lfloor h_{\tilde{p}}/c \rfloor + (h_{\tilde{p}} \bmod c)N'/\Delta_{shift}^{PUCCH} & \text{otherwise} \end{cases}$$

for $n_s \bmod 2 = 1$, where $h_{\tilde{p}} = (n'_{\tilde{p}}(n_s-1)+d)\bmod(cN'/\Delta_{shift}^{PUCCH})$, with $d = 2$ for normal CP and $d = 0$ for extended CP.

The parameter *deltaPUCCH-Shift* $\Delta_{shift}^{PUCCH}$ is provided by higher layers.

Table 5.4.1-1: Modulation symbol $d(0)$ for PUCCH formats 1a and 1b.

| PUCCH format | $b^{\tilde{p}}(0,n_s),...,b^{\tilde{p}}(M_{bit}-1,n_s)$ | $d^{\tilde{p}}(n_s)$ |
|---|---|---|
| 1a | 0 | 1 |
| 1a | 1 | −1 |
| 1b | 00 | 1 |
| 1b | 01 | −j |
| 1b | 10 | j |
| 1b | 11 | −1 |

Table 5.4.1-2: Orthogonal sequences $[w(0) \cdots w(N_{SF}^{PUCCH}-1)]$ for $N_{SF}^{PUCCH}=4$.

| Sequence index $n_{oc}^{(\tilde{p})}(n_s)$ | Orthogonal sequences $[w(0) \cdots w(N_{SF}^{PUCCH}-1)]$ |
|---|---|
| 0 | $[+1\ +1\ +1\ +1]$ |
| 1 | $[+1\ -1\ +1\ -1]$ |
| 2 | $[+1\ -1\ -1\ +1]$ |

Table 5.4.1-3: Orthogonal sequences $[w(0) \cdots w(N_{SF}^{PUCCH}-1)]$ for $N_{SF}^{PUCCH}=3$.

| Sequence index $n_{oc}^{(\tilde{p})}(n_s)$ | Orthogonal sequences $[w(0) \cdots w(N_{SF}^{PUCCH}-1)]$ |
|---|---|
| 0 | $[1\ 1\ 1]$ |
| 1 | $[1\ e^{j2\pi/3}\ e^{j4\pi/3}]$ |
| 2 | $[1\ e^{j4\pi/3}\ e^{j2\pi/3}]$ |

Appendix C

**TS 36.211 - *5.5.2.2.1***     *Reference signal sequence*

The PUCCH demodulation reference signal sequence $r_{\text{PUCCH}}^{(\tilde{p})}(\cdot)$ is defined by $$r_{\text{PUCCH}}^{(\tilde{p})}\left(m' N_{\text{RS}}^{\text{PUCCH}} M_{\text{sc}}^{\text{RS}} + m M_{\text{sc}}^{\text{RS}} + n\right) = \frac{1}{\sqrt{P}} \overline{w}^{(\tilde{p})}(m) z(m) r_{u,v}^{(\alpha_{\tilde{p}})}(n)$$

where $$m = 0, \ldots, N_{\text{RS}}^{\text{PUCCH}} - 1$$
$$n = 0, \ldots, M_{\text{sc}}^{\text{RS}} - 1$$
$$m' = 0, 1$$

and $P$ is the number of antenna ports used for PUCCH transmission. For PUCCH formats 2a and 2b, $z(m)$ equals $d(10)$ for $m = 1$, where $d(10)$ is defined in Section 5.4.2. For all other cases, $z(m) = 1$.

The sequence $r_{u,v}^{(\alpha_{\tilde{p}})}(n)$ is given by Section 5.5.1 with $M_{\text{sc}}^{\text{RS}} = 12$ where the expression for the cyclic shift $\alpha_{\tilde{p}}$ is determined by the PUCCH format.

*For PUCCH formats 1, 1a and 1b, $\alpha_{\tilde{p}}(n_s, l)$ is given by*

$$\overline{n}_{\text{oc}}^{(\tilde{p})}(n_s) = \left\lfloor n_{\tilde{p}}''(n_s) \cdot \Delta_{\text{shift}}^{\text{PUCCH}} / N' \right\rfloor$$

$$\alpha_{\tilde{p}}(n_s, l) = 2\pi \cdot \overline{n}_{\text{cs}}^{(\tilde{p})}(n_s, l) / N_{\text{sc}}^{\text{RB}}$$

$$\overline{n}_{\text{cs}}^{(\tilde{p})}(n_s, l) = \begin{cases} \left[n_{\text{cs}}^{\text{cell}}(n_s, l) + \left(n_{\tilde{p}}''(n_s) \cdot \Delta_{\text{shift}}^{\text{PUCCH}} + \left(\overline{n}_{\text{oc}}^{(\tilde{p})}(n_s) \bmod \Delta_{\text{shift}}^{\text{PUCCH}}\right)\right) \bmod N'\right] \bmod N_{\text{sc}}^{\text{RB}} & \text{for normal cyclic prefix} \\ \left[n_{\text{cs}}^{\text{cell}}(n_s, l) + \left(n_{\tilde{p}}''(n_s) \cdot \Delta_{\text{shift}}^{\text{PUCCH}} + \overline{n}_{\text{oc}}^{(\tilde{p})}(n_s)\right) \bmod N'\right] \bmod N_{\text{sc}}^{\text{RB}} & \text{for extended cyclic prefix} \end{cases}$$

*where*

$N'$, $\Delta_{\text{shift}}^{\text{PUCCH}}$ and $n_{\text{cs}}^{\text{cell}}(n_s,l)$ *are defined by Section 5.4.1.*

*The resource indices within the two resource blocks in the two slots of a subframe to which the PUCCH reference signal is mapped are given by*

$$n_{\tilde{p}}''(n_s) = \begin{cases} n_{\text{PUCCH}}'^{(1,\tilde{p})} & \text{if } n_{\text{PUCCH}}'^{(1,\tilde{p})} < c \cdot N_{\text{cs}}^{(1)}/\Delta_{\text{shift}}^{\text{PUCCH}} \\ \left(n_{\text{PUCCH}}'^{(1,\tilde{p})} - c \cdot N_{\text{cs}}^{(1)}/\Delta_{\text{shift}}^{\text{PUCCH}}\right) \bmod \left(c \cdot N_{\text{sc}}^{\text{RB}}/\Delta_{\text{shift}}^{\text{PUCCH}}\right) & \text{otherwise} \end{cases}$$

$$n_{\text{PUCCH}}'^{(1,\tilde{p})} = \begin{cases} n_{\text{PUCCH}}^{(1,\tilde{p})} + \Delta_{RS}^{\tilde{p}} & \text{if } n_{\text{PUCCH}}^{(1,\tilde{p})} + \Delta_{RS}^{\tilde{p}} > 0 \\ 0 & \text{otherwise} \end{cases}$$

*for* $n_s \bmod 2 = 0$ *and by*

$$n_{\tilde{p}}''(n_s) = \begin{cases} \left[c\left(n_{\tilde{p}}''(n_s-1)+1\right)\right] \bmod\left(cN_{\text{sc}}^{\text{RB}}/\Delta_{\text{shift}}^{\text{PUCCH}}+1\right)-1 & n_{\text{PUCCH}}'^{(1,\tilde{p})} \geq c \cdot N_{\text{cs}}^{(1)}/\Delta_{\text{shift}}^{\text{PUCCH}} \\ \lfloor h_{\tilde{p}}/c \rfloor + (h_{\tilde{p}} \bmod c)N'/\Delta_{\text{shift}}^{\text{PUCCH}} & \text{otherwise} \end{cases}$$

*for* $n_s \bmod 2 = 1$, *where* $h_{\tilde{p}} = \left(n_{\tilde{p}}''(n_s-1)+d\right)\bmod\left(cN'/\Delta_{\text{shift}}^{\text{PUCCH}}\right)$, *with* $c = 3$ *and* $d = 2$ *for normal CP,* $c = 2$ *and* $d = 0$ *for extended CP and* $\Delta_{RS}^{\tilde{p}}$ *is 0 unless it is given by Section 10.1 in [4].* The number of reference symbols per slot $N_{\text{RS}}^{\text{PUCCH}}$ and the sequence $\bar{w}(n)$ are given by Table 5.5.2.2.1-1 and 5.5.2.2.1-2, respectively.

For PUCCH formats 2, 2a and 2b, $\alpha_{\tilde{p}}(n_s,l)$ is defined by Section 5.4.2. The number of reference symbols per slot $N_{\text{RS}}^{\text{PUCCH}}$ and the sequence $\bar{w}^{(\tilde{p})}(n)$ are given by Table 5.5.2.2.1-1 and 5.5.2.2.1-3, respectively.

For PUCCH format 3, $\alpha_{\tilde{p}}(n_s,l)$ is given by $$\alpha_{\tilde{p}}(n_s,l) = 2\pi \cdot n_{\text{cs}}^{(\tilde{p})}(n_s,l)/N_{\text{sc}}^{\text{RB}}$$
$$n_{\text{cs}}^{(\tilde{p})}(n_s,l) = \left(n_{\text{cs}}^{\text{cell}}(n_s,l) + n_{\tilde{p}}'(n_s)\right)\bmod N_{\text{sc}}^{\text{RB}}$$

where $n_{\tilde{p}}'(n_s)$ is given by Table 5.5.2.2.1-4 and $n_{\text{oc},0}^{(\tilde{p})}$ and $n_{\text{oc},1}^{(\tilde{p})}$ for the first and second slot in a subframe, respectively, are obtained from Section 5.4.2A. The number of reference symbols per slot $N_{\text{RS}}^{\text{PUCCH}}$ and the sequence $\bar{w}(n)$ are given by Table 5.5.2.2.1-1 and 5.5.2.2.1-3, respectively.

Table 5.5.2.2.1-1: Number of PUCCH demodulation reference symbols per slot $N_{\text{RS}}^{\text{PUCCH}}$.

| PUCCH format | Normal cyclic prefix | Extended cyclic prefix |
|---|---|---|
| 1, 1a, 1b | 3 | 2 |
| 2, 3 | 2 | 1 |
| 2a, 2b | 2 | N/A |

Table 5.5.2.2.1-2: Orthogonal sequences $[\overline{w}^{(\tilde{p})}(0) \cdots \overline{w}^{(\tilde{p})}(N_{\text{RS}}^{\text{PUCCH}}-1)]$ for PUCCH formats 1, 1a and 1b.

| Sequence index $\overline{n}_{\text{oc}}^{(\tilde{p})}(n_s)$ | Normal cyclic prefix | Extended cyclic prefix |
|---|---|---|
| 0 | $[1 \ 1 \ 1]$ | $[1 \ 1]$ |
| 1 | $[1 \ e^{j2\pi/3} \ e^{j4\pi/3}]$ | $[1 \ -1]$ |
| 2 | $[1 \ e^{j4\pi/3} \ e^{j2\pi/3}]$ | N/A |

Table 5.5.2.2.1-3: Orthogonal sequences $[\overline{w}^{(\tilde{p})}(0) \cdots \overline{w}^{(\tilde{p})}(N_{\text{RS}}^{\text{PUCCH}}-1)]$ for PUCCH formats 2, 2a, 2b and 3.

| Normal cyclic prefix | Extended cyclic prefix |
|---|---|
| $[1 \ 1]$ | $[1]$ |

Table 5.5.2.2.1-4: Relation between $n_{\text{oc}}^{(\tilde{p})}$ and $n'_{\tilde{p}}(n_s)$ for PUCCH format 3.

| $n_{\text{oc}}^{(\tilde{p})}$ | $n'_{\tilde{p}}(n_s)$ | |
|---|---|---|
| | $N_{\text{SF},1}=5$ | $N_{\text{SF},1}=4$ |
| 0 | 0 | 0 |
| 1 | 3 | 3 |
| 2 | 6 | 6 |
| 3 | 8 | 9 |
| 4 | 10 | N/A |

Appendix D

10.1.2.2.1 PUCCH format 1b with channel selection HARQ-ACK procedure

For FDD with two configured serving cells and PUCCH format 1b with channel selection, the UE shall transmit $b(0)b(1)$ on PUCCH resource $n^{(1)}_{PUCCH}$ selected from $A$ PUCCH resources, $n^{(1)}_{PUCCH,j}$ where $0 \le j \le A-1$ and $A \in \{2,3,4\}$, according to Table 10.1.2.2.1-3, Table 10.1.2.2.1-4, Table 10.1.2.2.1-5 in subframe $n$ using PUCCH format 1b. HARQ-ACK($j$) denotes the ACK/NACK/DTX response for a transport block or SPS release PDCCH associated with serving cell $c$, where the transport block and serving cell for HARQ-ACK($j$) and $A$ PUCCH resources are given by Table 10.1.2.2.1-1. *When the UE is configured to transmit PUCCH on two antenna ports, Table 10.1.2.2.1-x is used to map $n^{(1)}_{PUCCH,j}$ to the PUCCH resources indicated by $n^{(1,\tilde{p})}_{PUCCH,j}$ and $\Delta^{\tilde{p}}_{RS}$, where $\Delta^{\tilde{p}_0}_{RS} = \Delta^{\tilde{p}_1}_{RS} = \Delta^{\tilde{p}}_{RS}$ and for A=3 and A=4, Table 10.1.2.2.1-y is used to map $b(0)b(1)$ and $n^{(1)}_{PUCCH,j}$ to the modulation symbols $b^{\tilde{p}}(i,n'_s)$ transmitted on the antenna ports.*

A UE configured with a transmission mode that supports up to two transport blocks on serving cell, $c$, shall use the same HARQ-ACK response for both the transport blocks in response to a PDSCH transmission with a single transport block or a PDCCH indicating downlink SPS release associated with the serving cell $c$.

Table 10.1.2.2.1-1: Mapping of Transport Block and Serving Cell to HARQ-ACK(*j*) for PUCCH format 1b HARQ-ACK channel selection

| A | HARQ-ACK(*j*) | | | |
|---|---|---|---|---|
| | HARQ-ACK(0) | HARQ-ACK(1) | HARQ-ACK(2) | HARQ-ACK(3) |
| 2 | TB1 Primary cell | TB1 Secondary cell | NA | NA |
| 3 | TB1 Serving cell1 | TB2 Serving cell1 | TB1 Serving cell2 | NA |
| 4 | TB1 Primary cell | TB2 Primary cell | TB1 Secondary cell | TB2 Secondary cell |

The UE shall determine the $A$ PUCCH resources, $n^{(1)}_{PUCCH,j}$ associated with HARQ-ACK($j$)

where $0 \le j \le A-1$ in Table 10.1.2.2.1-1, according to

- for a PDSCH transmission indicated by the detection of a corresponding PDCCH in subframe $n-4$ on the primary cell, or for a PDCCH indicating downlink SPS release (defined in section 9.2) in subframe $n-4$ on the primary cell, the PUCCH resource is $n^{(1)}_{\text{PUCCH},j} = n_{\text{CCE}} + N^{(1)}_{\text{PUCCH}}$, and for transmission mode that supports up to two transport blocks, the PUCCH resource $n^{(1)}_{\text{PUCCH},j+1}$ is given by $n^{(1)}_{\text{PUCCH},j+1} = n_{\text{CCE}} + 1 + N^{(1)}_{\text{PUCCH}}$ where $n_{\text{CCE}}$ is the number of the first CCE used for transmission of the corresponding PDCCH and $N^{(1)}_{\text{PUCCH}}$ is configured by higher layers.

- for a PDSCH transmission on the primary cell where there is not a corresponding PDCCH detected in subframe $n-4$, the value of $n^{(1)}_{\text{PUCCH},j}$ is determined according to higher layer configuration and Table 9.2-2. For transmission mode that supports up to two transport blocks, the PUCCH resource $n^{(1)}_{\text{PUCCH},j+1}$ is given by $n^{(1)}_{\text{PUCCH},j+1} = n^{(1)}_{\text{PUCCH},j} + 1$

- for a PDSCH transmission indicated by the detection of a corresponding PDCCH in subframe $n-4$ on the secondary cell, the value of $n^{(1)}_{\text{PUCCH},j}$, and the value of $n^{(1)}_{\text{PUCCH},j+1}$ for the transmission mode that supports up to two transport blocks is determined according to higher layer configuration and Table 10.1.2.2.1-2. The TPC field in the DCI format of the corresponding PDCCH shall be used to determine the PUCCH resource values from one of the four resource values configured by higher layers, with the mapping defined in Table 10.1.2.2.1-2. For a UE configured for a transmission mode that supports up to two transport blocks a PUCCH resource value in Table 10.1.2.2.1-2 maps to two PUCCH resources $(n^{(1,\tilde{p})}_{\text{PUCCH},j}, n^{(1,\tilde{p})}_{\text{PUCCH},j+1})$, otherwise, the PUCCH resource value maps to a single PUCCH resource $n^{(1,\tilde{p})}_{\text{PUCCH},j}$.

*Table 10.1.2.2.1-x: PUCCH Resource and RS value for two PUCCH antenna ports transmission*

| $n^{(1)}_{\text{PUCCH},i}$ | $n^{(1,\tilde{p}_0)}_{\text{PUCCH},j}$ | $n^{(1,\tilde{p}_1)}_{\text{PUCCH},j}$ | | | $\Delta^{\tilde{p}}_{RS}$ | |
|---|---|---|---|---|---|---|
| | | A=2 | A=3 | A=4 | A=3 | A=4 |
| $n^{(1)}_{\text{PUCCH},0}$ | $n^{(1)}_{\text{PUCCH},0}$ | $n^{(1)}_{\text{PUCCH},0} + 1$ | $n^{(1)}_{\text{PUCCH},1}$ | $n^{(1)}_{\text{PUCCH},1}$ | 0 | 0 |
| $n^{(1)}_{\text{PUCCH},1}$ | $n^{(1)}_{\text{PUCCH},1}$ | $n^{(1)}_{\text{PUCCH},1} + 1$ | $n^{(1)}_{\text{PUCCH},2} + 1$ | $n^{(1)}_{\text{PUCCH},3}$ | -1 | -1 |
| $n^{(1)}_{\text{PUCCH},2}$ | $n^{(1)}_{\text{PUCCH},2}$ | - | $n^{(1)}_{\text{PUCCH},2} + 1$ | $n^{(1)}_{\text{PUCCH},0}$ | 0 | 1 |
| $n^{(1)}_{\text{PUCCH},3}$ | $n^{(1)}_{\text{PUCCH},3}$ | - | - | $n^{(1)}_{\text{PUCCH},2}$ | - | 0 |

*Table 10.1.2.2.1-y: Modulation symbols for $A = 3$ and $A = 4$*

| | | A=3: $n^{(1)}_{\text{PUCCH},0}$ , $n^{(1)}_{\text{PUCCH},1}$ A=4: any $n^{(1)}_{\text{PUCCH},i}$ | | A=3: $n^{(1)}_{\text{PUCCH},2}$ |
|---|---|---|---|---|
| $b(0)b(1)$ | $b^{\tilde{p}_0}(0)b^{\tilde{p}_0}(1)$ | $b^{\tilde{p}}(0,0)b^{\tilde{p}}(1,0)$ | $b^{\tilde{p}}(0,1)b^{\tilde{p}}(1,1)$ | $b^{\tilde{p}}(0)b^{\tilde{p}}(1)$ |

| 00 | 00 | 01 | 01 | 00 |
|----|----|----|----|----|
| 01 | 01 | 00 | 10 | -  |
| 10 | 10 | 10 | 00 | -  |
| 11 | 11 | 11 | 11 | 11 |

Table 10.1.2.2.1-2: PUCCH Resource Value for HARQ-ACK Resource for PUCCH

| Value of 'TPC command for PUCCH' | $n^{(1)}_{PUCCH,j}$ or $(n^{(1)}_{PUCCH,j}, n^{(1)}_{PUCCH,j+1})$ |
|---|---|
| '00' | The 1st PUCCH resource value configured by the higher layers |
| '01' | The 2nd PUCCH resource value configured by the higher layers |
| '10' | The 3rd PUCCH resource value configured by the higher layers |
| '11' | The 4th PUCCH resource value configured by the higher layers |

Table 10.1.2.2.1-3: Transmission of Format 1b HARQ-ACK channel selection for $A = 2$

| HARQ-ACK(0) | HARQ-ACK(1) | $n^{(1)}_{PUCCH}$ | $b(0)b(1)$ |
|---|---|---|---|
| ACK | ACK | $n^{(1)}_{PUCCH,1}$ | 1,1 |
| ACK | NACK/DTX | $n^{(1)}_{PUCCH,0}$ | 1,1 |
| NACK/DTX | ACK | $n^{(1)}_{PUCCH,1}$ | 0,0 |
| NACK | NACK/DTX | $n^{(1)}_{PUCCH,0}$ | 0,0 |
| DTX | NACK/DTX | No Transmission | |

Table 10.1.2.2.1-4: Transmission of Format 1b HARQ-ACK channel selection for $A = 3$

| HARQ-ACK(0) | HARQ-ACK(1) | HARQ-ACK(2) | $n^{(1)}_{PUCCH}$ | $b(0)b(1)$ |
|---|---|---|---|---|
| ACK | ACK | ACK | $n^{(1)}_{PUCCH,1}$ | 1,1 |
| ACK | NACK/DTX | ACK | $n^{(1)}_{PUCCH,1}$ | 1,0 |
| NACK/DTX | ACK | ACK | $n^{(1)}_{PUCCH,1}$ | 0,1 |
| NACK/DTX | NACK/DTX | ACK | $n^{(1)}_{PUCCH,2}$ | 1,1 |
| ACK | ACK | NACK/DTX | $n^{(1)}_{PUCCH,0}$ | 1,1 |
| ACK | NACK/DTX | NACK/DTX | $n^{(1)}_{PUCCH,0}$ | 1,0 |
| NACK/DTX | ACK | NACK/DTX | $n^{(1)}_{PUCCH,0}$ | 0,1 |
| NACK/DTX | NACK/DTX | NACK | $n^{(1)}_{PUCCH,2}$ | 0,0 |

| | | | | |
|---|---|---|---|---|
| NACK | NACK/DTX | DTX | $n^{(1)}_{PUCCH,0}$ | 0,0 |
| NACK/DTX | NACK | DTX | $n^{(1)}_{PUCCH,0}$ | 0,0 |
| DTX | DTX | DTX | No Transmission | |

Table 10.1.2.2.1-5: Transmission of Format 1b HARQ-ACK channel selection for $A = 4$

| HARQ-ACK(0) | HARQ-ACK(1) | HARQ-ACK(2) | HARQ-ACK(3) | $n^{(1)}_{PUCCH}$ | $b(0)b(1)$ |
|---|---|---|---|---|---|
| ACK | ACK | ACK | ACK | $n^{(1)}_{PUCCH,1}$ | 1,1 |
| ACK | NACK/DTX | ACK | ACK | $n^{(1)}_{PUCCH,2}$ | 0,1 |
| NACK/DTX | ACK | ACK | ACK | $n^{(1)}_{PUCCH,1}$ | 0,1 |
| NACK/DTX | NACK/DTX | ACK | ACK | $n^{(1)}_{PUCCH,3}$ | 1,1 |
| ACK | ACK | ACK | NACK/DTX | $n^{(1)}_{PUCCH,1}$ | 1,0 |
| ACK | NACK/DTX | ACK | NACK/DTX | $n^{(1)}_{PUCCH,2}$ | 0,0 |
| NACK/DTX | ACK | ACK | NACK/DTX | $n^{(1)}_{PUCCH,1}$ | 0,0 |
| NACK/DTX | NACK/DTX | ACK | NACK/DTX | $n^{(1)}_{PUCCH,3}$ | 1,0 |
| ACK | ACK | NACK/DTX | ACK | $n^{(1)}_{PUCCH,2}$ | 1,1 |
| ACK | NACK/DTX | NACK/DTX | ACK | $n^{(1)}_{PUCCH,2}$ | 1,0 |
| NACK/DTX | ACK | NACK/DTX | ACK | $n^{(1)}_{PUCCH,3}$ | 0,1 |
| NACK/DTX | NACK/DTX | NACK/DTX | ACK | $n^{(1)}_{PUCCH,3}$ | 0,0 |
| ACK | ACK | NACK/DTX | NACK/DTX | $n^{(1)}_{PUCCH,0}$ | 1,1 |
| ACK | NACK/DTX | NACK/DTX | NACK/DTX | $n^{(1)}_{PUCCH,0}$ | 1,0 |
| NACK/DTX | ACK | NACK/DTX | NACK/DTX | $n^{(1)}_{PUCCH,0}$ | 0,1 |
| NACK/DTX | NACK | NACK/DTX | NACK/DTX | $n^{(1)}_{PUCCH,0}$ | 0,0 |
| NACK | NACK/DTX | NACK/DTX | NACK/DTX | $n^{(1)}_{PUCCH,0}$ | 0,0 |
| DTX | DTX | NACK/DTX | NACK/DTX | No Transmission | |

Appendix E

10.1.3.2.1 PUCCH format 1b with channel selection HARQ-ACK procedure

For TDD HARQ-ACK multiplexing with PUCCH format 1b with channel selection and two configured serving cells and a subframe $n$ with $M=1$ where $M$ is the number of elements in the set $K$ defined in Table 10.1.3.1-1, a UE shall determine the number of HARQ-ACK bits, $o$, based on the number of configured serving cells and the downlink transmission modes configured for each serving cell. The UE shall use two HARQ-ACK bits for a serving cell configured with a downlink transmission mode that supports up to two transport blocks; and one HARQ-ACK bit otherwise.

*For TDD HARQ-ACK multiplexing, when the UE is configured to transmit PUCCH on two antenna ports and for a subframe with M=1, Table 10.1.3.2-x is used to map $n^{(1)}_{PUCCH,i}$, and $b(0)b(1)$ to the PUCCH resources indicated by $n^{(1,\tilde{p})}_{PUCCH,i}$ and $\Delta^{\tilde{p}}_{RS}$, and for A=3 and A=4, Table 10.1.3.2-y is used to map $b(0)b(1)$ and $n^{(1)}_{PUCCH,i}$ to the modulation symbols transmitted on the antenna ports, and for a subframe with M>1, the PUCCH resources transmitted on the antenna ports are determined according to $n^{(1,\tilde{p}_0)}_{PUCCH,i} = n^{(1)}_{PUCCH,i}$ and $n^{(1,\tilde{p}_1)}_{PUCCH,i} = n^{(1)}_{PUCCH,i} + 1$.*

*Table 10.1.3.2-x: PUCCH Resource and RS value for two PUCCH antenna ports transmission*

| | | A=2 | A=3 | | A=4 | | | | | |
| | | | | | $b(0)b(1) = \{00,11\}$ | | | $b(0)b(1) = \{01,10\}$ | | |
| $n^{(1)}_{PUCCH,i}$ | $n^{(1,\tilde{p}_0)}_{PUCCH,j}$ | $n^{(1,\tilde{p}_1)}_{PUCCH,j}$ | $n^{(1,\tilde{p}_1)}_{PUCCH,j}$ | $\Delta^{\tilde{p}_1}_{RS}$ | $n^{(1,\tilde{p}_1)}_{PUCCH,j}$ | $\Delta^{\tilde{p}_0}_{RS}$ | $\Delta^{\tilde{p}_1}_{RS}$ | $n^{(1,\tilde{p}_1)}_{PUCCH,j}$ | $\Delta^{\tilde{p}_0}_{RS}$ | $\Delta^{\tilde{p}_1}_{RS}$ |
|---|---|---|---|---|---|---|---|---|---|---|
| $n^{(1)}_{PUCCH,0}$ | $n^{(1)}_{PUCCH,0}$ | $n^{(1)}_{PUCCH,0}+1$ | $n^{(1)}_{PUCCH,1}$ | 1 | $n^{(1)}_{PUCCH,1}$ | 0 | 0 | $n^{(1)}_{PUCCH,3}$ | 1 | -1 |
| $n^{(1)}_{PUCCH,1}$ | $n^{(1)}_{PUCCH,1}$ | $n^{(1)}_{PUCCH,1}+1$ | $n^{(1)}_{PUCCH,1}+1$ | 0 | $n^{(1)}_{PUCCH,3}$ | -1 | -1 | $n^{(1)}_{PUCCH,0}$ | 0 | 0 |
| $n^{(1)}_{PUCCH,2}$ | $n^{(1)}_{PUCCH,2}$ | - | $n^{(1)}_{PUCCH,2}+1$ | 0 | $n^{(1)}_{PUCCH,3}+1$ | 0 | 0 | $n^{(1)}_{PUCCH,3}+1$ | 0 | 0 |
| $n^{(1)}_{PUCCH,3}$ | $n^{(1)}_{PUCCH,3}$ | - | - | 0 | $n^{(1)}_{PUCCH,2}$ | 0 | 2 | $n^{(1)}_{PUCCH,2}$ | 0 | 2 |

Table 10.1.3.2-y: Modulation symbols for $A=3$ and $A=4$

| | | A=3, A=4: $n^{(1)}_{\text{PUCCH},0}$, $n^{(1)}_{\text{PUCCH},1}$ | A=3: $n^{(1)}_{\text{PUCCH},2}$ A=4: $n^{(1)}_{\text{PUCCH},2}$, $n^{(1)}_{\text{PUCCH},3}$ | |
|---|---|---|---|---|
| $b(0)b(1)$ | $b^{\tilde{p}_0}(0)b^{\tilde{p}_0}(1)$ | $b^{\tilde{p}_1}(0)b^{\tilde{p}_1}(1)$ | $b^{\tilde{p}_1}(0,0)b^{\tilde{p}_1}(1,0)$ | $b^{\tilde{p}_1}(0,1)b^{\tilde{p}_1}(1,1)$ |
| 00 | 00 | 00 | 01 | 01 |
| 01 | 01 | 01 | 00 | 10 |
| 10 | 10 | 10 | 10 | 00 |
| 11 | 11 | 11 | 11 | 11 |

For TDD HARQ-ACK multiplexing with PUCCH format 1b with channel selection and two configured serving cells and a subframe $n$ with $M \leq 2$ where $M$ is the number of elements in the set $K$ defined in Table 10.1.3.1-1, the UE shall transmit $b(0)b(1)$ on PUCCH resource $n^{(1)}_{\text{PUCCH}}$ selected from $A$ PUCCH resources, $n^{(1)}_{\text{PUCCH},j}$ where $0 \leq j \leq A-1$ and $A \in \{2,3,4\}$, according to Tables 10.1.3.2-1, 10.1.3.2-2, and 10.1.3.2-3 in subframe $n$ using PUCCH format 1b. For a subframe $n$ with $M=1$, HARQ-ACK($j$) denotes the ACK/NACK/DTX response for a transport block or SPS release PDCCH associated with serving cell, where the transport block and serving cell for HARQ-ACK($j$) and $A$ PUCCH resources are given by Table 10.1.2.2.1-1. For a subframe $n$ with $M=2$, HARQ-ACK($j$) denotes the ACK/NACK/DTX response for a PDSCH transmission or SPS release PDCCH within subframe(s) given by set $K$ on each serving cell, where the subframes on each serving cell for HARQ-ACK($j$) and $A$ PUCCH resources are given by Table 10.1.3.2-4. The UE shall determine the $A$ PUCCH resources, $n^{(1)}_{\text{PUCCH},j}$ associated with HARQ-ACK($j$) where $0 \leq j \leq A-1$ in Table 10.1.2.2.1-1 for $M=1$ and Table 10.1.3.2-4 for $M=2$, according to

- for a PDSCH transmission indicated by the detection of a corresponding PDCCH in subframe $n-k_m$, where $k_m \in K$ on the primary cell, or for a PDCCH indicating downlink SPS release (defined in section 9.2) in subframe $n-k_m$, where $k_m \in K$ on the primary cell, the PUCCH resource is $n^{(1)}_{\text{PUCCH},j} = (M-m-1) \cdot N_c + m \cdot N_{c+1} + n_{\text{CCE},m} + N^{(1)}_{\text{PUCCH}}$, where $c$ is selected from $\{0, 1, 2, 3\}$ such that $N_c \le n_{CCE,m} < N_{c+1}$, $N_c = \max\{0, \lfloor [N_{RB}^{DL} \cdot (N_{sc}^{RB} \cdot c - 4)]/36 \rfloor\}$ where $N_{RB}^{DL}$ is determined from the primary cell, and for a subframe $n$ with $M = 1$ and a transmission mode that supports up to two transport blocks on the serving cell where the corresponding PDSCH transmission occurs, the PUCCH resource $n_{PUCCH,j+1}^{(1)}$ is given by $n_{PUCCH,j+1}^{(1)} = (M - m - 1) \cdot N_c + m \cdot N_{c+1} + n_{CCE,m} + 1 + N_{PUCCH}^{(1)}$ where $n_{CCE,m}$ is the number of the first CCE used for transmission of the corresponding DCI assignment and $N_{PUCCH}^{(1)}$ is configured by higher layers.

- for a PDSCH transmission on the primary cell where there is not a corresponding PDCCH detected within subframe(s) $n - k$, where $k \in K$, the value of $n_{PUCCH,j}^{(1)}$ is determined according to higher layer configuration and Table 9.2-2.

- for a PDSCH transmission indicated by the detection of a corresponding PDCCH within subframe(s) $n - k$, where $k \in K$ on the secondary cell, the value of $n_{PUCCH,j}^{(1)}$, and the value of $n_{PUCCH,j+1}^{(1)}$ for a subframe $n$ with $M = 2$ or for a subframe $n$ with $M = 1$ and a transmission mode on the secondary cell that supports up to two transport blocks is determined according to higher layer configuration and Table 10.1.2.2.1-2. The TPC field in the DCI format of the corresponding PDCCH shall be used to determine the PUCCH resource values from one of the four resource values configured by higher layers, with the mapping defined in Table 10.1.2.2.1-2. For a UE configured for a transmission mode on the secondary cell that supports up to two transport blocks and a subframe $n$ with $M = 1$, or for a subframe $n$ with $M = 2$, a PUCCH resource value in Table 10.1.2.2.1-2 maps to two PUCCH resources $(n_{PUCCH,j}^{(1)}, n_{PUCCH,j+1}^{(1)})$, otherwise, the PUCCH resource value maps to a single PUCCH resource $n_{PUCCH,j}^{(1)}$. A UE shall assume that the same HARQ-ACK PUCCH resource value is transmitted in the TPC field on all PDCCH assignments on the secondary cell within subframe(s) $n - k$, where $k \in K$.

Table 10.1.3.2-1: Transmission of HARQ-ACK multiplexing for A = 2

| HARQ-ACK(0), HARQ-ACK(1) | $n_{PUCCH}^{(1)}$ | $b(0)b(1)$ |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | No Transmission | |

Table 10.1.3.2-2: Transmission of HARQ-ACK multiplexing for A = 3

| HARQ-ACK(0), HARQ-ACK(1), HARQ-ACK(2) | $n_{PUCCH}^{(1)}$ | $b(0)b(1)$ |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |

| | | |
|---|---|---|
| NACK/DTX, ACK, ACK | $n^{(1)}_{PUCCH,2}$ | 0, 1 |
| NACK/DTX, ACK, NACK/DTX | $n^{(1)}_{PUCCH,1}$ | 0, 1 |
| NACK/DTX, NACK/DTX, ACK | $n^{(1)}_{PUCCH,2}$ | 0, 0 |
| NACK, NACK/DTX, NACK/DTX | $n^{(1)}_{PUCCH,0}$ | 0, 0 |
| DTX, NACK/DTX, NACK/DTX | No Transmission | |

Table 10.1.3.2-3: Transmission of HARQ-ACK multiplexing for A = 4

| HARQ-ACK(0), HARQ-ACK(1), HARQ-ACK(2), HARQ-ACK(3) | $n^{(1)}_{PUCCH}$ | $b(0)b(1)$ |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,2}$ | 1, 1 |
| ACK, ACK, NACK/DTX, ACK | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 1, 1 |
| ACK, NACK/DTX, ACK, NACK/DTX | $n^{(1)}_{PUCCH,2}$ | 1, 0 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,1}$ | 0, 0 |
| NACK/DTX, ACK, ACK, NACK/DTX | $n^{(1)}_{PUCCH,2}$ | 0, 1 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| NACK, NACK/DTX, NACK/DTX, NACK/DTX | $n^{(1)}_{PUCCH,0}$ | 0, 0 |
| DTX, NACK/DTX, NACK/DTX, NACK/DTX | No Transmission | |

Table 10.1.3.2-4: Mapping of subframes on each serving cell to HARQ-ACK(j) for PUCCH format 1b HARQ-ACK channel selection for TDD with $M = 2$

| A | HARQ-ACK(j) | | | |
|---|---|---|---|---|
| | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell |

For TDD HARQ-ACK multiplexing with PUCCH format 1b with channel selection and subframe $n$ with $M > 2$ and two configured serving cells, where $M$ is the number of elements in the set $K$ defined in Table 10.1.3.1-1, denotes $n^{(1)}_{\text{PUCCH},i}$ $0 \le i \le 3$ as the PUCCH resource derived from the transmissions in $M$ DL sub-frames associated with the UL subframe $n$. $n^{(1)}_{\text{PUCCH},0}$ and $n^{(1)}_{\text{PUCCH},1}$ are associated with the PDSCH transmission(s) or a PDCCH indicating downlink SPS release (defined in section 9.2) on the primary cell and $n^{(1)}_{\text{PUCCH},2}$ and $n^{(1)}_{\text{PUCCH},3}$ are associated with the PDSCH transmission(s) on the secondary cell.

For Primary cell:

- If there is a PDSCH transmission on the primary cell without a corresponding PDCCH detected within the subframe(s) $n-k$, where $k \in K$, o the value of $n^{(1)}_{\text{PUCCH},0}$ is determined according to higher layer configuration and Table 9.2-2.

o for a PDSCH transmission on the primary cell indicated by the detection of a corresponding PDCCH in subframe $n-k_m$, where $k_m \in K$ with the DAI value in the PDCCH equal to '1' (defined in Table 7.3-X) or a PDCCH indicating downlink SPS release (defined in section 9.2) in subframe $n-k_m$, where $k_m \in K$ with the DAI value in the PDCCH equal to '1', the PUCCH resource $n^{(1)}_{\text{PUCCH},1} = (M-m-1) \cdot N_c + m \cdot N_{c-1} + n_{\text{CCE},m} + N^{(1)}_{\text{PUCCH}}$ where $c$ is selected from $\{0, 1, 2, 3\}$ such that $N_c \le n_{\text{CCE},m} < N_{c+1}$, $N_c = \max\left\{0, \left\lfloor [N^{\text{DL}}_{\text{RB}} \cdot (N^{\text{RB}}_{\text{sc}} \cdot c - 4)]/36 \right\rfloor \right\}$, where $n_{\text{CCE},m}$ is the number of the first CCE used for transmission of the corresponding PDCCH in subframe $n-k_m$ and $N^{(1)}_{\text{PUCCH}}$ is configured by higher layers.

o HARQ-ACK(0) is the ACK/NACK/DTX response for the PDSCH transmission without a corresponding PDCCH. HARQ-ACK(j), $1 \le j \le M-1$, is the ACK/NACK/DTX response for the PDSCH transmission with a corresponding PDCCH and DAI value in the PDCCH equal to '$j$', or for the PDCCH indicating downlink SPS release and with DAI value in the PDCCH equal to '$j$'.

- Otherwise, o for a PDSCH transmission on the primary cell indicated by the detection of a corresponding PDCCH in subframe $n-k_m$, where $k_m \in K$ with the DAI value in the PDCCH equal to either '1' or '2' or a PDCCH indicating downlink SPS release (defined in section 9.2) in subframe $n-k_m$, where $k_m \in K$ with the DAI value in the PDCCH equal to either '1' or '2', the PUCCH resource $n_{PUCCH,i}^{(1)} = (M-m-1) \cdot N_c + m \cdot N_{c+1} + n_{CCE,m} + N_{PUCCH}^{(1)}$, where $c$ is selected from $\{0, 1, 2, 3\}$ such that $N_c \leq n_{CCE,m} < N_{c+1}$, $N_c = \max\left\{0, \lfloor [N_{RB}^{DL} \cdot (N_{sc}^{RB} \cdot c - 4)]/36 \rfloor\right\}$, where $n_{CCE,m}$ is the number of the first CCE used for transmission of the corresponding PDCCH in subframe $n-k_m$, $N_{PUCCH}^{(1)}$ is configured by higher layers, $i = 0$ for the corresponding PDCCH with the DAI value equal to '1' and $i = 1$ for the corresponding PDCCH with the DAI value equal to '2'.

o HARQ-ACK(j), $0 \leq j \leq M-1$, is the ACK/NACK/DTX response for the PDSCH transmission with corresponding PDCCH and DAI value in the PDCCH equal to '$j+1$', or for the PDCCH indicating downlink SPS release and with DAI value in the PDCCH equal to '$j+1$'.

For Secondary cell:

- for a PDSCH transmission on the secondary cell indicated by the detection of a corresponding PDCCH on the primary cell in subframe $n-k_m$, where $k_m \in K$ with the DAI value in the PDCCH equal to either '1' or '2', the PUCCH resources $n_{PUCCH,i}^{(1)} = (M-m-1) \cdot N_c + m \cdot N_{c+1} + n_{CCE,m} + N_{PUCCH}^{(1)}$, where $c$ is selected from $\{0, 1, 2, 3\}$ such that $N_c \leq n_{CCE,m} < N_{c+1}$, $N_c = \max\left\{0, \lfloor [N_{RB}^{DL} \cdot (N_{sc}^{RB} \cdot c - 4)]/36 \rfloor\right\}$, where $N_{RB}^{DL}$ is determined from the primary cell, $n_{CCE,m}$ is the number of the first CCE used for transmission of the corresponding PDCCH in subframe $n-k_m$, $N_{PUCCH}^{(1)}$ is configured by higher layers, $i = 2$ for the corresponding PDCCH with the DAI value equal to '1' and $i = 3$ for the corresponding PDCCH with the DAI value equal to '2'.

- for a PDSCH transmission indicated by the detection of a corresponding PDCCH within the subframe(s) $n-k$, where $k \in K$ on the secondary cell, the value of $n_{PUCCH,2}^{(1)}$ and $n_{PUCCH,3}^{(1)}$ is determined according to higher layer configuration and Table 10.1.2.2.1-2. The TPC field in the DCI format of the corresponding PDCCH shall be used to determine the PUCCH resource values from one of the four resource values configured by higher layers, with the mapping defined in Table 10.1.2.2.1-2. A UE shall assume that the same HARQ-ACK PUCCH resource value is transmitted in the TPC field on all PDCCH assignments on the secondary cell within subframe(s) $n-k$, where $k \in K$.

- HARQ-ACK(j), $0 \leq j \leq M-1$, is the ACK/NACK/DTX response for the PDSCH transmission with a corresponding PDCCH and DAI value in the PDCCH equal to '$j+1$'.

A UE shall perform channel selection according to the Tables 10.1.3.2-5, and 10.1.3.2-6 and transmit $b(0),b(1)$ on PUCCH resource $n^{(1)}_{PUCCH}$ in sub-frame $n$ using PUCCH format 1b according to section 5.4.1 in [3] where "any" represents any response of ACK, NACK, or DTX. The value of $b(0),b(1)$ and the PUCCH resource $n^{(1)}_{PUCCH}$ are generated by channel selection according to Tables 10.1.3.2-5, and 10.1.3.2-6 for $M = 3$, and 4 respectively.

Table 10.1.3.2-5: Transmission of HARQ-ACK multiplexing for $M = 3$

| Primary Cell | Secondary Cell | Resource | Constellation | RM Code Input Bits |
|---|---|---|---|---|
| HARQ-ACK(0), HARQ-ACK(1), HARQ-ACK(2) | HARQ-ACK(0), HARQ-ACK(1), HARQ-ACK(2) | $n^{(1)}_{PUCCH}$ | $b(0),b(1)$ | $o(0),o(1),o(2),o(3)$ |
| ACK, ACK, ACK | ACK, ACK, ACK | $n^{(1)}_{PUCCH,1}$ | 1, 1 | 1,1,1,1 |
| ACK, ACK, NACK/DTX | ACK, ACK, ACK | $n^{(1)}_{PUCCH,1}$ | 0, 0 | 1,0,1,1 |
| ACK, NACK/DTX, any | ACK, ACK, ACK | $n^{(1)}_{PUCCH,3}$ | 1, 1 | 0,1,1,1 |
| NACK/DTX, any, any | ACK, ACK, ACK | $n^{(1)}_{PUCCH,3}$ | 0, 1 | 0,0,1,1 |
| ACK, ACK, ACK | ACK, ACK, NACK/DTX | $n^{(1)}_{PUCCH,0}$ | 1, 0 | 1,1,1,0 |
| ACK, ACK, NACK/DTX | ACK, ACK, NACK/DTX | $n^{(1)}_{PUCCH,3}$ | 1, 0 | 1,0,1,0 |
| ACK, NACK/DTX, any | ACK, ACK, NACK/DTX | $n^{(1)}_{PUCCH,0}$ | 0, 1 | 0,1,1,0 |
| NACK/DTX, any, any | ACK, ACK, NACK/DTX | $n^{(1)}_{PUCCH,3}$ | 0, 0 | 0,0,1,0 |
| ACK, ACK, ACK | ACK, NACK/DTX, any | $n^{(1)}_{PUCCH,2}$ | 1, 1 | 1, 1, 0, 1 |
| ACK, ACK, NACK/DTX | ACK, NACK/DTX, any | $n^{(1)}_{PUCCH,2}$ | 0, 1 | 1, 0, 0, 1 |
| ACK, NACK/DTX, any | ACK, NACK/DTX, any | $n^{(1)}_{PUCCH,2}$ | 1, 0 | 0, 1, 0, 1 |
| NACK/DTX, any, any | ACK, NACK/DTX, any | $n^{(1)}_{PUCCH,2}$ | 0, 0 | 0, 0, 0, 1 |
| ACK, ACK, ACK | NACK/DTX, any, any | $n^{(1)}_{PUCCH,1}$ | 1, 0 | 1, 1, 0, 0 |
| ACK, ACK, NACK/DTX | NACK/DTX, any, any | $n^{(1)}_{PUCCH,1}$ | 0, 1 | 1, 0, 0, 0 |
| ACK, NACK/DTX, any | NACK/DTX, any, any | $n^{(1)}_{PUCCH,0}$ | 1, 1 | 0, 1, 0, 0 |
| NACK, any, any | NACK/DTX, any, any | $n^{(1)}_{PUCCH,0}$ | 0, 0 | 0, 0, 0, 0 |
| DTX, any, any | NACK/DTX, any, any | No Transmission | | 0, 0, 0, 0 |

Table 10.1.3.2-6: Transmission of HARQ-ACK multiplexing for $M = 4$

| Primary Cell | Secondary Cell | Resource | Constellation | RM Code Input Bits |
|---|---|---|---|---|

| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | $n^{(1)}_{PUCCH}$ | $b(0), b(1)$ | $o(0), o(1), o(2), o(3)$ |
|---|---|---|---|---|
| ACK, ACK, ACK, NACK/DTX | ACK, ACK, ACK, NACK/DTX | $n^{(1)}_{PUCCH,1}$ | 1, 1 | 1, 1, 1, 1 |
| ACK, ACK, NACK/DTX, any | ACK, ACK, ACK, NACK/DTX | $n^{(1)}_{PUCCH,1}$ | 0, 0 | 1, 0, 1, 1 |
| ACK, DTX, DTX, DTX | ACK, ACK, ACK, NACK/DTX | $n^{(1)}_{PUCCH,3}$ | 1, 1 | 0, 1, 1, 1 |
| ACK, ACK, ACK, ACK | ACK, ACK, ACK, NACK/DTX | $n^{(1)}_{PUCCH,3}$ | 1, 1 | 0, 1, 1, 1 |
| NACK/DTX, any, any, any | ACK, ACK, ACK, NACK/DTX | $n^{(1)}_{PUCCH,3}$ | 0, 1 | 0, 0, 1, 1 |
| (ACK, NACK/DTX, any, any), except for (ACK, DTX, DTX, DTX) | ACK, ACK, ACK, NACK/DTX | $n^{(1)}_{PUCCH,3}$ | 0, 1 | 0, 0, 1, 1 |
| ACK, ACK, ACK, NACK/DTX | ACK, ACK, NACK/DTX, any | $n^{(1)}_{PUCCH,0}$ | 1, 0 | 1, 1, 1, 0 |
| ACK, ACK, NACK/DTX, any | ACK, ACK, NACK/DTX, any | $n^{(1)}_{PUCCH,3}$ | 1, 0 | 1, 0, 1, 0 |
| ACK, DTX, DTX, DTX | ACK, ACK, NACK/DTX, any | $n^{(1)}_{PUCCH,0}$ | 0, 1 | 0, 1, 1, 0 |
| ACK, ACK, ACK, ACK | ACK, ACK, NACK/DTX, any | $n^{(1)}_{PUCCH,0}$ | 0, 1 | 0, 1, 1, 0 |
| NACK/DTX, any, any, any | ACK, ACK, NACK/DTX, any | $n^{(1)}_{PUCCH,3}$ | 0, 0 | 0, 0, 1, 0 |
| (ACK, NACK/DTX, any, any), except for (ACK, DTX, DTX, DTX) | ACK, ACK, NACK/DTX, any | $n^{(1)}_{PUCCH,3}$ | 0, 0 | 0, 0, 1, 0 |
| ACK, ACK, ACK, NACK/DTX | ACK, DTX, DTX, DTX | $n^{(1)}_{PUCCH,2}$ | 1, 1 | 1, 1, 0, 1 |
| ACK, ACK, ACK, NACK/DTX | ACK, ACK, ACK, ACK | $n^{(1)}_{PUCCH,2}$ | 1, 1 | 1, 1, 0, 1 |
| ACK, ACK, NACK/DTX, any | ACK, DTX, DTX, DTX | $n^{(1)}_{PUCCH,2}$ | 0, 1 | 1, 0, 0, 1 |
| ACK, ACK, NACK/DTX, any | ACK, ACK, ACK, ACK | $n^{(1)}_{PUCCH,2}$ | 0, 1 | 1, 0, 0, 1 |
| ACK, DTX, DTX, DTX | ACK, DTX, DTX, DTX | $n^{(1)}_{PUCCH,2}$ | 1, 0 | 0, 1, 0, 1 |
| ACK, DTX, DTX, DTX | ACK, ACK, ACK, ACK | $n^{(1)}_{PUCCH,2}$ | 1, 0 | 0, 1, 0, 1 |
| ACK, ACK, ACK, ACK | ACK, DTX, DTX, DTX | $n^{(1)}_{PUCCH,2}$ | 1, 0 | 0, 1, 0, 1 |
| ACK, ACK, ACK, ACK | ACK, ACK, ACK, ACK | $n^{(1)}_{PUCCH,2}$ | 1, 0 | 0, 1, 0, 1 |
| NACK/DTX, any, any, any | ACK, DTX, DTX, DTX | $n^{(1)}_{PUCCH,2}$ | 0, 0 | 0, 0, 0, 1 |
| NACK/DTX, any, any, any | ACK, ACK, ACK, ACK | $n^{(1)}_{PUCCH,2}$ | 0, 0 | 0, 0, 0, 1 |
| (ACK, NACK/DTX, any, any), except for (ACK, DTX, DTX, DTX) | ACK, DTX, DTX, DTX | $n^{(1)}_{PUCCH,2}$ | 0, 0 | 0, 0, 0, 1 |
| (ACK, NACK/DTX, any, any), except for (ACK, DTX, DTX, DTX) | ACK, ACK, ACK, ACK | $n^{(1)}_{PUCCH,2}$ | 0, 0 | 0, 0, 0, 1 |

| | | | | |
|---|---|---|---|---|
| ACK, ACK, ACK, NACK/DTX | NACK/DTX, any, any, any | $n^{(1)}_{PUCCH,1}$ | 1, 0 | 1, 1, 0, 0 |
| ACK, ACK, ACK, NACK/DTX | (ACK, NACK/DTX, any, any), except for (ACK, DTX, DTX, DTX) | $n^{(1)}_{PUCCH,1}$ | 1, 0 | 1, 1, 0, 0 |
| ACK, ACK, NACK/DTX, any | NACK/DTX, any, any, any | $n^{(1)}_{PUCCH,1}$ | 0, 1 | 1, 0, 0, 0 |
| ACK, ACK, NACK/DTX, any | (ACK, NACK/DTX, any, any), except for (ACK, DTX, DTX, DTX) | $n^{(1)}_{PUCCH,1}$ | 0, 1 | 1, 0, 0, 0 |
| ACK, DTX, DTX, DTX | NACK/DTX, any, any, any | $n^{(1)}_{PUCCH,0}$ | 1, 1 | 0, 1, 0, 0 |
| ACK, DTX, DTX, DTX | (ACK, NACK/DTX, any, any), except for (ACK, DTX, DTX, DTX) | $n^{(1)}_{PUCCH,0}$ | 1, 1 | 0, 1, 0, 0 |
| ACK, ACK, ACK, ACK | NACK/DTX, any, any, any | $n^{(1)}_{PUCCH,0}$ | 1, 1 | 0, 1, 0, 0 |
| ACK, ACK, ACK, ACK | (ACK, NACK/DTX, any, any), except for (ACK, DTX, DTX, DTX) | $n^{(1)}_{PUCCH,0}$ | 1, 1 | 0, 1, 0, 0 |
| NACK, any, any, any | NACK/DTX, any, any, any | $n^{(1)}_{PUCCH,0}$ | 0, 0 | 0, 0, 0, 0 |
| NACK, any, any, any | (ACK, NACK/DTX, any, any), except for (ACK, DTX, DTX, DTX) | $n^{(1)}_{PUCCH,0}$ | 0, 0 | 0, 0, 0, 0 |
| (ACK, NACK/DTX, any, any), except for (ACK, DTX, DTX, DTX) | NACK/DTX, any, any, any | $n^{(1)}_{PUCCH,0}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n^{(1)}_{PUCCH,0}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 |

The invention claimed is:

1. A user equipment (UE) device for use in a wireless communication network, wherein the UE device is configured to use transmit diversity, and to transmit a reference symbol and a modulation symbol on multiple orthogonal resources on an antenna, the UE device comprising:
   a processor; and
   a wireless network connectivity interface,
   wherein the processor and wireless network connectivity interface are configured to:
      select a first orthogonal resource from a plurality of orthogonal resources according to a state of information bits to be communicated by the UE device;
      determine a second orthogonal resource from the first orthogonal resource, wherein
         if the selecting chooses the first orthogonal resource from a first subset of the plurality of orthogonal resources, the second orthogonal resource is the same as the first orthogonal resource, and
         if the selecting chooses the first orthogonal resource from a second subset of the plurality of orthogonal resources for at least one value of the index of the first orthogonal resource, the second orthogonal resource is an orthogonal resource whose index is an index of the first orthogonal resource offset by a predetermined constant; and
      transmit the reference and modulation symbols on the first and the second orthogonal resources, respectively, on a first antenna,
   wherein the first orthogonal resource and the second orthogonal resource are PUCCH resources and wherein the plurality of orthogonal resources consists of PUCCH resources.

2. The device of claim 1, wherein the second orthogonal resource is a shifted PUCCH resource, and wherein, when a shift for the shifted PUCCH resource is negative and the first orthogonal resource has an index of 0, the shifted PUCCH resource is in the same physical resource block as the first orthogonal resource.

3. The device of claim 1, wherein the second orthogonal resource is a shifted PUCCH resource, and wherein when the sum of a shift for the shifted PUCCH resource and an index of the first orthogonal resource is greater than the number of PUCCH resources in a physical resource block, the shifted PUCCH resource is in the same physical resource block as the first orthogonal resource.

4. The device of claim 1, wherein the second orthogonal resource is a shifted PUCCH resource, and the shifted PUCCH resource comprises an orthogonal resource whose orthogonal cover $\bar{n}_{oc}^{(\tilde{p})}(n_s)$ and cyclic shift $n_{cs}^{(\tilde{p})}(n_s,l)$ are calculated using $$\bar{n}_{oc}^{(\tilde{p})}(n_s) = \lfloor n_p''(n_s) \cdot \Delta_{shift}^{PUCCH} / N' \rfloor$$

$$\alpha_{\tilde{p}}(n_s, l) = 2\pi \cdot \bar{n}_{cs}^{(\tilde{p})}(n_s, l) / N_{sc}^{RB}$$

$$\bar{n}_{cs}^{(\tilde{p})}(n_s, l) = \begin{cases} [n_{cs}^{cell}(n_s, l) + (n_p''(n_s) \cdot \Delta_{shift}^{PUCCH} + (\bar{n}_{oc}^{(\tilde{p})}(n_s) \bmod \Delta_{shift}^{PUCCH})) \bmod N'] \bmod N_{sc}^{RB} & \text{for normal cyclic prefix} \\ [n_{cs}^{cell}(n_s, l) + (n_p''(n_s) \cdot \Delta_{shift}^{PUCCH} + \bar{n}_{oc}^{(\tilde{p})}(n_s)) \bmod N'] \bmod N_{sc}^{RB} & \text{for extended cyclic prefix} \end{cases}$$

where for $n_s \bmod 2 = 0$, $$n_p''(n_s) = \begin{cases} n_{PUCCH}'^{(1,\tilde{p})} & \text{if } n_{PUCCH}'^{(1,\tilde{p})} < c \cdot N_{cs}^{(1)} / \Delta_{shift}^{PUCCH} \\ (n_{PUCCH}'^{(1,\tilde{p})} - c \cdot N_{cs}^{(1)} / \Delta_{shift}^{PUCCH}) \bmod (c \cdot N_{sc}^{RB} / \Delta_{shift}^{PUCCH}) & \text{otherwise} \end{cases}$$

$$n_{PUCCH}'^{(1,\tilde{p})} = \begin{cases} n_{PUCCH}^{(1,\tilde{p})} + \Delta_{RS}^{\tilde{p}} & \text{if } n_{PUCCH}^{(1,\tilde{p})} + \Delta_{RS}^{\tilde{p}} \geq 0 \\ 0 & \text{otherwise} \end{cases}$$

and for $n_s \bmod 2 = 1$ $$n_p''(n_s) = \begin{cases} [c(n_p''(n_s - 1) + 1)] \bmod (cN_{sc}^{RB} / \Delta_{shift}^{PUCCH} + 1) - 1 & n_{PUCCH}'^{(1,\tilde{p})} \geq c \cdot N_{cs}^{(1)} / \Delta_{shift}^{PUCCH} \\ \lfloor h_{\tilde{p}} / c \rfloor + (h_{\tilde{p}} \bmod c) N' / \Delta_{shift}^{PUCCH} & \text{otherwise} \end{cases}$$

$$h_{\tilde{p}} = (n_p''(n_s - 1) + d) \bmod (cN' / \Delta_{shift}^{PUCCH}),$$

with c=3 and d=2 for normal cyclic prefix, c=2 and d=0 for extended cyclic prefix;

$\Delta_{RS}^{\tilde{p}}$ is a PUCCH resource shift that is set to an integer value that is one of 0, positive, or negative, and $N_{cs}^{(1)}, N_{sc}^{RB}, N', \Delta_{shift}^{PUCCH}$ and $n_{cs}^{cell}(n_s,l)$ are defined by Section 5.4.1 of 3GPP specification 36.211.

5. A method at a user equipment (UE) device for use in a wireless communication network, wherein the UE device is configured to use transmit diversity, and to transmit a reference symbol and a modulation symbol on multiple orthogonal resources on an antenna, the method comprising:

selecting a first orthogonal resource from a plurality of orthogonal resources according to a state of information bits to be communicated by the UE device;

determining a second orthogonal resource from the first orthogonal resource, wherein if the selecting chooses the first orthogonal resource from a first subset of the plurality of orthogonal resources, the second orthogonal resource is the same as the first orthogonal resource, and if the selecting chooses the first orthogonal resource from a second subset of the plurality of orthogonal resources for at least one value of the index of the first orthogonal resource, the second orthogonal resource is an orthogonal resource whose index is an index of the first orthogonal resource offset by a predetermined constant; and transmitting the reference and modulation symbols on the first and the second orthogonal resources, respectively, on a first antenna, wherein the first orthogonal resource and the second orthogonal resource are PUCCH resources and wherein the plurality of orthogonal resources consists of PUCCH resources.

6. The method of claim 5, wherein the second orthogonal resource is a shifted PUCCH resource, and wherein, when a shift for the shifted PUCCH resource is negative and the first orthogonal resource has an index of 0, the shifted PUCCH resource is in the same physical resource block as the first orthogonal resource.

7. The method of claim 5, wherein the second orthogonal resource is a shifted PUCCH resource, and wherein when the sum of a shift for the shifted PUCCH resource and an index of the first orthogonal resource is greater than the number of PUCCH resources in a physical resource block, the shifted PUCCH resource is in the same physical resource block as the first orthogonal resource.

8. The method of claim 5, wherein the second orthogonal resource is a shifted PUCCH resource, and the shifted PUCCH resource comprises an orthogonal resource whose orthogonal cover $\bar{n}_{oc}^{(\tilde{p})}(n_s)$ and cyclic shift $n_{cs}^{(\tilde{p})}(n_s,l)$ are calculated using $$\bar{n}_{oc}^{(\tilde{p})}(n_s) = \lfloor n_{\tilde{p}}''(n_s) \cdot \Delta_{shift}^{PUCCH} / N' \rfloor$$

$$\alpha_{\tilde{p}}(n_s, l) = 2\pi \cdot \bar{n}_{cs}^{(\tilde{p})}(n_s, l) / N_{sc}^{RB}$$

$$\bar{n}_{cs}^{(\tilde{p})}(n_s, l) =$$

$$\begin{cases} [n_{cs}^{cell}(n_s, l) + (n_{\tilde{p}}''(n_s) \cdot \Delta_{shift}^{PUCCH} + (\bar{n}_{oc}^{(\tilde{p})}(n_s) \bmod \Delta_{shift}^{PUCCH})) \bmod N'] \bmod N_{sc}^{RB} & \text{for normal cyclic prefix} \\ [n_{cs}^{cell}(n_s, l) + (n_{\tilde{p}}''(n_s) \cdot \Delta_{shift}^{PUCCH} + \bar{n}_{oc}^{(\tilde{p})}(n_s)) \bmod N'] \bmod N_{sc}^{RB} & \text{for extended cyclic prefix} \end{cases}$$

where for $n_s \bmod 2 = 0$, $$n_{\tilde{p}}''(n_s) = \begin{cases} n_{PUCCH}'^{(1,\tilde{p})} & \text{if } n_{PUCCH}'^{(1,\tilde{p})} < c \cdot N_{cs}^{(1)} / \Delta_{shift}^{PUCCH} \\ (n_{PUCCH}'^{(1,\tilde{p})} - c \cdot N_{cs}^{(1)} / \Delta_{shift}^{PUCCH} \bmod(c \cdot N_{sc}^{RB} / \Delta_{shift}^{PUCCH})) & \text{otherwise} \end{cases}$$

$$n_{PUCCH}'^{(1,\tilde{p})} = \begin{cases} n_{PUCCH}^{(1,\tilde{p})} + \Delta_{RS}^{\tilde{p}} & \text{if } n_{PUCCH}^{(1,\tilde{p})} + \Delta_{RS}^{\tilde{p}} \geq 0 \\ 0 & \text{otherwise} \end{cases}$$

and for $n_s \bmod 2 = 1$ $$n_{\tilde{p}}''(n_s) = \begin{cases} [c(n_{\tilde{p}}''(n_s - 1) + 1)] \bmod(cN_{sc}^{RB} / \Delta_{shift}^{PUCCH} + 1) - 1 & n_{PUCCH}'^{(1,\tilde{p})} \geq c \cdot N_{cs}^{(1)} / \Delta_{shift}^{PUCCH} \\ \lfloor h_{\tilde{p}} / c \rfloor + (h_{\tilde{p}} \bmod c) N' / \Delta_{shift}^{PUCCH} & \text{otherwise} \end{cases}$$

$$h_{\tilde{p}} = (n_{\tilde{p}}''(n_s - 1) + d) \bmod(cN' / \Delta_{shift}^{PUCCH}),$$

with c=3 and d=2 for normal cyclic prefix, c=2 and d=0 for extended cyclic prefix;

$\Delta_{RS}^{\tilde{p}}$ is a PUCCH resource shift that is set to an integer value that is one of 0, positive, or negative, and $N_{cs}^{(1)}$, $N_{sc}^{RB}$, N', $\Delta_{shift}^{PUCCH}$ and $n_{cs}^{cell}(n_s,l)$ are defined by Section 5.4.1 of 3GPP specification 36.211.

9. A user equipment (UE) device for use in a wireless communication network, wherein the UE device is configured to use transmit diversity, the UE device comprising:
a processor; and
a wireless network connectivity interface,
wherein the processor and wireless network connectivity interface are configured to:
  select a first orthogonal resource from a plurality of orthogonal resources according to a state of information bits to be communicated by the UE device;
  select a first modulation symbol from a plurality of modulation symbols according to the state of information bits to be communicated by the UE device;
  determine a second modulation symbol from the first modulation symbol, wherein
    if the selecting chooses the first modulation symbol from a first subset of the plurality of modulation symbols, the second modulation symbol is the same as the first modulation symbol, and
    if the selecting chooses the first modulation symbol from a second subset of the plurality of modulation symbols, the second modulation symbol is different from the first modulation symbol;
  transmit the first modulation symbol using the first orthogonal resource on a first antenna; and
  transmit the second modulation symbol using a second orthogonal resource on a second antenna,
  wherein the first orthogonal resource and the second orthogonal resource are PUCCH resources and wherein the plurality of orthogonal resources consists of PUCCH resources.

10. The device of claim 9, wherein the determining the second modulation symbol is independent of the selecting the first orthogonal resource when a number of the information bits to be communicated by the UE device is four.

11. The device of claim 9, wherein the determining the second modulation symbol uses the first orthogonal resource when a number of the information bits to be communicated by the UE device is three.

12. The device of claim 9, wherein the second modulation symbol is the same as the first modulation symbol when a number of the information bits to be communicated by the UE device is two.

13. A method at a user equipment (UE) device for use in a wireless communication network, wherein the UE device is configured to use transmit diversity, the method comprising:
  selecting, at the UE device, a first orthogonal resource from a plurality of orthogonal resources according to a state of information bits to be communicated by the UE device;
  selecting, at the UE device, a first modulation symbol from a plurality of modulation symbols according to the state of information bits to be communicated by the UE device;
  determining, at the UE device, a second modulation symbol from the first modulation symbol, wherein
    if the selecting chooses the first modulation symbol from a first subset of the plurality of modulation symbols, the second modulation symbol is the same as the first modulation symbol, and
    if the selecting chooses the first modulation symbol from a second subset of the plurality of modulation symbols, the second modulation symbol is different from the first modulation symbol;
  transmitting, at the UE device, the first modulation symbol using the first orthogonal resource on a first antenna; and
  transmitting, at the UE device, the second modulation symbol using a second orthogonal resource on a second antenna,
  wherein the first orthogonal resource and the second orthogonal resource are PUCCH resources and wherein the plurality of orthogonal resources consists of PUCCH resources.

14. The method of claim 13, wherein the determining the second modulation symbol is independent of the selecting the first orthogonal resource when a number of the information bits to be communicated by the UE device is four.

15. The method of claim 13, wherein the determining the second modulation symbol uses the first orthogonal resource when a number of the information bits to be communicated by the UE device is three.

16. The method of claim 13, wherein the second modulation symbol is the same as the first modulation symbol when a number of the information bits to be communicated by the UE device is two.

17. A user equipment (UE) device for use in a wireless communication network, wherein the UE device is configured to use transmit diversity, the UE device comprising:
a processor; and
a wireless network connectivity interface,
wherein the processor and wireless network connectivity interface are configured to:
  select a first orthogonal resource from a plurality of orthogonal resources according to a state of information bits to be communicated by the UE device, the first orthogonal resource being identified by a first index;
  select a first modulation symbol from a plurality of modulation symbols according to the state of information bits to be communicated by the UE device;
  determine a second orthogonal resource from the first orthogonal resource the second orthogonal resource being identified by a second index, and when the UE device receives a transmission of a transmission mode that supports one transport block, the second index is the sum of a first offset and the first index, and
  when the UE device receives a transmission of a transmission mode that supports more than one transport block and determines the first orthogonal resource using a position of a downlink control channel transmission that allocates a PDSCH transmission, the second index is the sum of a second offset and the first index;
  transmit the first modulation symbol using the first orthogonal resource on a first antenna; and
  transmit the first modulation symbol using the second orthogonal resource on a second antenna.

18. The device of claim 17, wherein the plurality of orthogonal resources comprises at least one explicitly signaled orthogonal resource.

19. The device of claim 17, further transmitting a reference symbol on the second antenna using the second orthogonal resource.

20. A method at a user equipment (UE) device for use in a wireless communication network, wherein the UE device is configured to use transmit diversity, the method comprising:
  selecting a first orthogonal resource from a plurality of orthogonal resources according to a state of information bits to be communicated by the UE device, the first orthogonal resource being identified by a first index;

selecting a first modulation symbol from a plurality of modulation symbols according to the state of information bits to be communicated by the UE device;

determining a second orthogonal resource from the first orthogonal resource, the second orthogonal resource being identified by a second index, and when the UE device receives a transmission of a transmission mode that supports one transport block and determines the first orthogonal resource using a position of a downlink control channel transmission that allocates a PDSCH transmission, the second index is the sum of a first offset and the first index, and when the UE device receives a transmission of a transmission mode that supports more than one transport block, the second index is the sum of a second offset and the first index;

transmitting the first modulation symbol using the first orthogonal resource on a first antenna; and transmitting the first modulation symbol using the second orthogonal resource on a second antenna.

21. The method of claim 20, wherein the plurality of orthogonal resources comprises at least one explicitly signaled orthogonal resource.

22. The method of claim 20, further comprising transmitting a reference symbol on the second antenna using the second orthogonal resource.

23. A user equipment (UE) device for use in a wireless communication network, wherein the UE device is configured to use transmit diversity, the UE device comprising:

a processor; and a wireless network connectivity interface, wherein the processor and wireless network connectivity interface are configured to:

receive an explicitly signaled allocation of a first plurality of orthogonal resources;

select a first modulation symbol from a plurality of modulation symbols according to the state of information bits to be communicated by the UE device;

select a first orthogonal resource subset from the first plurality of orthogonal resources, wherein when the UE device receives a transmission using a transmission mode that supports one transport block, the subset consists of 2 orthogonal resources, and when the UE device receives a transmission using a transmission mode that supports more than one transport block, the subset consists of 4 orthogonal resources;

determine a second orthogonal resource subset, wherein each orthogonal resource in the second orthogonal resource subset is a resource whose index comprises the sum of an index of a control channel element and an offset;

select a first and a second orthogonal resource from a second plurality of orthogonal resources according to a state of information bits to be communicated by the UE device, wherein the second plurality of orthogonal resources comprises the first and second orthogonal resource subsets;

transmit the first modulation symbol using the first orthogonal resource on a first antenna; and transmit the first modulation symbol using the second orthogonal resource on a second antenna, wherein the first orthogonal resource and the second orthogonal resource are PUCCH resources and wherein the first orthogonal resource subset, the second orthogonal resource subset, the first plurality of orthogonal resources, and the second plurality of orthogonal resources consist of PUCCH resources.

24. The device of claim 23, wherein the processor and wireless network connectivity interface are further configured to select the first orthogonal resource subset from the first plurality of orthogonal resources according to a state of information bits received on a control channel.

25. A method at a user equipment (UE) device for use in a wireless communication network, wherein the UE device is configured to use transmit diversity, the method comprising:

receiving an explicitly signaled allocation of a first plurality of orthogonal resources;

selecting a first modulation symbol from a plurality of modulation symbols according to the state of information bits to be communicated by the UE device;

selecting a first orthogonal resource subset from the first plurality of orthogonal resources, wherein when the UE device receives a transmission using a transmission mode that supports one transport block, the subset consists of 2 orthogonal resources, and when the UE device receives a transmission using a transmission mode that supports more than one transport block, the subset consists of 4 orthogonal resources;

determining a second orthogonal resource subset, wherein each orthogonal resource in the second orthogonal resource subset is a resource whose index comprises the sum of an index of a control channel element and an offset;

selecting a first and a second orthogonal resource from a second plurality of orthogonal resources according to a state of information bits to be communicated by the UE device, wherein the second plurality of orthogonal resources comprises the first and second orthogonal resource subsets;

transmitting the first modulation symbol using the first orthogonal resource on a first antenna; and transmitting the first modulation symbol using the second orthogonal resource on a second antenna, wherein the first orthogonal resource and the second orthogonal resource are PUCCH resources and wherein the first orthogonal resource subset, the second orthogonal resource subset, the first plurality of orthogonal resources, and the second plurality of orthogonal resources consist of PUCCH resources.

26. The method of claim 25, further comprising selecting the first orthogonal resource subset from the first plurality of orthogonal resources according to a state of information bits received on a control channel.

* * * * *

UNITED STATES PATENT AND TRADEMARK OFFICE
CERTIFICATE OF CORRECTION

PATENT NO. : 8,908,492 B2  
APPLICATION NO. : 13/466589  
DATED : December 9, 2014  
INVENTOR(S) : Youn Hyoung Heo et al.

Page 1 of 1

It is certified that error appears in the above-identified patent and that said Letters Patent is hereby corrected as shown below:

In The Claims

In Column 97, Line 3, In Claim 4, delete " $\Delta_{RS}^{p}$ " and insert -- $\Delta_{RS}^{\tilde{p}'}$ --, therefor.

Signed and Sealed this  
Twenty-first Day of April, 2015

Michelle K. Lee  
*Director of the United States Patent and Trademark Office*